(12) United States Patent
Mawatari

(10) Patent No.: US 12,519,381 B2
(45) Date of Patent: Jan. 6, 2026

(54) ROTATING ELECTRIC MACHINE

(71) Applicant: DENSO CORPORATION, Kariya (JP)

(72) Inventor: Yuuki Mawatari, Kariya (JP)

(73) Assignee: DENSO CORPORATION, Kariya (JP)

( * ) Notice: Subject to any disclaimer, the term of this patent is extended or adjusted under 35 U.S.C. 154(b) by 436 days.

(21) Appl. No.: 17/972,175

(22) Filed: Oct. 24, 2022

(65) Prior Publication Data

US 2023/0039361 A1 Feb. 9, 2023

Related U.S. Application Data

(63) Continuation of application No. PCT/JP2021/014940, filed on Apr. 8, 2021.

(30) Foreign Application Priority Data

Apr. 28, 2020 (JP) ................................. 2020-079443

(51) Int. Cl.
*H02K 21/12* (2006.01)
*H02K 3/34* (2006.01)
*H02K 3/52* (2006.01)
*H02K 5/20* (2006.01)

(52) U.S. Cl.
CPC ............. *H02K 21/125* (2013.01); *H02K 3/34* (2013.01); *H02K 3/522* (2013.01); *H02K 5/20* (2013.01)

(58) Field of Classification Search
CPC ........ H02K 21/125; H02K 3/34; H02K 3/522; H02K 5/20
USPC .......................................................... 310/52
See application file for complete search history.

(56) References Cited

U.S. PATENT DOCUMENTS

| | | | | |
|---|---|---|---|---|
| 9,337,695 | B2 * | 5/2016 | Clark | H02K 15/063 |
| 12,176,778 | B2 * | 12/2024 | Takahashi | H01F 5/06 |
| 2012/0133235 | A1 * | 5/2012 | Ogihara | H02K 15/35 |
| | | | | 310/208 |
| 2015/0048712 | A1 * | 2/2015 | Janecek | H02K 15/022 |
| | | | | 29/596 |

(Continued)

FOREIGN PATENT DOCUMENTS

| | | |
|---|---|---|
| JP | S57-21243 U | 2/1982 |
| JP | 2005-287240 A | 10/2005 |

*Primary Examiner* — Forrest M Phillips
(74) *Attorney, Agent, or Firm* — Oliff PLC

(57) ABSTRACT

A rotating electric machine includes a multi-phase armature coil having phase windings each constituted of a plurality of partial windings, and a winding support member supporting the partial windings from a radially outer or radially inner side thereof. Each of the partial windings has a pair of intermediate conductor portions and a pair of bridging portions connecting the pair of intermediate conductor portions. All the intermediate conductor portions of the partial windings are arranged in alignment with each other in a circumferential direction. In each of the partial windings, insulating members are mounted respectively on the bridging portions of the partial winding. Brackets are provided respectively in corresponding ones of the insulating members of the partial windings in such a manner as to partially protrude from the corresponding insulating members. Protruding portions of the brackets, which protrude from the corresponding insulating members, are mechanically joined to the winding support member.

12 Claims, 58 Drawing Sheets

(56) References Cited

U.S. PATENT DOCUMENTS

2021/0384794 A1\* 12/2021 Tamura ................ H02K 3/522
2023/0283149 A1\* 9/2023 Kondo .................... H02K 3/38
                                                                       310/52

\* cited by examiner

COMPARATIVE EXAMPLES

ROTATING ELECTRIC MACHINE

CROSS-REFERENCE TO RELATED APPLICATIONS

The present application is a continuation application of International Application No. PCT/JP2021/014940 filed on Apr. 8, 2021, which is based on and claims priority from Japanese Patent Application No. 2020-079443 filed on Apr. 28, 2020. The entire contents of these applications are incorporated by reference into the present application.

BACKGROUND

1 Technical Field

The present disclosure relates to rotating electric machines.

2 Description of Related Art

Conventionally, rotating electric machines have been known which include a field system and an armature. The field system includes a magnet section having a plurality of magnetic poles. The armature includes a multi-phase armature coil. Moreover, there has been known a technique of forming the armature into a cylindrical overall shape by winding the armature coil between positioning protrusions formed on a bobbin (see, for example, Japanese Utility Model Application Publication No. JPS5721243U).

SUMMARY

However, since the armature described in the above document has the configuration where the armature coil is directly wound on an armature core, problems may occur such as increase in the size of a manufacturing device (e.g., a flyer or the like) employed for the winding process. It is considered that in, for example, armatures with a so-called toothless structure having no teeth, in other words, armatures with a structure where the armature coil is not wound on teeth, there is room for technical improvement regarding the assembly of the armature coil.

The present disclosure has been accomplished in view of the above circumstances. It is, therefore, an object of the present disclosure to provide a rotating electric machine capable of easily realizing the assembly of an armature coil.

A plurality of embodiments disclosed in this specification employ technical solutions different from each other to achieve respective objects. Objects, features and advantageous effects disclosed in this specification will become more apparent from the following detailed explanation with reference to the accompanying drawings.

According to a first solution of the present disclosure to the above-described problem, there is provided a rotating electric machine comprising:
  a field system having a plurality of magnetic poles;
  a multi-phase armature coil radially opposed to the field system, the armature coil having phase windings each constituted of a plurality of partial windings; and
    a winding support member provided on a radially opposite side of the armature coil to the field system and supporting the partial windings,
  wherein
  each of the partial windings has a pair of intermediate conductor portions and a pair of bridging portions, the pair of intermediate conductor portions each extending in an axial direction and being spaced at a predetermined interval in a circumferential direction, the pair of bridging portions being located respectively on opposite axial sides of the pair of intermediate conductor portions and connecting the pair of intermediate conductor portions in a ring shape,
  all the partial windings constituting the phase windings of the armature coil are arranged in the circumferential direction so that the intermediate conductor portions of the partial windings are aligned with each other in the circumferential direction,
  in each of the partial windings, insulating members are mounted respectively on corresponding ones of the bridging portions of the partial winding so as to electrically insulate the partial winding from the other partial windings,
  brackets are provided respectively in corresponding ones of the insulating members of the partial windings in such a manner as to partially protrude from the corresponding insulating members, and
  protruding portions of the brackets, which protrude from the corresponding insulating members, are mechanically joined to the winding support member.

In the rotating electric machine with the above-described configuration, each of the partial windings constituting the phase windings of the armature coil has a pair of intermediate conductor portions and a pair of bridging portions connecting the pair of intermediate conductor portions in a ring shape. Moreover, all the partial windings constituting the phase windings of the armature coil are arranged in the circumferential direction so that the intermediate conductor portions of the partial windings are aligned with each other in the circumferential direction. In this case, by assembling each of the partial windings to the winding support member, the assembly of the armature coil can be realized regardless of whether the armature has teeth formed therein. In addition, with the insulating members mounted respectively on the bridging portions of the partial windings, it becomes possible to suitably insulate the partial windings, which are arranged side by side in the circumferential direction, from each other.

Moreover, in the rotating electric machine with the above-described configuration, the brackets are provided respectively in the corresponding insulating members of the partial windings in such a manner as to partially protrude from the corresponding insulating members; and the protruding portions of the brackets, which protrude from the corresponding insulating members, are mechanically joined to the winding support member. Consequently, it becomes possible to easily and reliably mount the partial windings to the winding support member. In addition, in the case of manufacturing the armature using a manufacturing device such as a winding machine, it is possible to reduce the size of the manufacturing device. As a result, the assembly of the armature coil can be easily realized.

The brackets may be provided integrally with the corresponding insulating members by, for example, being embedded in the corresponding insulating members or being bonded to the corresponding insulating members. In addition, it is preferable for the brackets to be made of a material having a higher strength than the insulating members, for example a metal material such as iron or steel.

According to a second solution of the present disclosure, in the above first solution, each of the brackets has a bent portion that is axially bent at an end of the bracket on a radially opposite side to a location where the bracket partially protrudes from the corresponding insulating member.

The bent portion is radially opposed to the corresponding bridging portion covered by the corresponding insulating member.

With the above configuration, each of the brackets has the bent portion formed at the end thereof on the radially opposite side to the protruding side thereof; and the bent portion is radially opposed to the corresponding bridging portion covered by the corresponding insulating member. Consequently, in each of the brackets, the bent portion on the non-protruding side can radially engage with the corresponding bridging portion. On the other hand, the protruding portions of the brackets are mechanically joined to the winding support member. Consequently, the bent portions of the brackets can function as displacement restricting portions to restrict radial displacement of the corresponding bridging portions (thus, the corresponding partial windings). As a result, it becomes possible to suppress radial displacement of the partial windings; thus it becomes possible to suitably maintain the assembled state of the partial windings to the winding support member.

According to a third solution of the present disclosure, in the above second solution, each of the bridging portions of the partial windings is radially bent to axially overlap the winding support member. Each of the insulating members is arranged, at a corresponding one of axial ends of the winding support member, to axially overlap the winding support member. Each of the brackets has the bent portion thereof radially opposed to an inner side of a radially-convex curved part of the corresponding bridging portion.

With the above configuration, it becomes possible to suitably mechanically join the insulating members to the corresponding axial ends of the winding support member.

According to a fourth solution of the present disclosure, in the above second or third solution, each of the brackets is sandwiched between two electrical conductor portions of the corresponding bridging portion which are spaced apart in the circumferential direction.

That is, each of the bridging portions of the partial windings has two electrical conductor portions spaced apart in the circumferential direction (i.e., two electrical conductor portions extending respectively from the pair of intermediate conductor portions of the partial winding to the coil end side). Moreover, each of the brackets is sandwiched between the two electrical conductor portions of the corresponding bridging portion. Consequently, circumferential displacement of the bridging portions of the partial windings can be suppressed by the corresponding brackets. Hence, with the above configuration, it becomes possible to suppress circumferential displacement of the partial windings as well as radial displacement of the partial windings.

According to a fifth solution of the present disclosure, in any of the above second to fourth solutions, each of the insulating members is an insulating cover that surrounds the corresponding bridging portion from both the axial direction and a radial direction. The insulating cover includes a plurality of divided cover members that are mounted to the corresponding bridging portion in the axial direction or in the radial direction. Each of the brackets is provided integrally with one of the divided cover members of the corresponding insulating cover (i.e., the corresponding insulating member) into one piece.

In order to achieve both electrical insulation between the partial windings and electrical insulation between the partial windings and the winding support member at the bridging portions of the partial windings, it is desirable to provide insulating covers in such a manner as to surround the corresponding bridging portions from both the axial direction and the radial direction. In view of the above, according to the fifth solution, each of the insulating covers (i.e., the insulating members) is configured to include a plurality of divided cover members that are mounted to the corresponding bridging portion in the axial direction or in the radial direction. Consequently, it becomes possible to easily mount the insulating covers to the corresponding bridging portions. Moreover, according to the fifth solution, each of the brackets is provided integrally with one of the divided cover members of the corresponding insulating cover (i.e., the corresponding insulating member) into one piece. Consequently, it becomes possible to perform the mounting of the brackets at the same time as the mounting of the divided cover members of the insulating covers. As a result, it becomes possible to suitably provide the insulating covers that surround the entire peripheries of the corresponding bridging portions from both the axial direction and the radial direction.

According to a sixth solution of the present disclosure, in any of the above first to fifth solutions, in each of the partial windings, there is interposed, between the pair of intermediate conductor portions of the partial winding, one of the pair of intermediate conductor portions of another of the partial windings which is of a different phase from the partial winding. All the intermediate conductor portions of the partial windings constituting the phase windings of the armature coil are arranged in a predetermined sequence and in alignment with each other in the circumferential direction. The bridging portions of the partial windings of different phases axially overlap one another at coil ends of the armature coil. For each pair of the insulating members mounted respectively on an axially-overlapping pair of the bridging portions, the protruding portions of the corresponding brackets provided respectively in the pair of the insulating members are arranged to axially overlap each other and together joined to the winding support member by a corresponding one of joining members.

In the armature coil with the above-described configuration, the partial windings are arranged in the circumferential direction so as to partially overlap one another in the circumferential direction; and the bridging portions of the partial windings of different phases axially overlap one another at the coil ends. Moreover, in the insulating members mounted respectively on the corresponding bridging portions of the partial windings, the protruding portions of the brackets, which axially overlap one another, are together joined by the corresponding joining members to the winding support member. Consequently, it becomes possible to easily mount the partial windings of the armature coil to the winding support member. Moreover, by the joining members, heat conduction paths are formed between the bracket and the winding support member. Consequently, it becomes possible to realize a desirable configuration in terms of heat dissipation of the armature coil.

According to a seventh solution of the present disclosure, in the above sixth solution, for each of the partial windings, the bridging portions of the partial winding are arranged to axially overlap the bridging portions of two different ones of the partial windings respectively on one circumferential side and the other circumferential side of the partial winding. The combination of every two of the partial windings together joined to the winding support member by the corresponding joining member at one axial end of the armature coil is different from the combination of every two of the partial windings together joined to the winding support member by the corresponding joining member at the other axial end of the armature coil.

With the above configuration, it becomes possible to minimize the number of locations where the partial windings are joined to the winding support member while connecting every circumferentially-adjacent pair of the partial windings to each other. As a result, it becomes possible to reduce the manufacturing load of the rotating electric machine.

According to an eighth solution of the present disclosure, in the above sixth or seventh solution, each of the brackets located on a same axial side of the winding support member has a boss portion formed in the protruding portion thereof and extending in the axial direction. Each axially-overlapping pair of the brackets located on the same axial side of the winding support member are together joined, with the boss portions of the pair of the brackets abutting each other in the axial direction, to the winding support member by the corresponding joining member inserted through hollow portions of the boss portions.

Consequently, with the boss portions abutting each other in the axial direction, it becomes possible to suitably join the insulating members to the winding support member while keeping the relative axial distance between the insulating members constant.

According to a ninth solution of the present disclosure, in any of the above sixth to eighth solutions, the winding support member has a cooling portion configured to cool the armature coil. Each of the brackets is joined by the corresponding joining member to a corresponding one of axial end faces of the winding support member.

With the above configuration, heat generated in the partial windings can be transmitted to the vicinity of the cooling portion via the brackets. As a result, it becomes possible to improve the performance of cooling the armature coil.

According to a tenth solution of the present disclosure, in the above ninth solution, the winding support member includes: an armature core assembled to a radially inner periphery or a radially outer periphery of the armature coil; and an armature holding member provided on a radially opposite side of the armature core to the armature coil and has the cooling portion formed therein. Each of the brackets is joined by the corresponding joining member to a corresponding one of axial end faces of the armature holding member.

With the above configuration, it becomes unnecessary to fix the joining members to the armature core; thus it becomes unnecessary to form recesses or the like in the armature core for fixing the joining members thereto. As a result, it becomes possible to prevent occurrence of problems such as generation of cogging torque.

According to an eleventh solution of the present disclosure, in the above ninth or tenth solution, the winding support member has a cylindrical portion and a pair of pedestal portions formed respectively at opposite axial ends of the cylindrical portion and each radially extending from the cylindrical portion. Each of the brackets is mechanically joined to a corresponding one of the pedestal portions of the winding support member. The winding support member has, as the cooling portion, a coolant passage formed in an annular shape in the cylindrical portion of the winding support member. The coolant passage is formed in at least one of the pedestal portions as well as in the cylindrical portion of the winding support member.

With the above configuration, heat can be suitably transferred from the brackets to the coolant passage of the winding support member.

According to a twelfth solution of the present disclosure, in any of the above first to tenth solutions, the winding support member has a cylindrical portion and a pair of pedestal portions formed respectively at opposite axial ends of the cylindrical portion and each radially extending from the cylindrical portion. Each of the brackets is mechanically joined to a corresponding one of the pedestal portions of the winding support member.

With the above configuration, it becomes possible to easily secure the joining locations and suitable perform the joining of the brackets to the winding support member. In addition, in the case of the bridging portions of the partial windings being radially bent, the pedestal portions of the winding support member may be configured to extend in the same radial direction as the bridging portions of the partial windings and axially overlap the bridging portions of the partial windings.

BRIEF DESCRIPTION OF THE DRAWINGS

The above-described object, other objects, features and beneficial advantages according to the present disclosure will become more apparent from the following detailed explanation with reference to the accompanying drawings.

In the accompanying drawings.

DESCRIPTION OF EMBODIMENTS

Figure 1:
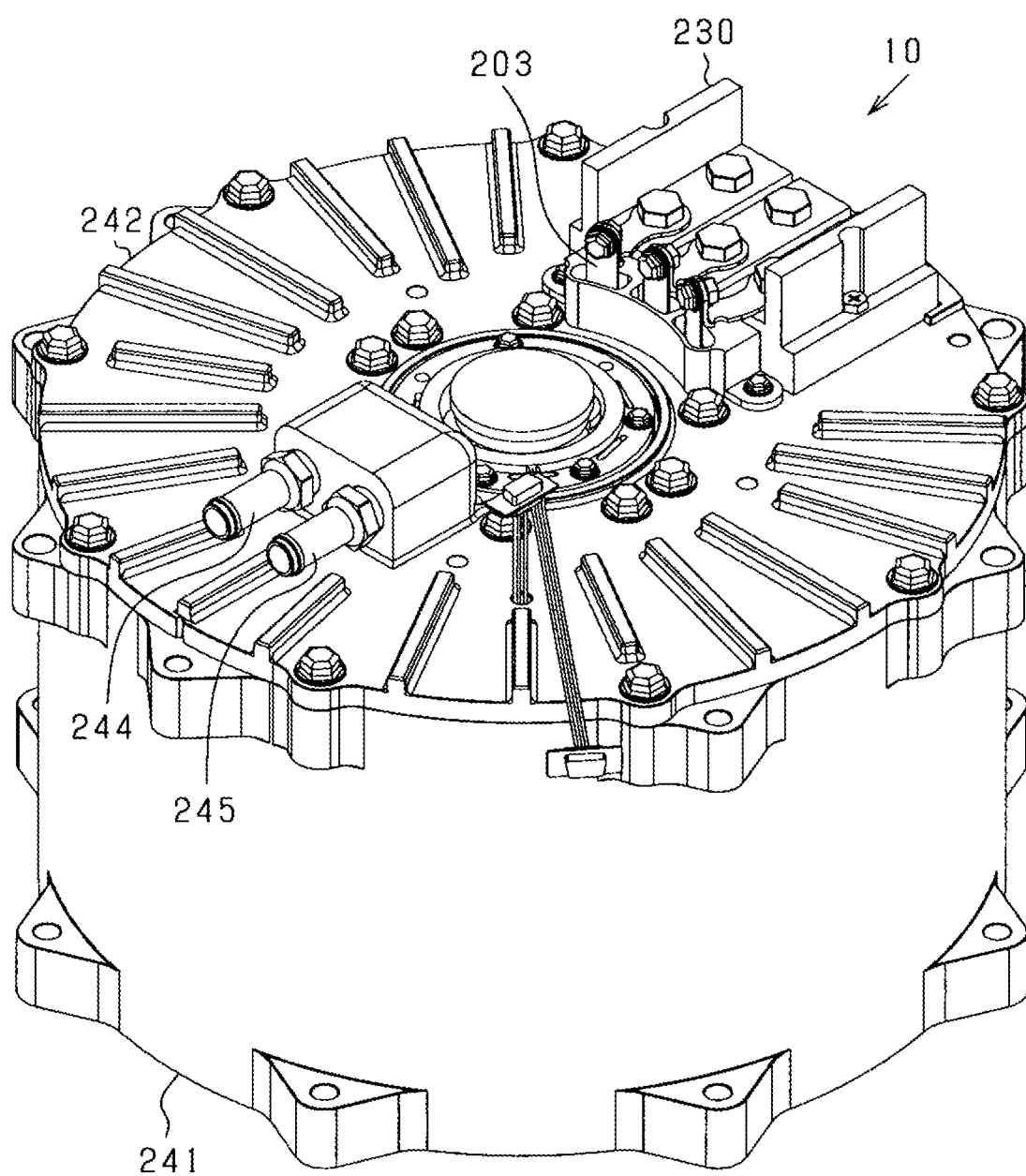
FIG. 1 is a perspective view showing an overview of a rotating electric machine according to a first embodiment.

Embodiments will be described with reference to the drawings. In the embodiments, parts functionally and/or structurally corresponding to each other and/or parts associated with each other will be designated by the same reference signs or by reference signs which are different in the hundreds place from each other. The corresponding parts and/or the associated parts may refer to the explanation of the other embodiments.

Rotating electric machines in the embodiments are configured to be used, for example, as vehicular power sources. However, the rotating electric machines may also be widely used for other applications, such as industrial, automotive, household, office automation and amusement applications. In addition, in the following embodiments, identical or equivalent parts will be designated by the same reference signs in the drawings, and explanation thereof will not be repeated.

First Embodiment

Figure 2:
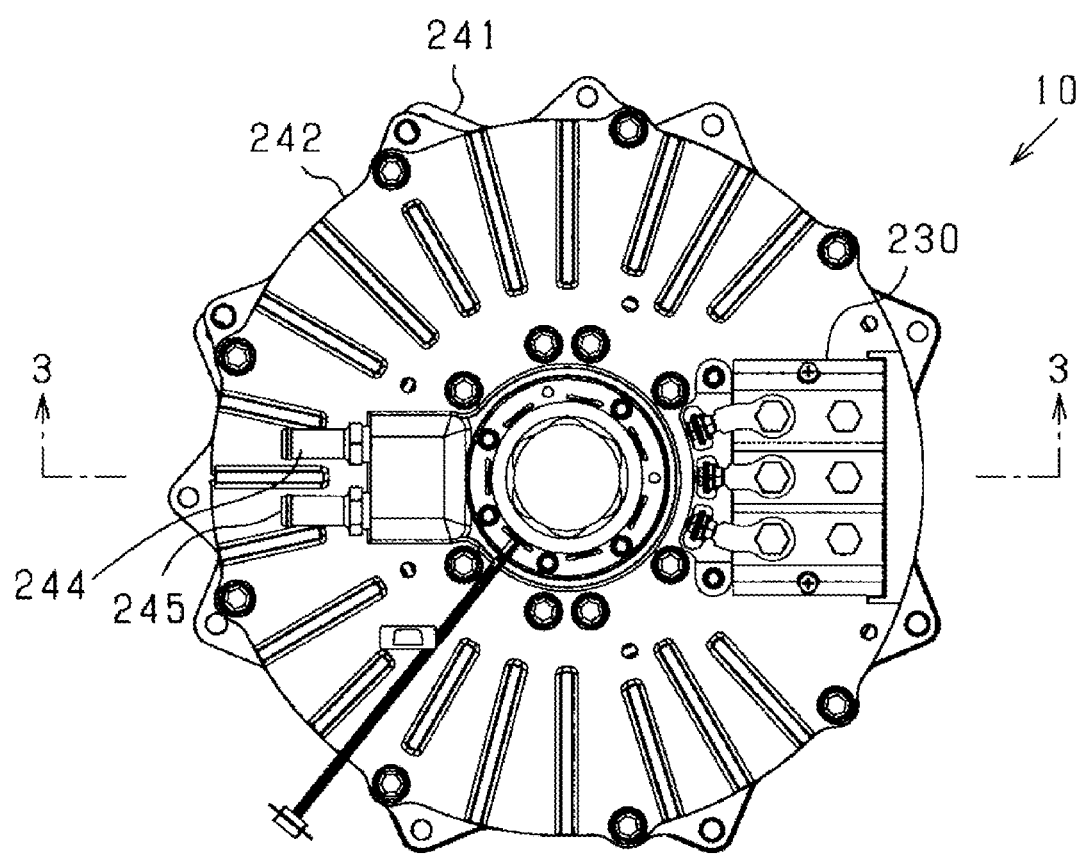
FIG. 2 is a plan view of the rotating electric machine.
Figure 3:
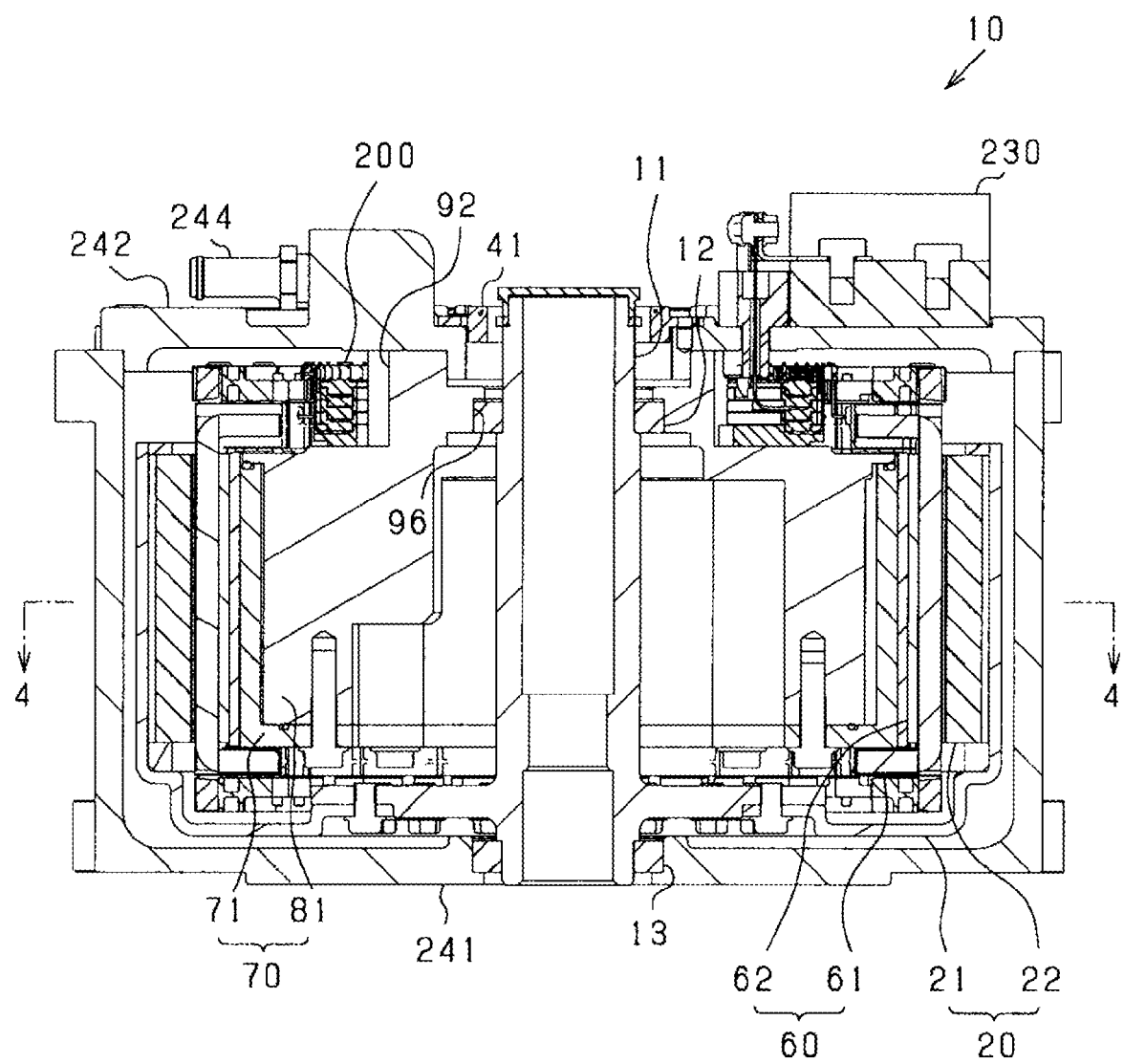
FIG. 3 is a longitudinal cross-sectional view of the rotating electric machine.
Figure 4:
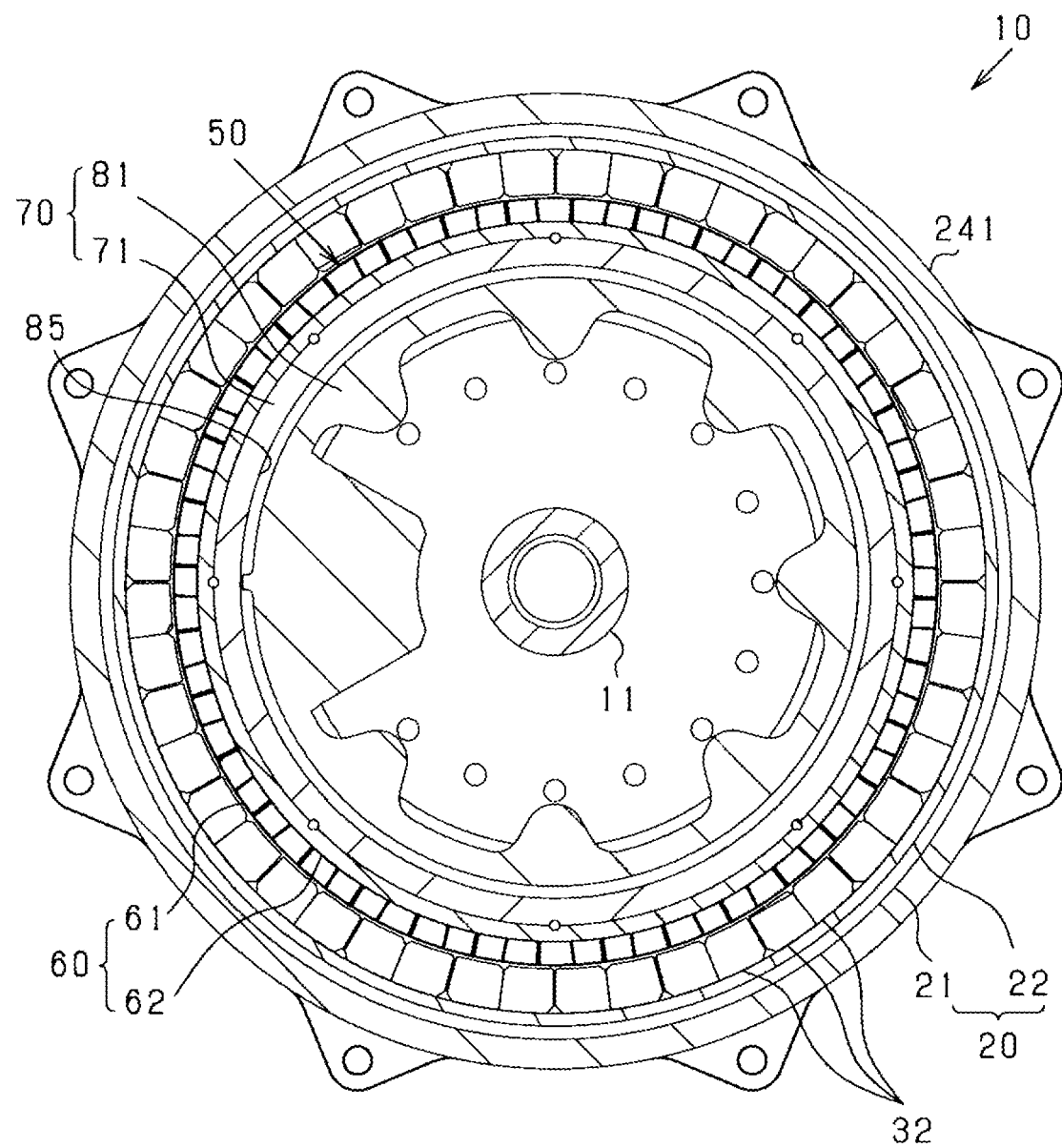
FIG. 4 is a transverse cross-sectional view of the rotating electric machine.
Figure 5:
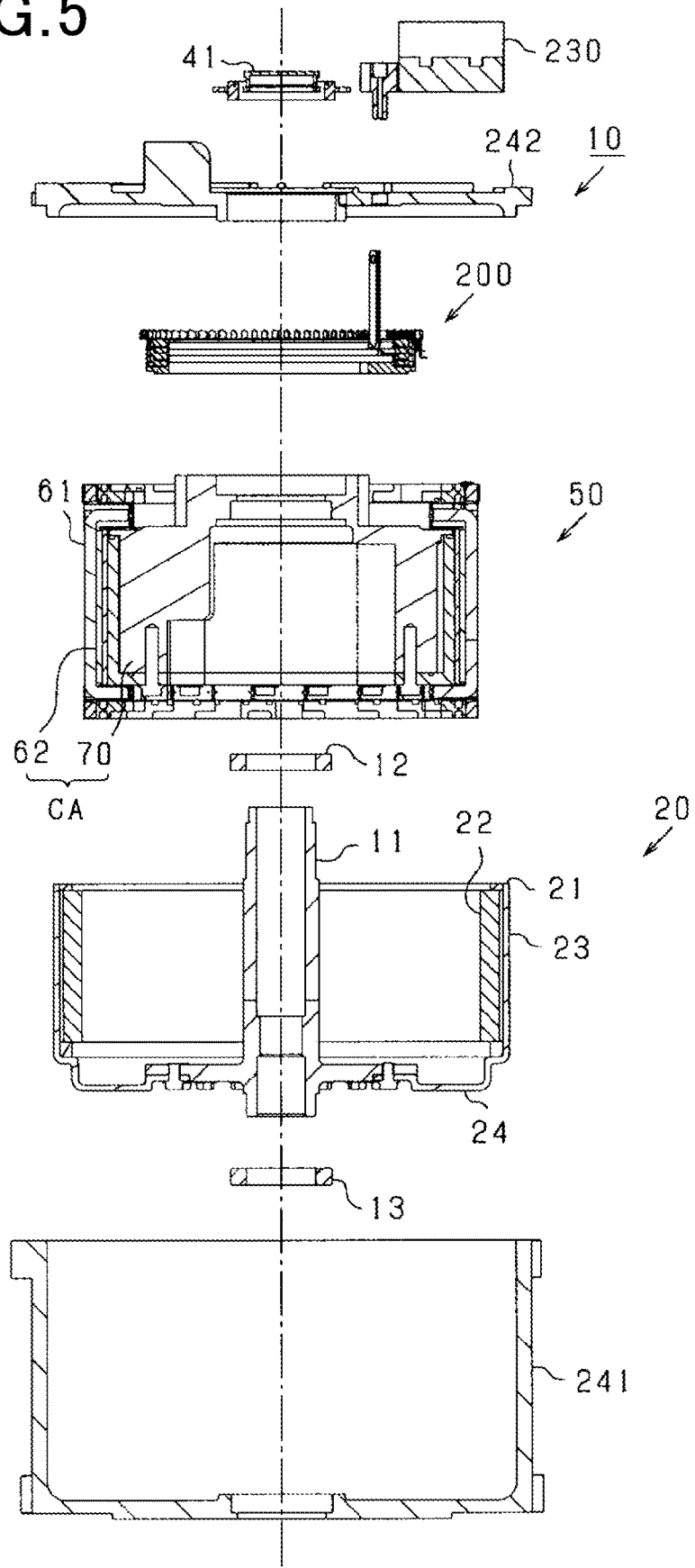
FIG. 5 is an exploded cross-sectional view of the rotating electric machine.

A rotating electric machine 10 according to the present embodiment is a synchronous multi-phase AC motor with an outer rotor structure (i.e., an outer rotating structure). The outline of the rotating electric machine 10 is illustrated in FIGS. 1-5. FIG. 1 is a perspective view showing an overview of the rotating electric machine 10. FIG. 2 is a plan view of the rotating electric machine 10. FIG. 3 is a longitudinal cross-sectional view (i.e., cross-sectional view taken along the line 3-3 in FIG. 2) of the rotating electric machine 10. FIG. 4 is a transverse cross-sectional view (i.e., cross-sectional view taken along the line 4-4 in FIG. 3) of the rotating electric machine 10. FIG. 5 is an exploded cross-sectional view showing components of the rotating electric machine 10 in an exploded manner. In the following explanation, in the rotating electric machine 10, the direction in which a rotating shaft 11 extends will be referred to as the axial direction; the directions extending radially from the center of the rotating shaft 11 will be referred to as the radial directions; and the direction extending along a circle centering on the rotating shaft 11 will be referred to as the circumferential direction.

The rotating electric machine 10 mainly includes a rotating electric machine main body, which is composed of a rotor 20, a stator unit 50 and a busbar module 200, and a housing 241 and a housing cover 242 that are provided to together surround the rotating electric machine main body. These components are each arranged coaxially with the rotating shaft 11 that is provided integrally with the rotor 20. These components are assembled in a predetermined sequence in the axial direction to together constitute the rotating electric machine 10. The rotating shaft 11 is supported by a pair of bearings 12 and 13 provided respectively in the stator unit 50 and the housing 241; and the rotating shaft 11 is rotatable in the supported state. In addition, the bearings 12 and 13 may be implemented by, for example, radial ball bearings each of which includes an inner ring, an outer ring and a plurality of balls disposed between the inner and outer rings. With rotation of the rotating shaft 11, for example, an axle of a vehicle rotates. The rotating electric machine 10 can be mounted to the vehicle by fixing the housing 241 to a vehicle body frame or the like.

In the rotating electric machine 10, the stator unit 50 is provided so as to surround the rotating shaft 11; and the rotor 20 is arranged radially outside the stator unit 50. The stator unit 50 includes a stator 60 and a stator holder 70 assembled to the radially inner periphery of the stator 60. The rotor 20 and the stator 60 are radially opposed to each other with an air gap formed therebetween. The rotor 20 rotates, along with the rotating shaft 11, on the radial outer side of the stator 60. In the present embodiment, the rotor 20 functions as a "field system" and the stator 60 functions as an "armature".

Figure 6:
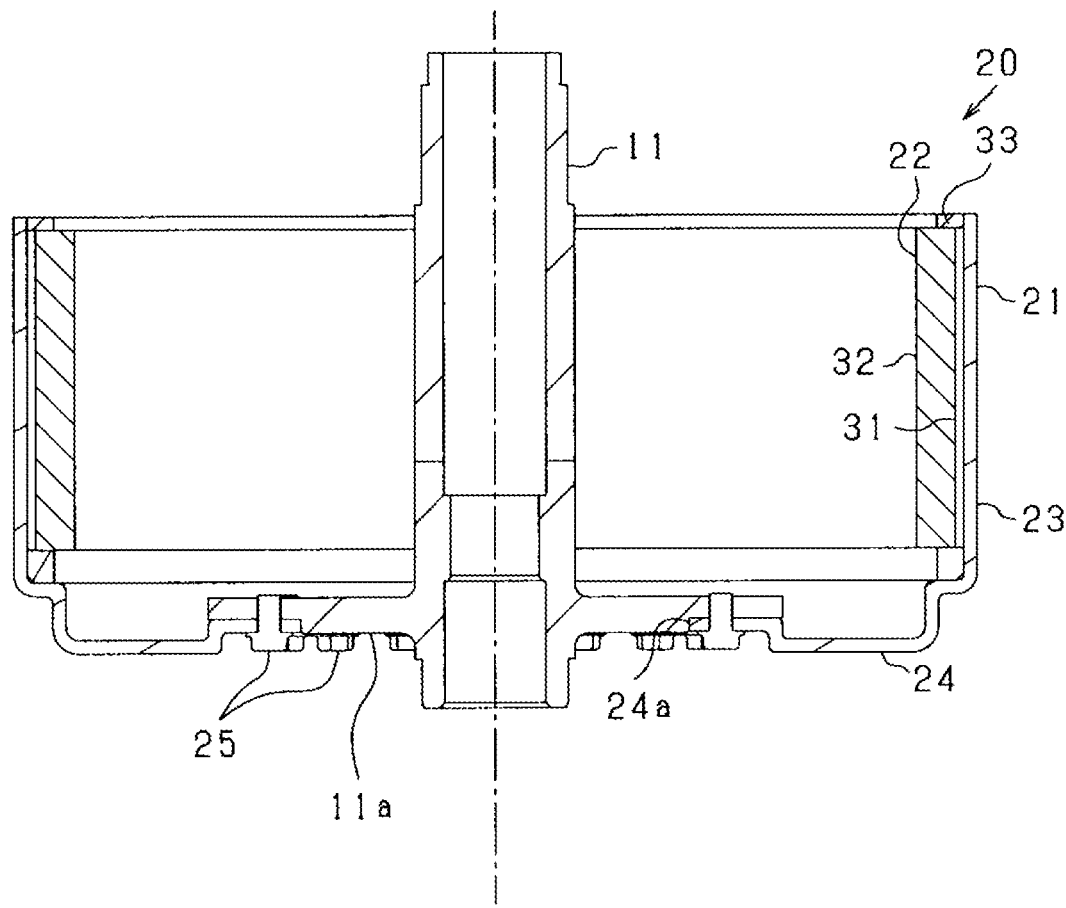
FIG. 6 is a cross-sectional view of a rotor of the rotating electric machine.

FIG. 6 is a longitudinal cross-sectional view of the rotor 20. As shown in FIG. 6, the rotor 20 has a substantially cylindrical rotor carrier 21 and an annular magnet unit 22 fixed to the rotor carrier 21. The rotor carrier 21 has a cylindrical portion 23 and an end plate portion 24 provided at one axial end of the cylindrical portion 23. The cylindrical portion 23 and the end plate portion 24 are integrally formed to together constitute the rotor carrier 21. The rotor carrier 21, which functions as a magnet holding member, has the magnet unit 22 fixed in an annular shape on the radially inner side of the cylindrical portion 23. In a central part of the end plate portion 24, there is formed a through-hole 24a. The rotating shaft 11 is fixed, in a state of being inserted in the through-hole 24a, to the end plate portion 24 by fasteners 25 such as bolts. More specifically, the rotating shaft 11 has a flange 11a formed to extend in a direction intersecting (or perpendicular to) the axial direction. The rotating shaft 21 is fixed to the rotor carrier 21 with the flange 11a of the rotating shaft 11 in surface contact with the end plate portion 24 of the rotor carrier 21.

The magnet unit 22 includes a cylindrical magnet holder 31, a plurality of magnets 32 fixed on an inner circumferential surface of the magnet holder 31, and an end plate 33 fixed on the opposite axial side of the magnet holder 31 and the magnets 32 to the end plate portion 24 of the rotor carrier 21. The magnet holder 31 has the same axial length as the magnets 32. The magnets 32 are provided so as to be surrounded by the magnet holder 31 from the radially outer side. The magnet holder 31 and the magnets 32 are fixed so as to abut, at ends thereof on one axial side, the end plate 33. In addition, the magnet unit 22 corresponds to a "magnet section".

Figure 7:
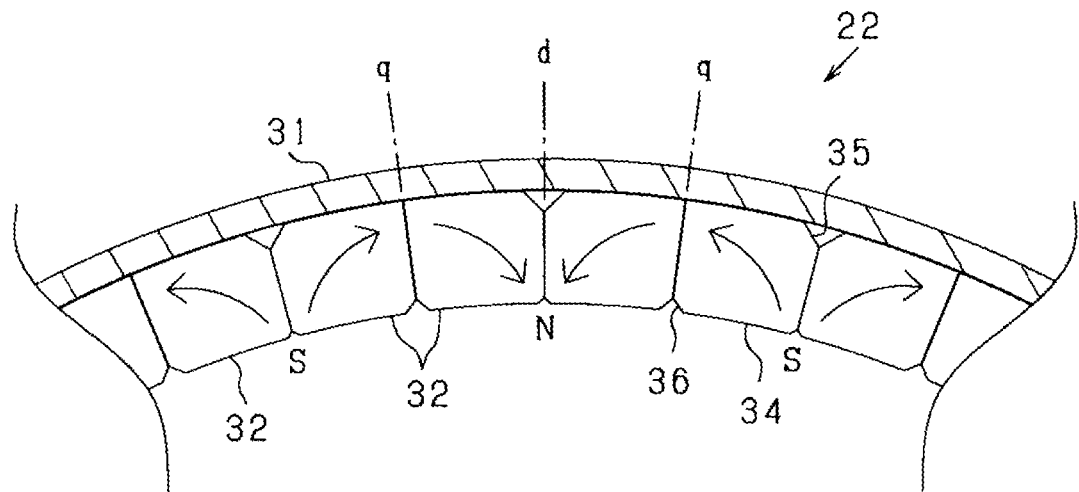
FIG. 7 is a transverse partial cross-sectional view illustrating the cross-sectional structure of a magnet unit of the rotor.

FIG. 7 is a transverse partial cross-sectional view illustrating the cross-sectional structure of the magnet unit 22. In FIG. 7, the orientation of easy axes of magnetization of the magnets 32 is indicated by arrows.

In the magnet unit 22, the magnets 32 are provided in alignment with each other in the circumferential direction of the rotor 20 so as to have their polarities alternately changing in the circumferential direction. Consequently, in the magnet unit 22, there are formed a plurality of magnetic poles along the circumferential direction. The magnets 32 are polar anisotropic permanent magnets. Moreover, the magnets 32 are implemented by sintered neodymium magnets whose intrinsic coercive force is higher than or equal to 400 [kA/m] and residual flux density Br is higher than or equal to 1.0[T].

Radially inner peripheral surfaces of the magnets 32 constitute magnetic flux acting surfaces 34 through which magnetic flux flows into or out of the magnets 32. Moreover, in the magnets 32, the orientation of the easy axes of magnetization on the d-axis side (or in the d-axis-side parts) is different from the orientation of the easy axes of magnetization on the q-axis side (or in the q-axis-side parts). On the d-axis side, the easy axes of magnetization are oriented to be parallel to the d-axis. In contrast, on the q-axis side, the easy axes of magnetization are oriented to be perpendicular to the q-axis. Consequently, depending on the change in the orientation of the easy axes of magnetization, arc-shaped magnet magnetic paths are formed in the magnets 32. In short, the magnets 32 are configured to have the easy axes of magnetization oriented such that the easy axes of magnetization are more parallel to the d-axis on the d-axis side than on the q-axis side; the d-axis represents the centers of the magnetic poles while the q-axis represents the boundaries between the magnetic poles.

In the magnets 32, since the magnet magnetic paths are arc-shaped, the magnet magnetic paths become longer than the radial thickness of the magnets 32. Consequently, the permeance of the magnets 32 is increased, thereby making it possible to exert, without changing the volume of the magnets 32, the same ability as magnets having a larger volume than the magnets 32.

Each of the magnetic poles is formed of a circumferentially-adjacent pair of the magnets 32. That is, the magnets 32, which are circumferentially aligned in the magnet unit 22, have division surfaces at both the d-axis positions and the q-axis positions. The magnets 32 are arranged in contact with or in close proximity to each other. Moreover, the magnets 32 have the arc-shaped magnet magnetic paths as described above. At the q-axis, the N pole and the S pole of circumferentially-adjacent magnets 32 face each other. Consequently, it becomes possible to improve the permeance in the vicinity of the q-axis. Moreover, every two magnets 32 arranged with the q-axis interposed therebetween attract each other and thus can be kept in contact with each other. Such an arrangement also contributes to improvement of the permeance.

Figure 8:
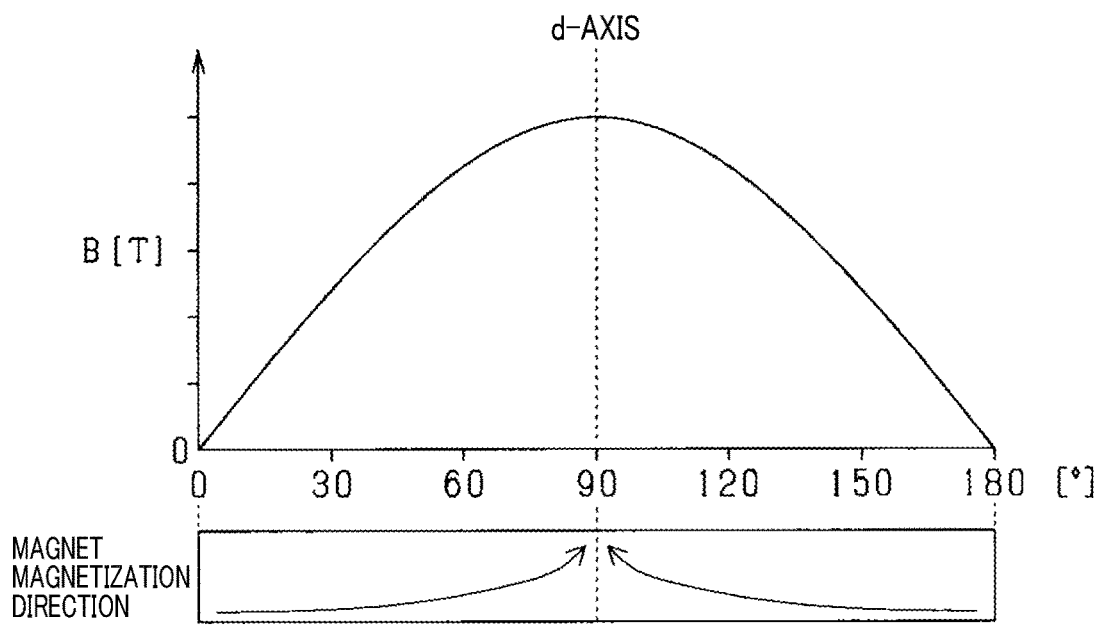
FIG. 8 is a diagram illustrating the relationship between electrical angle and magnetic flux density in magnets of the first embodiment.
Figure 9:
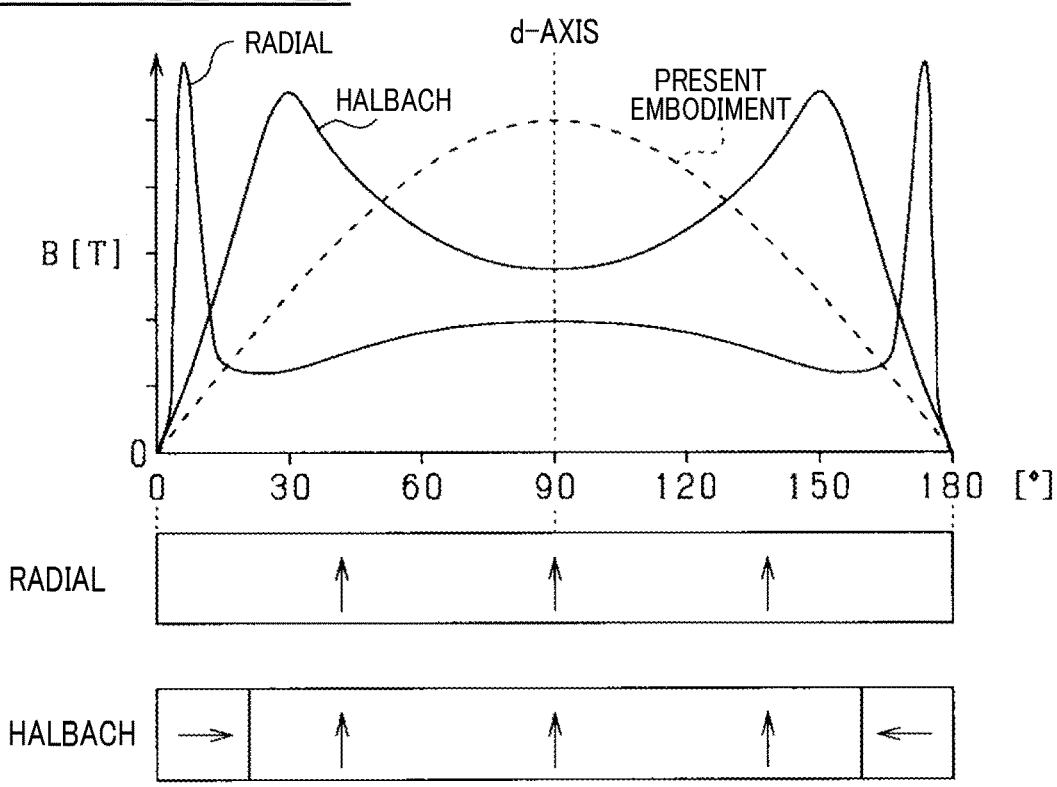
FIG. 9 is a diagram illustrating the relationship between electrical angle and magnetic flux density in magnets of comparative examples.

In the magnet unit 22, magnetic flux flows along the arc-shaped magnet magnetic paths between the adjacent N and S poles, i.e., between the adjacent magnets 32. Therefore, the magnet magnetic paths are lengthened in comparison with the case of employing, for example, radial anisotropic magnets. Consequently, as shown in FIG. 8, the magnetic flux density distribution becomes approximate to a sine wave. As a result, as shown in FIG. 9, unlike the magnetic flux density distribution in a comparative example where radial anisotropic magnets are employed, it becomes possible to concentrate magnetic flux on the magnetic pole center side, thereby increasing the torque of the rotating electric machine 10. Moreover, it can be seen from FIG. 9 that the magnetic flux density distribution in the magnet unit 22 according to the present embodiment is also different from the magnetic flux density distribution in a comparison example where magnets are arranged in a conventional Halbach array. In addition, in each of FIGS. 8 and 9, the horizontal axis represents electrical angle and the vertical axis represents magnetic flux density; 90° on the horizontal axis represents the d-axis (i.e., the magnetic pole center) and 0° and 180° on the horizontal axis represent the q-axis.

Accordingly, with the configuration of the magnets 32 according to the present embodiment, in the magnet unit 22, the magnet magnetic flux on the d-axis is intensified and the magnetic flux change in the vicinity of the q-axis is suppressed. Consequently, it becomes possible to suitably realize the magnet unit 22 where the surface magnetic flux gradually changes from the q-axis to the d-axis in each of the magnetic poles.

The sine wave matching percentage of the magnetic flux density distribution may be, for example, 40% or higher. In this case, it is possible to reliably increase the amount of magnetic flux at the central portion of the waveform in comparison with the case of employing radial-oriented magnets and the case of employing parallel-oriented magnets. In the case of employing radial-oriented magnets, the sine wave matching percentage is about 30%. Moreover, setting the sine wave matching percentage to be higher than or equal to 60%, it is possible to reliably increase the amount of magnetic flux at the central portion of the waveform in comparison with the case of employing magnets arranged in a magnetic flux concentration array such as a Halbach array.

As shown in FIG. 9, in the comparative example where radial anisotropic magnets are employed, the magnetic flux density changes sharply in the vicinity of the q-axis. The sharp change in the magnetic flux density causes the amount of eddy current generated in a stator coil 61 of the stator 60 to increase; the stator coil 61 will be described in detail later. Moreover, the magnetic flux on the stator coil 61 side also changes sharply. In contrast, in the present embodiment, the waveform of the magnetic flux density distribution is approximate to a sine wave. Consequently, the change in the magnetic flux density in the vicinity of the q-axis is gentler than in the comparative example where radial anisotropic magnets are employed. As a result, it becomes possible to suppress generation of eddy current in the stator coil 61.

In the magnets 32, there are formed recesses 35 in the radially outer peripheral surfaces of the magnets 32 within a predetermine range including the d-axis; and there are formed recesses 36 in the radially inner peripheral surfaces of the magnets 32 within a predetermined range including the q-axis. Specifically, with the orientation of the easy axes of magnetization of the magnets 32 according to the present embodiment, on the radially outer peripheral surfaces of the magnets 32, the magnet magnetic paths are shortened in the vicinity of the d-axis; on the radially inner peripheral surfaces of the magnets 32, the magnet magnetic paths are shortened in the vicinity of the q-axis. Therefore, in consideration of the fact that it is difficult to generate sufficient magnet magnetic flux at those locations in the magnets 32 where the magnet magnetic paths are short, the magnets 32 are cut off at those locations where the magnet magnetic flux is weak.

In addition, the magnet unit 22 may alternatively be configured so that the number of the magnets 32 is equal to the number of the magnetic poles. For example, each of the magnets 32 may be provided between the centers of a circumferentially-adjacent pair of the magnetic poles; the centers of the magnetic poles are represented by the d-axis. In this case, the q-axis is located at the circumferential center in each of the magnets 32; and the magnets 32 have division surfaces only at the d-axis positions. Moreover, instead of the q-axis, the d-axis may be located at the circumferential center in each of the magnets 32. Furthermore, instead of the configurations where the number of the magnets 32 is twice or equal to the number of the magnetic poles, a configuration may be employed where there is provided only an annular magnet in the magnet unit 22.

As shown in FIG. 3, a resolver 41, which is a rotation angle sensor, is provided on an end portion (i.e., upper end portion in the FIG. 3) of the rotating shaft 11 on the opposite side to the location where the rotor carrier 21 is joined to the rotating shaft 11. The resolver 41 includes a resolver rotor fixed on the rotating shaft 11 and a resolver stator arranged radially outside the resolver rotor to face the resolver rotor. The resolver rotor is annular plate-shaped and has the rotating shaft 11 inserted therein so as to be coaxial with the rotating shaft 11. The resolver stator includes a stator core and a stator coil and is fixed to the housing cover 242.

Figure 10:
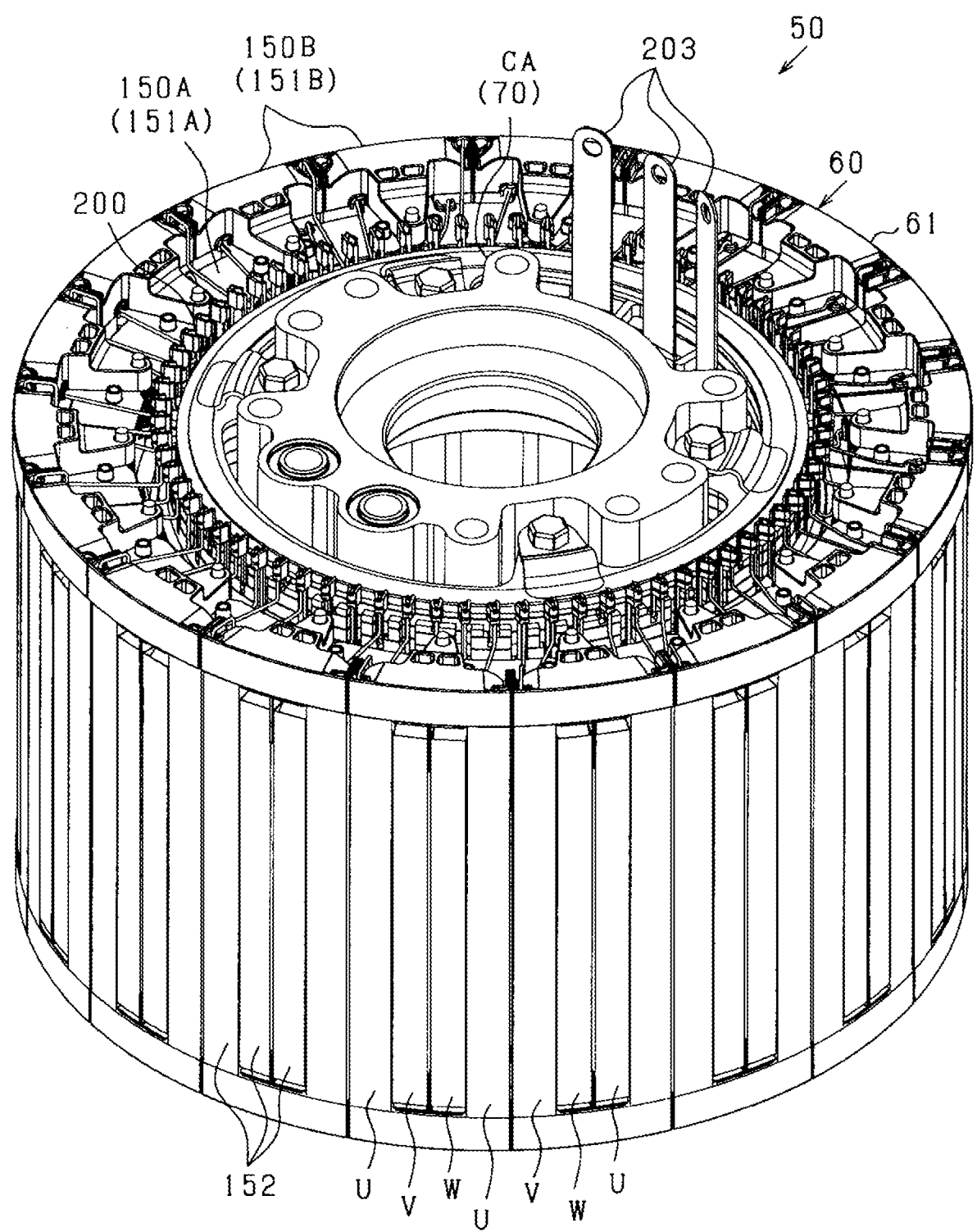
FIG. 10 is a perspective view of a stator unit of the rotating electric machine.
Figure 11:
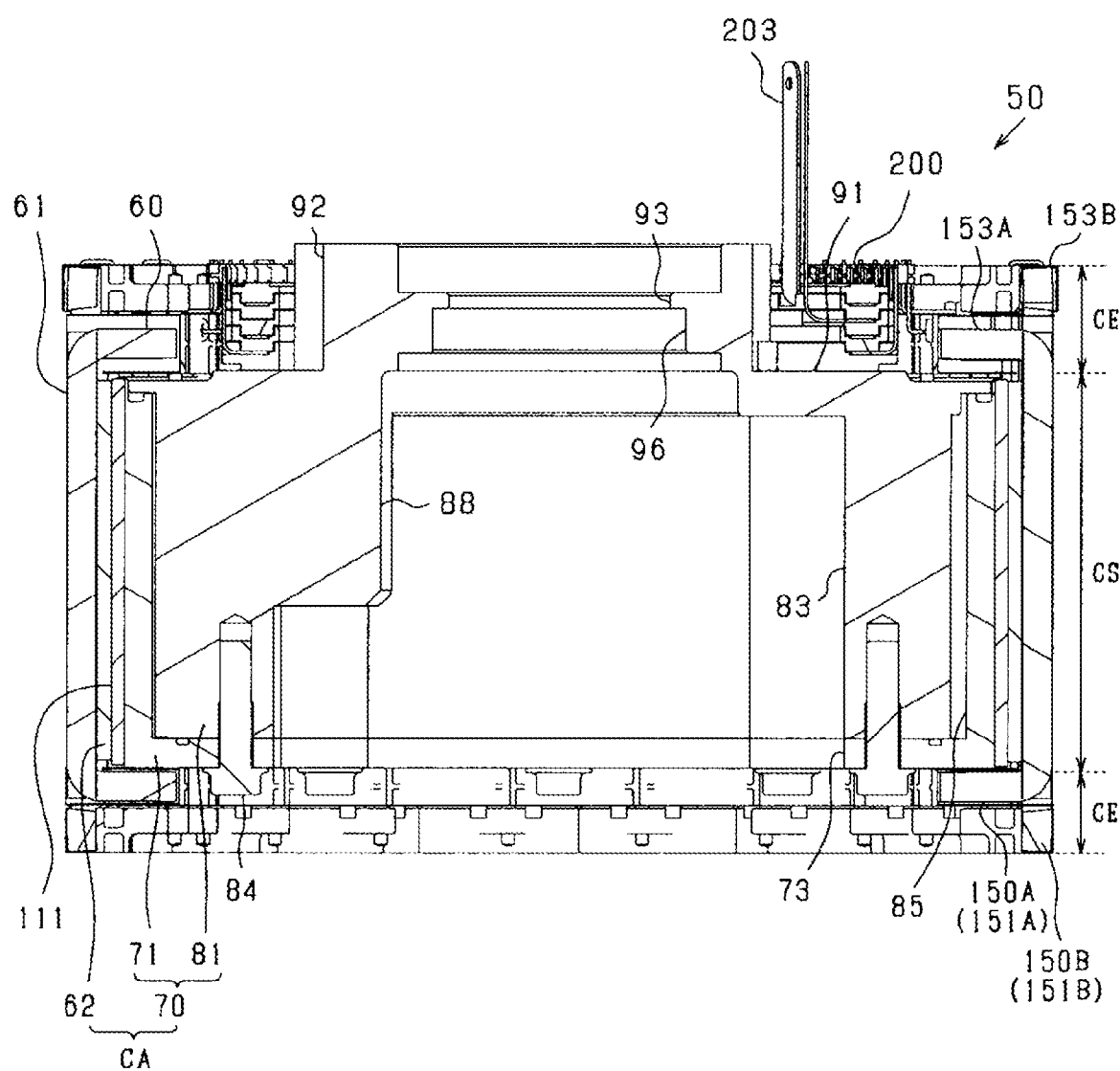
FIG. 11 is a longitudinal cross-sectional view of the stator unit.

Next, the configuration of the stator unit 50 will be described. FIG. 10 is a perspective view of the stator unit 50. FIG. 11 is a longitudinal cross-sectional view of the stator unit 50, which is taken at the same position as FIG. 3.

The stator unit 50 includes the stator 60 and the stator holder 70 arranged radially inside the stator 60. Further, the stator 60 includes the aforementioned stator coil 61 and a stator core 62. Moreover, the stator core 62 and the stator holder 70 are integrated into a core assembly CA. To the core assembly CA, there are assembled a plurality of partial windings 151 which constitute the stator coil 61. In addition, in the present modification, the stator coil 61 corresponds to an "armature coil"; the stator core 62 corresponds to an "armature core"; the stator holder 70 corresponds to an "armature holding member"; and the core assembly CA corresponds to a "support member".

Figure 12:
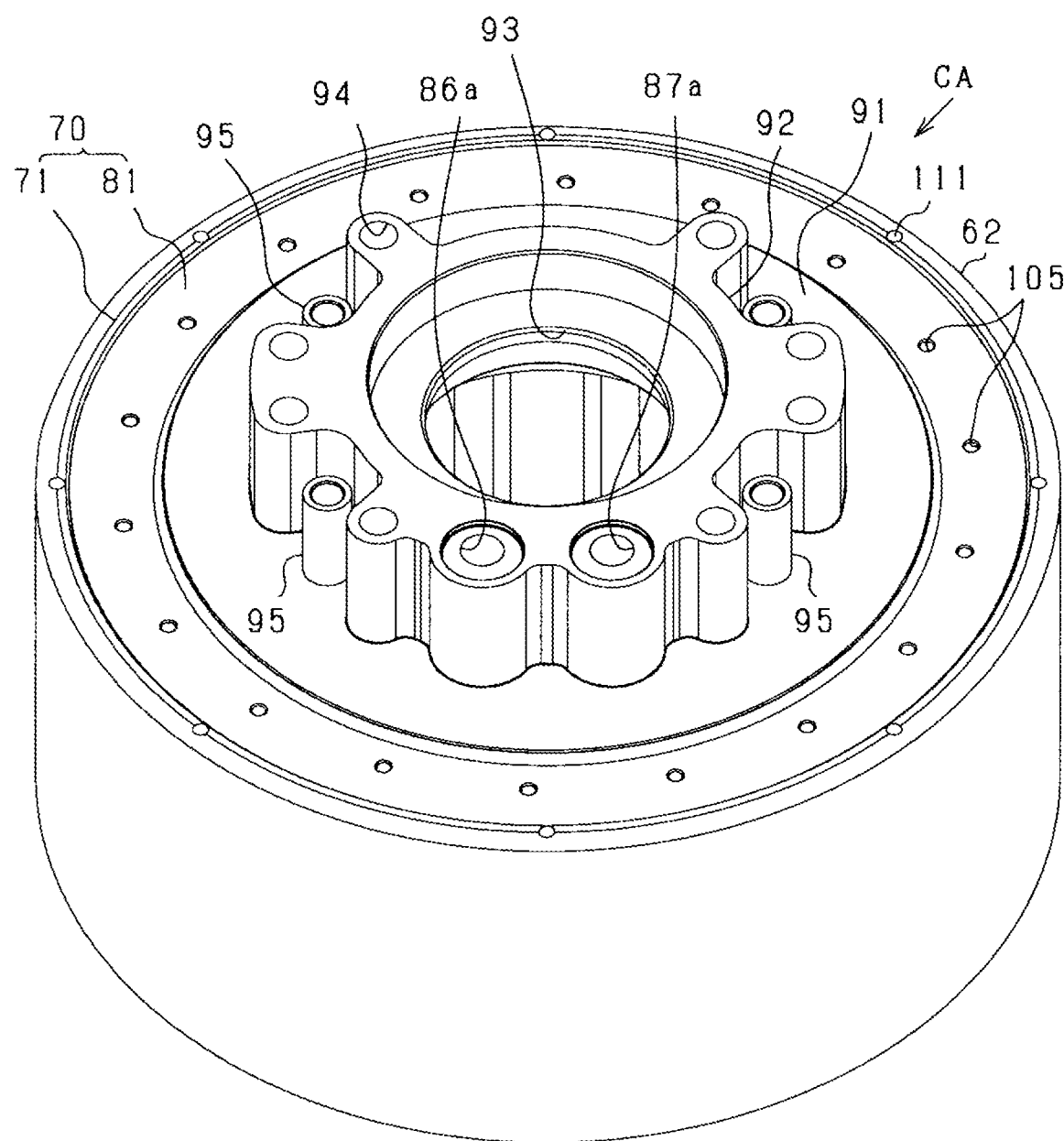
FIG. 12 is a perspective view, from one axial side, of a core assembly of the stator unit.
Figure 13:
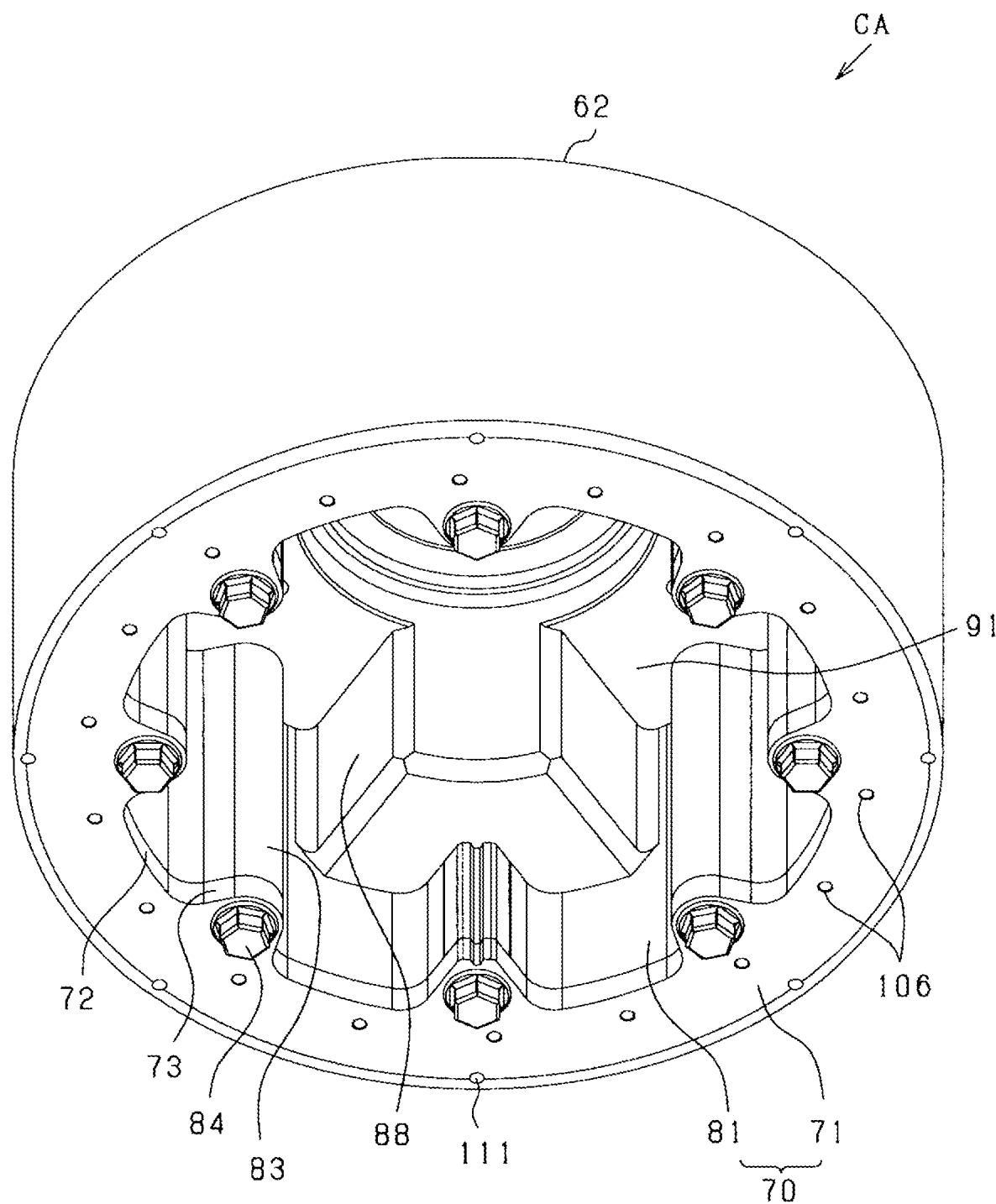
FIG. 13 is a perspective view, from the other axial side, of the core assembly.
Figure 14:
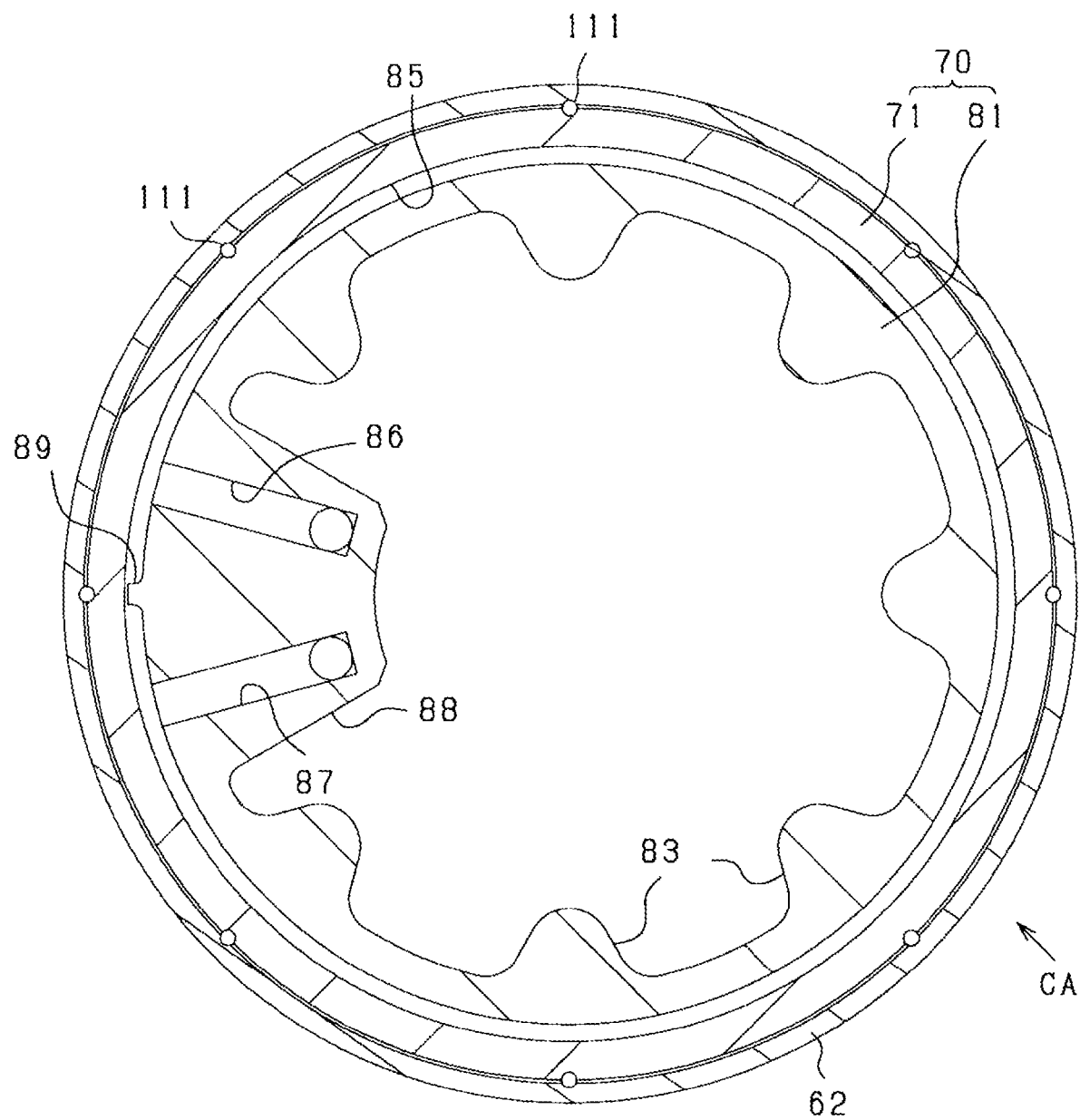
FIG. 14 is a transverse cross-sectional view of the core assembly.
Figure 15:
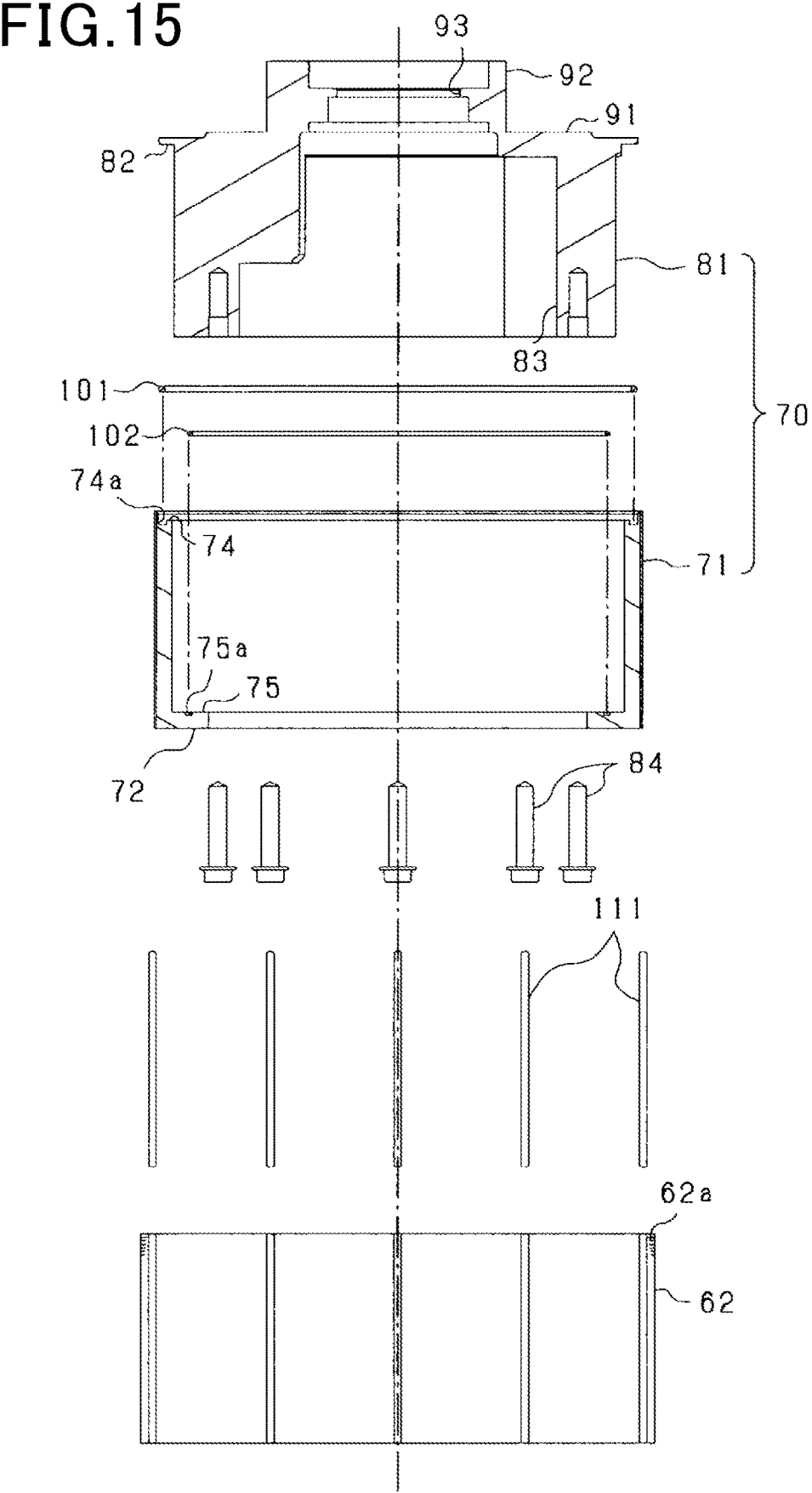
FIG. 15 is an exploded cross-sectional view of the core assembly.

First, the core assembly CA will be described. FIG. 12 is a perspective view, from one axial side, of the core assembly CA. FIG. 13 is a perspective view, from the other axial side, of the core assembly CA. FIG. 14 is a transverse cross-sectional view of the core assembly CA. FIG. 15 is an exploded cross-sectional view of the core assembly CA.

As described above, the core assembly CA is composed of the stator core 62 and the stator holder 70 assembled to the radially inner periphery of the stator core 62. In other words, the stator core 62 is integrally assembled to the outer circumferential surface of the stator holder 70.

The stator core 62 is constituted of a core sheet laminate in which a plurality of core sheets 62a are laminated in the axial direction; the core sheets 62a are formed of a magnetic material such as a magnetic steel sheet. The stator core 62 has a cylindrical shape with a predetermined radial thickness. The stator coil 61 is provided on the radially outer side (i.e., the rotor 20 side) of the stator core 62. The stator core 62 has an outer circumferential surface that is a curved surface without unevenness. The stator core 62 functions as a back yoke. The stator core 62 is obtained by axially laminating the core sheets 62a that are formed, for example by blanking, into an annular shape. In addition, the stator core 62 may alternatively have a helical core structure. In this case, the cylindrical stator core 62 may be obtained by annularly winding a strip of core sheet while laminating the annularly-wound turns of the strip in the axial direction.

In the present embodiment, the stator 60 has a slot-less structure without teeth for forming slots. Moreover, the stator 60 may have any of the following configurations (A)-(C).

(A) In the stator 60, inter-conductor members are provided between the electrical conductor sections (i.e., intermediate conductor portions 152 to be described later) in the circumferential direction. The inter-conductor members are formed of a magnetic material satisfying the following relationship: $Wt \times Bs \leq Wm \times Br$, where Wt is the circumferential width of the inter-conductor members in each magnetic pole, Bs is the saturation flux density of the inter-conductor members, Wm is the circumferential width of the magnets 32 in each magnetic pole and Br is the residual flux density of the magnets 32.

(B) In the stator 60, inter-conductor members are provided between the electrical conductor sections (i.e., the intermediate conductor portions 152) in the circumferential direction. The inter-conductor members are formed of a nonmagnetic material.

(C) In the stator 60, no inter-conductor members are provided between the electrical conductor sections (i.e., the intermediate conductor portions 152) in the circumferential direction.

As shown in FIG. 15, the stator holder 70 includes an outer cylinder member 71 and an inner cylinder member 81, which are assembled together with the outer cylinder member 71 located on the radially outer side and the inner cylinder member 81 located on the radially inner side. Each of these members 71 and 81 may be formed of a metal, such as aluminum or cast iron, or Carbon Fiber-Reinforced Plastic (CFRP).

The outer cylinder member 71 is a hollow cylindrical member having both an outer circumferential surface and an inner circumferential surface formed as perfect cylindrical surfaces. At one axial end of the outer cylinder member 71, there is formed an annular flange 72 that extends radially inward. Moreover, on the radially inner periphery of the flange 72, there are formed, at predetermined intervals in the circumferential direction, a plurality of protrusions 73 extending radially inward (see FIG. 13). Furthermore, at one axial end and the other axial end of the outer cylinder member 71, there are respectively formed facing surfaces 74 and 75 each of which faces the inner cylinder member 81 in the axial direction. Further, in the facing surfaces 74 and 75, there are respectively formed annular grooves 74a and 75a each of which extends in an annular shape.

The inner cylinder member 81 is a hollow cylindrical member having an outer diameter smaller than the inner diameter of the outer cylinder member 71. The inner cylinder member 81 has an outer circumferential surface formed as a perfect cylindrical surface concentric with the outer cylinder member 71. At one axial end of the inner cylinder member 81, there is formed an annular flange 82 that extends radially outward. The inner cylinder member 81 is assembled to the outer cylinder member 71 so as to abut both the facing surfaces 74 and 75 of the outer cylinder member 71 in the axial direction. As shown in FIG. 13, the outer cylinder member 71 and the inner cylinder member 81 are assembled to each other by fasteners 84 such as bolts. Specifically, on the radially inner periphery of the inner cylinder member 81, there are formed, at predetermined intervals in the circumferential direction, a plurality of protrusions 83 extending radially inward. The protrusions 73 of the outer cylinder member 71 and the protrusions 83 of the inner cylinder member 81 are fastened together by the fasteners 84 with the protrusions 73 superposed respectively on axial end faces of the protrusions 83.

As shown in FIG. 14, after the outer cylinder member 71 and the inner cylinder member 81 are assembled to each other, there is an annular gap formed between the inner circumferential surface of the outer cylinder member 71 and the outer circumferential surface of the inner cylinder member 81. The annular gap constitutes a coolant passage 85 through which coolant such as cooling water flows. The coolant passage 85 is formed in an annular shape along the circumferential direction of the stator holder 70. More specifically, on the radially inner periphery of the inner cylinder member 81, there is formed a passage forming portion 88 that protrudes radially inward. In the passage forming portion 88, there are formed both an inlet-side passage 86 and an outlet-side passage 87. Each of these passages 86 and 87 opens on the outer circumferential surface of the inner cylinder member 81. Moreover, on the outer circumferential surface of the inner cylinder member 81, there is formed a partition portion 89 that partitions the coolant passage 85 into an inlet-side part and an outlet-side part. Consequently, the coolant flowing in from the inlet-side passage 86 flows through the coolant passage 85 in the circumferential direction, and then flows out from the outlet-side passage 87.

Each of the inlet-side passage 86 and the outlet-side passage 87 has one end portion extending radially to open on the outer circumferential surface of the inner cylinder member 81 and the other end portion extending axially to open on an axial end face of the inner cylinder member 81. In FIG. 12, there are shown both an inlet opening 86a leading to the inlet-side passage 86 and an outlet opening 87a leading to the outlet-side passage 87. In addition, the inlet-side passage 86 and the outlet-side passage 87 communicate respectively with an inlet port 244 and an outlet port 245 (see FIG. 1) both of which are mounted to the housing cover 242; the coolant flows in and flows out through these ports 244 and 245.

At the joint portions between the outer cylinder member 71 and the inner cylinder member 81, there are respectively provided sealing members 101 and 102 (see FIG. 15) to suppress leakage of the coolant from the coolant passage 85. Specifically, the sealing members 101 and 102 may be implemented by, for example, O-rings. The sealing members 101 and 102 are received respectively in the annular grooves 74a and 75a of the outer cylinder member 71 and kept in a state of being compressed between the outer cylinder member 71 and the inner cylinder member 81.

As shown in FIG. 12, the inner cylinder member 81 has an end plate portion 91 at one axial end thereof. On the end plate portion 91, there is formed a hollow cylindrical boss portion 92 that extends in the axial direction. The boss portion 92 is formed so as to surround an insertion hole 93 through which the rotating shaft 11 is inserted inside the inner cylinder member 81. In the boss portion 92, there are formed a plurality of fastening portions 94 for fixing the housing cover 242. Moreover, on the end plate portion 91, there are formed, on the radially outer side of the boss portion 92, a plurality of pillar portions 95 that extend in the axial direction. As will be described in detail later, the pillar portions 95 serve as fixing portions for fixing the busbar module 200. Furthermore, the boss portion 92 serves as a bearing holding member for holding the bearing 12. Specifically, the bearing 12 is fixed to a bearing fixing portion 96 formed on the radially inner periphery of the boss portion 92 (see FIG. 3).

As shown in FIGS. 12 and 13, in the outer cylinder member 71 and the inner cylinder member 81, there are formed recesses 105 and 106 for fixing a plurality of coil modules 150 which will be described later.

Specifically, as shown in FIG. 12, on an axial end face of the inner cylinder member 81, more specifically, on an axially-outer end face of the end plate portion 91 around the boss portion 92, there are formed a plurality of recesses 105 at equal intervals in the circumferential direction. Moreover, as shown in FIG. 13, on an axial end face of the outer cylinder member 71, more specifically, on an axially-outer end face of the flange 72, there are formed a plurality of recesses 106 at equal intervals in the circumferential direction. Furthermore, the recesses 105 are formed so as to be aligned on an imaginary circle concentric with the core assembly CA; and the recesses 106 are also formed so as to be aligned on an imaginary circle concentric with the core assembly CA. In addition, the recesses 105 are formed at the same circumferential positions as the recesses 106; the intervals between the recesses 105 are equal to the intervals between the recesses 106; and the number of the recesses 105 is equal to the number of the recesses 106.

In order to secure the assembly strength, the stator core 62 is assembled to the stator holder 70 with a radial compressive force induced with respect to the stator holder 70. Specifically, the stator core 62 is fixedly fitted, by shrink fitting or press fitting, to the stator holder 70 with a predetermined interference therebetween. In other words, the stator core 62 and the stator holder 70 are assembled together with a radial stress induced by one of them to the other. Moreover, the torque of the rotating electric machine 10 may be increased by, for example, increasing the outer diameter of the stator 60. In this case, the tightening force of the stator core 62 is increased to strengthen the joining of the stator core 62 to the stator holder 70. However, with increase in the compressive stress (in other words, the residual stress) of the stator core 62, the stator core 62 may become damaged.

In view of the above, in the present embodiment, in the configuration where the stator core 62 and the stator holder 70 are fixedly fitted to each other with the predetermined interference therebetween, there are provided restricting members between portions of the stator core 62 and the stator holder 70 radially facing each other. The restricting members engage with the stator core 62 in the circumferential direction, thereby restricting circumferential displacement of the stator core 62. Specifically, as shown in FIGS. 12-14, a plurality of engaging members 111, which constitute the restricting members, are radially interposed between the stator core 62 and the outer cylinder member 71 of the stator holder 70 and arranged at predetermined intervals in the circumferential direction. Consequently, with the engaging members 111, it becomes possible to suppress relative displacement between the stator core 62 and the stator holder 70 in the circumferential direction. In addition, in this case, recesses may be formed in at least one of the stator core 62 and the outer cylinder member 71; and the engaging members 111 may be respectively fitted in the recesses to engage with them. Alternatively, instead of the engaging members 111, protrusions may be formed on either of the stator core 62 and the outer cylinder member 71.

In the above configuration, the stator core 62 and the stator holder 70 (more specifically, the outer cylinder member 71) are fixedly fitted to each other with the predetermined interference therebetween; and relative circumferential displacement between the stator core 62 and the stator holder 70 is restricted by the engaging members 111. Consequently, even if the interference between the stator core 62 and the stator holder 70 is relatively small, it will still be possible to suppress circumferential displacement of the stator core 62 relative to the stator holder 70. Moreover, since the desired displacement-suppressing effect can be achieved even if the interference is relatively small, it becomes possible to prevent the stator core 62 from being damaged due to an excessively large interference between the stator core 62 and the stator holder 70. As a result, it becomes possible to suitably suppress displacement of the stator core 62.

On the radially inner side of the inner cylinder member 81, there is formed an annular internal space so as to surround the rotating shaft 11. In the internal space, there may be arranged, for example, electrical components constituting an inverter that is an electric power converter. The electrical components may be, for example, electrical modules each of which is formed by packaging a semiconductor switching element or a capacitor. By arranging the electrical modules in contact with the inner circumferential surface of the inner cylinder member 81, it becomes possible to cool the electrical modules with the coolant flowing through the coolant passage 85. It should be noted that the internal space formed on the radially inner side of the inner cylinder member 81 may be expanded by eliminating the protrusions 83 or reducing the protruding height of the protrusions 83.

Next, the configuration of the stator coil 61 will be described in detail. FIGS. 10 and 11 show the stator coil 61 in a state of having been assembled to the core assembly CA. As shown in FIGS. 10 and 11, the partial windings 151 constituting the stator coil 61 are assembled to the radially outer periphery of the core assembly CA (i.e., the radially outer periphery of the stator core 62) so as to be aligned with each other in the circumferential direction.

The stator coil 61 includes a plurality of phase windings and is formed into a hollow cylindrical (or an annular) shape by arranging the phase windings in a predetermined sequence in the circumferential direction. In the present embodiment, the stator coil 61 is configured as a three-phase coil which includes U-phase, V-phase and W-phase windings.

As shown in FIG. 11, the stator 60 has, in the axial direction, a part thereof corresponding to a coil side CS that radially faces the magnet unit 22 of the rotor 20, and parts thereof corresponding respectively to coil ends CE that are located respectively on opposite axial sides of the coil side CS. In addition, the stator core 62 is provided in the axial range corresponding to the coil side CS.

Each of the phase windings of the stator coil 61 is constituted of a plurality of partial windings 151 (see FIG. 16); the partial windings 151 are individually provided as coil modules 150. That is, each of the coil modules 150 has one of the partial windings 151 of the phase windings provided integrally therein. The number of the coil modules 150 constituting the stator coil 61 is set according to the number of the magnetic poles of the rotor 20. In the coil side CS of the stator coil 61, the electrical conductor sections of the plurality of phases are arranged in a predetermined sequence and in alignment with each other in the circumferential direction by arranging the coil modules 150 (i.e., the partial windings 151) of the plurality of phases in the predetermined sequence and in alignment with each other in the circumferential direction. In FIG. 10, there is shown the arrangement sequence of the electrical conductor sections of the U, V and W phases in the coil side CS of the stator coil 61. In addition, in the present embodiment, the number of the magnetic poles is set to 24; however, the number of the magnetic poles may be arbitrarily set.

Figure 16:
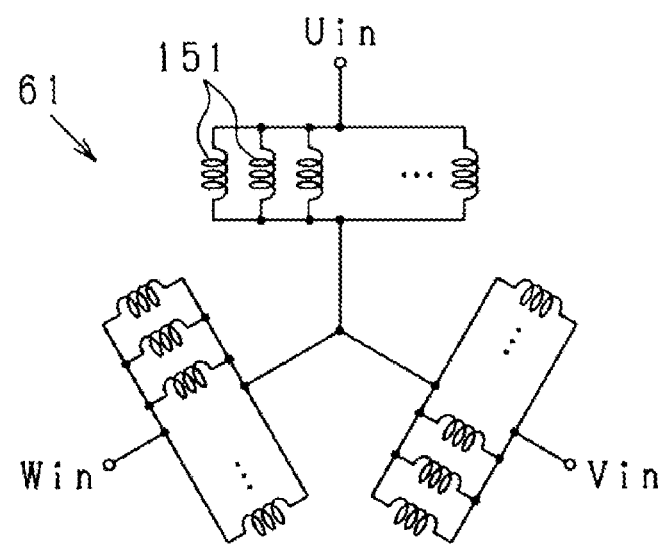
FIG. 16 is an electric circuit diagram illustrating the electrical connection between partial windings in each of three phase windings of a stator coil.

In the stator coil 61, each of the phase windings is formed by connecting the partial windings 151 of the phase winding, which are included in the respective coil modules 150, in parallel or in series with each other. FIG. 16 is an electric circuit diagram illustrating the electrical connection between the partial windings 151 in each of the three phase windings of the stator coil 61. In FIG. 16, each of the phase windings has the partial windings 151 thereof connected in parallel with each other.

As shown in FIG. 11, the coil modules 150 are assembled to the radially outer periphery of the stator core 62. As described above, the stator coil 61 has the coil side CS radially facing the magnet unit 22 of the rotor 20 and the coil ends CE located respectively on opposite axial sides of the coil side CS. The coil modules 150 are assembled to the stator core 62 so that opposite axial end portions of each of the coil modules 150 protrude axially outward respectively from opposite axial end faces of the stator core 62 (i.e., protrude respectively to opposite axial sides of the stator core 62 where the coil ends CE are respectively located).

In the present embodiment, the coil modules 150 include two types of coil modules having different shapes. The first-type coil modules 150 have the partial windings 151 thereof bent radially inward (i.e., to the stator core 62 side) at the coil ends CE. In contrast, the second-type coil modules 150 have the partial windings 151 thereof extending straight in the axial direction without being bent radially inward at the coil ends CE. In the following explanation, for the sake of convenience, those partial windings 151 which are bent at the coil ends CE will be referred to as the "first partial windings 151A"; and those coil modules 150 which respectively include the first partial windings 151A will be referred to as the "first coil modules 150A". On the other hand, those partial windings 151 which are not bent at the coil ends CE will be referred to as the "second partial windings 151B"; and those coil modules 150 which respectively include the second partial windings 151B will be referred to as the "second coil modules 150B".

Figure 17:
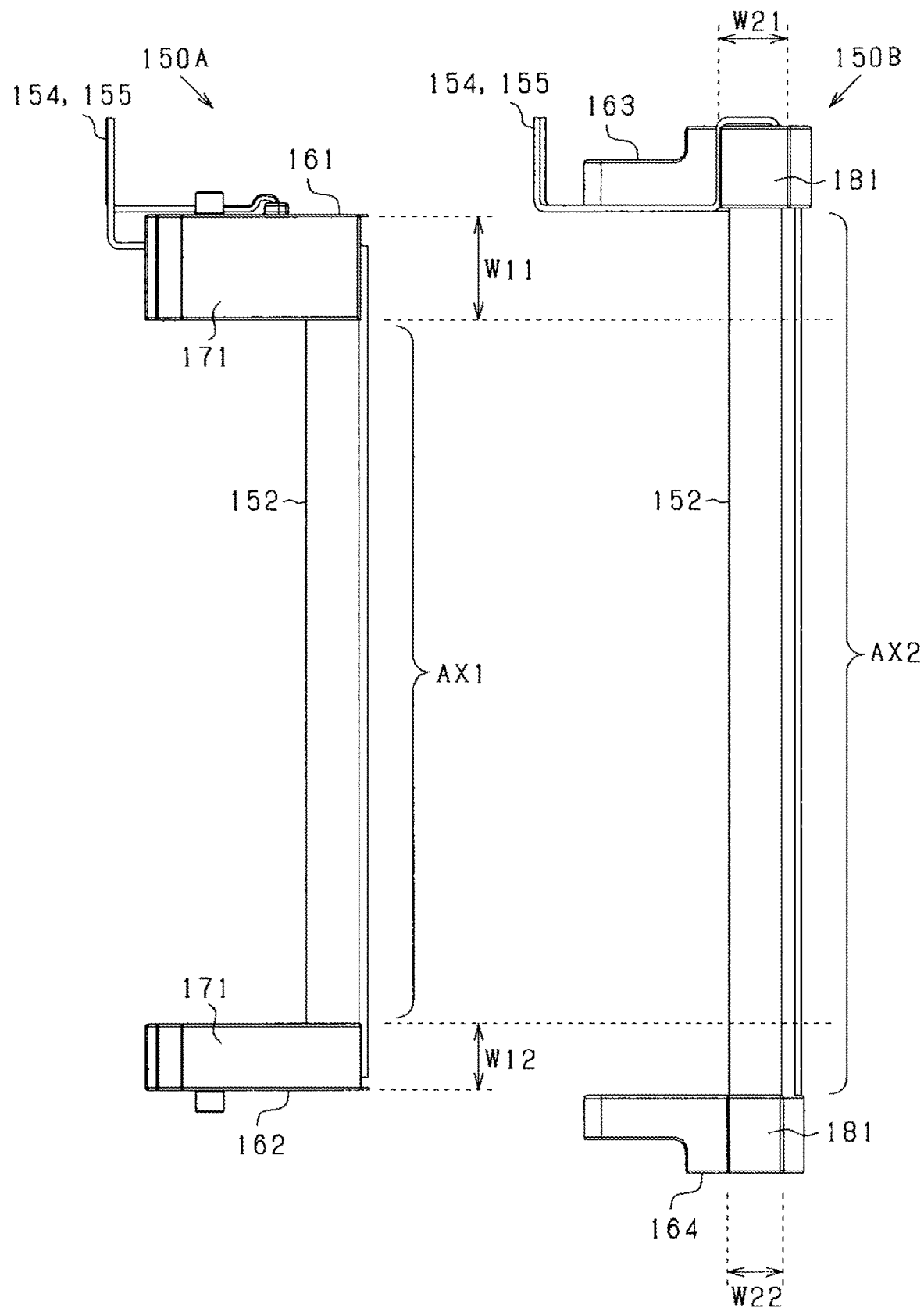
FIG. 17 is a side view comparatively showing a first coil module and a second coil module side by side.
Figure 18:
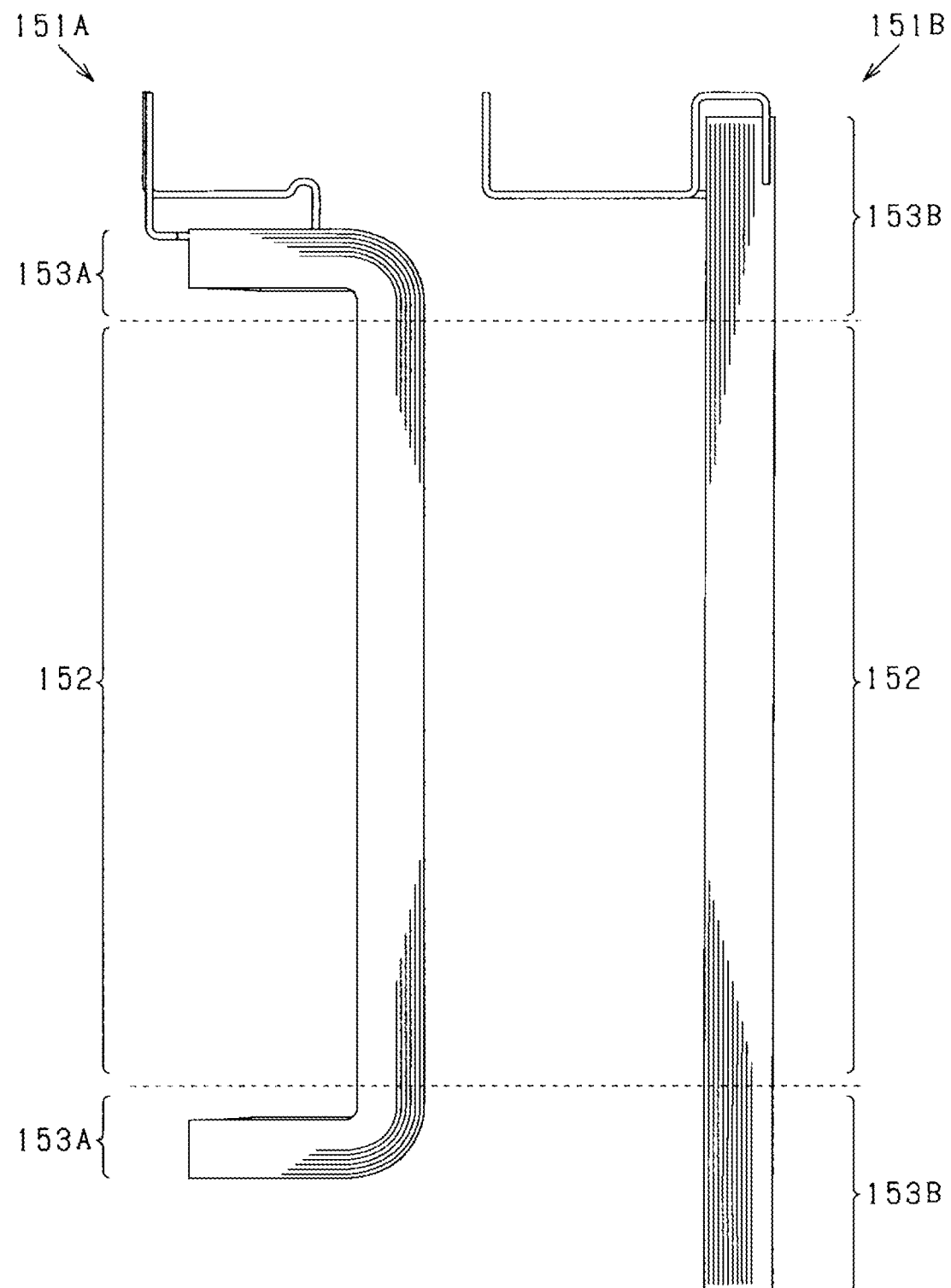
FIG. 18 is a side view comparatively showing a first partial winding and a second partial winding side by side.

FIG. 17 is a side view comparatively showing one of the first coil modules 150A and one of the second coil modules 150B side by side. FIG. 18 is a side view comparatively showing one of the first partial windings 151A and one of the second partial windings 151B side by side. As shown in FIG. 17, the axial length of the first coil modules 150A is different from the axial length of the second coil modules 150B; and axial end portions of the first coil modules 150A are different in shape from axial end portions of the second coil modules 150B. Accordingly, as shown in FIG. 18, the axial length of the first partial windings 151A is different from the axial length of the second partial windings 151B; and axial end portions of the first partial windings 151A are different in shape from axial end portions of the second partial windings 151B. Specifically, each of the first partial windings 151A has a substantially C-shape in a side view, whereas each of the second partial windings 151B has a substantially I-shape in a side view. Moreover, each of the first partial windings 151A has a pair of insulating covers 161 and 162 as "first insulating covers" mounted respectively on opposite axial end portions thereof, whereas each of the second partial windings 151B has a pair of insulating covers 163 and 164 as "second insulating covers" mounted respectively on opposite axial end portions thereof.

Next, the configurations of the first and second coil modules 150A and 150B will be described in detail.

Figure 19A:
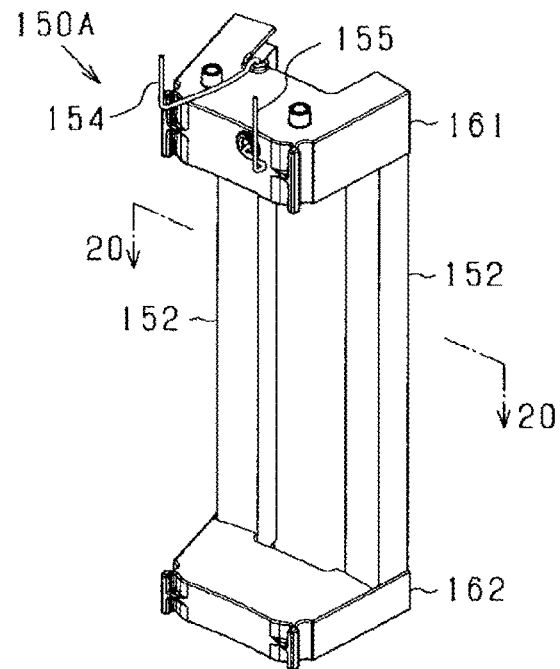
FIGS. 19(a) and 19(b) are perspective views illustrating the configuration of the first coil module.

First, the configuration of each of the first coil modules 150A will be described. FIG. 19(*a*) is a perspective view illustrating the configuration of each of the first coil modules 150A. FIG. 19(*b*) is a perspective view showing the components of each of the first coil modules 150A in an exploded manner. FIG. 20 is a cross-sectional view taken along the line 20-20 in FIG. 19(*a*).

As shown in FIGS. 19(*a*) and 19(*b*), each of the first coil modules 150A has the first partial winding 151A formed by winding an electrical conductor wire CR multiply and the insulating covers 161 and 162 mounted respectively on opposite axial end portions of the first partial winding 151A. The insulating covers 161 and 162 are formed of an electrically-insulative material such as a synthetic resin.

The first partial winding 151A has a pair of intermediate conductor portions 152 extending straight and parallel to each other, and a pair of bridging portions 153A connecting the pair of intermediate conductor portions 152 respectively on opposite axial sides of the pair of intermediate conductor portions 152. The first partial winding 151A is formed into a ring shape by the pair of intermediate conductor portions 152 and the pair of bridging portions 153A. The pair of intermediate conductor portions 152 are formed apart from each other by a predetermined multiple of one coil-pitch, so as to allow the intermediate conductor portions 152 of the partial windings 151 of the other phases to be arranged therebetween in the circumferential direction. More particularly, in the present embodiment, the pair of intermediate conductor portions 152 are formed apart from each other by two coil-pitches and have one intermediate conductor portion 152 of one partial winding 151 of each of the other two phases arranged therebetween in the circumferential direction.

The pair of bridging portions 153A are formed in the same shape respectively on opposite axial sides of the pair of intermediate conductor portions 152. Each of the bridging portions 153A constitutes a portion of a corresponding one of the coil ends CE (see FIG. 11). Moreover, each of the bridging portions 153A is bent in a direction perpendicular to the pair of intermediate conductor portions 152, i.e., in a direction perpendicular to the axial direction.

As shown in FIG. 18, each of the first partial windings 151A has the pair of bridging portions 153A, whereas each of the second partial windings 151B has a pair of bridging portions 153B. The bridging portions 153A of the first partial windings 151A are different in shape from the bridging portions 153B of the second partial windings 151B. For the sake of definitely distinguishing them from each other, hereinafter, the bridging portions 153A of the first partial windings 151A will also be referred to as the "first bridging portions 153A" and the bridging portions 153B of the second partial windings 151B will also be referred to as the "second bridging portions 153B".

Each of the intermediate conductor portions 152 of the partial windings 151A and 151B is provided as one of coil side conductor portions that are arranged one by one in the circumferential direction at the coil side CS. On the other hand, each of the bridging portions 153A and 153B of the partial windings 151A and 151B is provided as a coil end conductor portion that connects, at a corresponding one of the coil ends CE, a pair of the intermediate conductor portions 152 of the same phase located respectively at two different circumferential positions.

As shown in FIG. 20, each of the first partial windings 151A is formed, by winding the electrical conductor wire CR multiply, so as to have a quadrangular transverse cross section. FIG. 20 shows a transverse cross section of one of the first coil modules 150A at the intermediate conductor portions 152 of the first partial winding 151A. As seen from FIG. 20, in the intermediate conductor portions 152 of the first partial winding 151A, the electrical conductor wire CR is wound multiply so that parts of the electrical conductor wire CR extend parallel to each other and are aligned with one another circumferentially and radially. That is, each of the first partial windings 151A is formed to have a substantially rectangular transverse cross section with parts of the electrical conductor wire CR both circumferentially aligned in a plurality of rows and radially-aligned in a plurality of rows in the intermediate conductor portions 152. On the other hand, in distal end parts of the first bridging portions 153A, due to the radial bending of the first partial winding 151A, the electrical conductor wire CR is wound multiply so that parts of the electrical conductor wire CR extend parallel to each other and are aligned with one another axially and radially. In addition, in the present embodiment, the electrical conductor wire CR is multiply wound in a concentric-winding manner. However, the electrical conductor wire CR may alternatively be multiply wound in other winding manners, such as in an alpha winding manner.

Figure 19B:
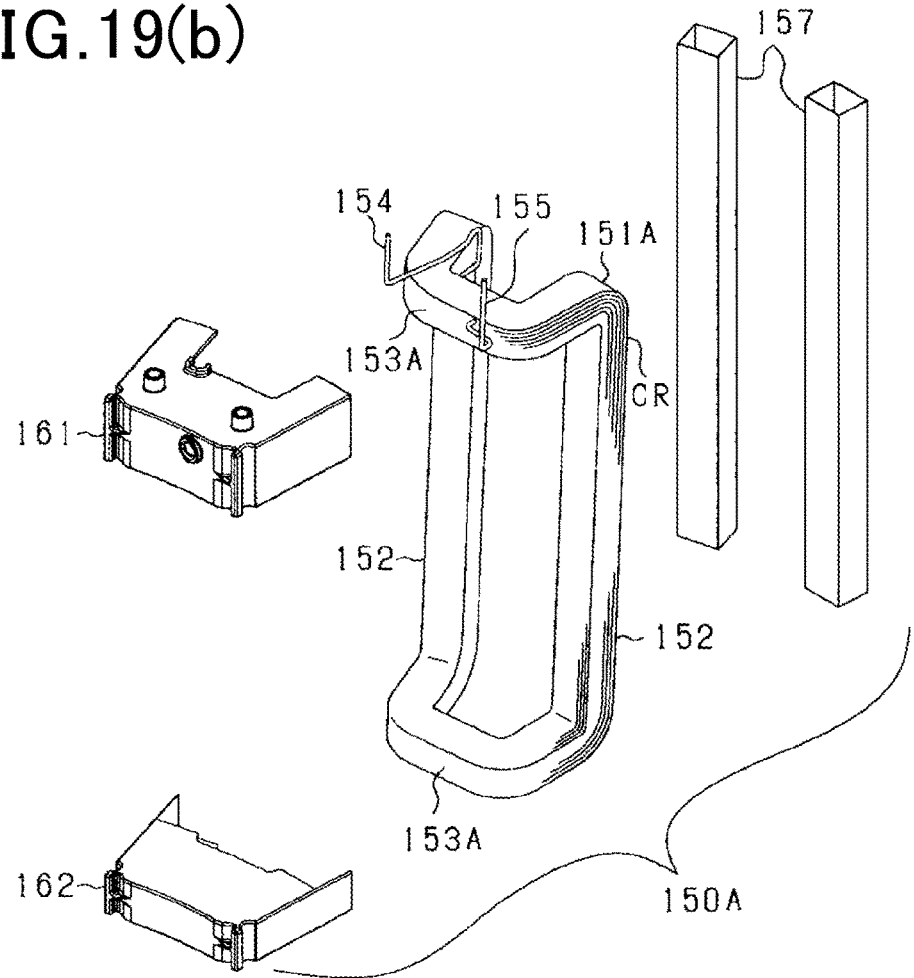
Figure 20:
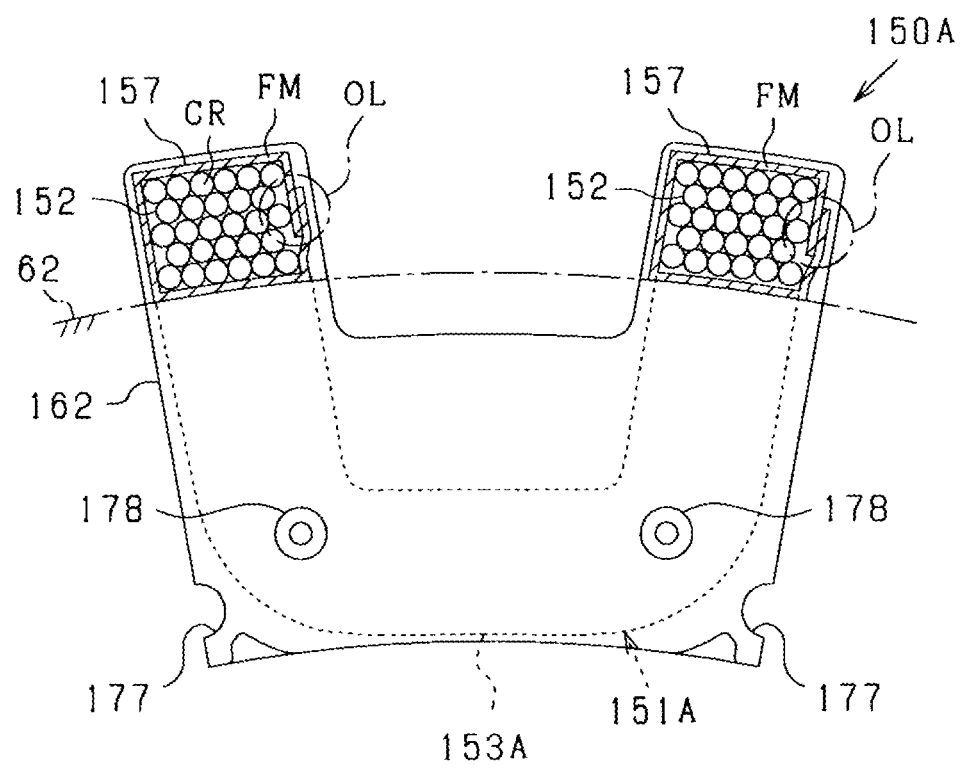
FIG. 20 is a cross-sectional view taken along the line 20-20 in FIG. 19(a)

In each of the first partial windings 151A, both end portions of the electrical conductor wire CR are led out from only one of the two first bridging portions 153A (i.e., from the upper first bridging portion 153A in FIG. 19(b)); the end portions respectively constitute winding end portions 154 and 155 of the first partial winding 151A. Moreover, the winding end portions 154 and 155 respectively represent the winding start end and the winding finish end of the electrical conductor wire CR. In addition, one of the winding end portions 154 and 155 is connected to an electric current input/output terminal, whereas the other of the winding end portions 154 and 155 is connected to a neutral point.

Moreover, in each of the first partial windings 151A, each of the intermediate conductor portions 152 is covered with a sheet-like insulating coat 157. In addition, in FIG. 19(a), there is shown one of the first coil modules 150A in a state where the intermediate conductor portions 152 are covered with and thus present inside the corresponding insulating coats 157; however, for the sake of convenience, the intermediate conductor portions 152 covered with the corresponding insulating coats 157 are still designated by the reference numeral 152 (the same applies to FIG. 22(a) as well).

Each of the insulating coats 157 is formed by wrapping a film member FM around the corresponding intermediate conductor portion 152. The film member FM has an axial length not smaller than the axial length of an insulation covering range of the corresponding intermediate conductor portion 152. The film member FM may be implemented by, for example, a PEN (polyethylene naphthalate) film. More specifically, the film member FM includes a film substrate and a foamable adhesive layer provided on one of two major surfaces of the film substrate. The film member FM is wrapped around the corresponding intermediate conductor portion 152 in such a manner as to be bonded by the adhesive layer to the corresponding intermediate conductor portion 152. In addition, the adhesive layer may alternatively be implemented by a non-formable adhesive.

As shown in FIG. 20, each of the intermediate conductor portions 152 has a substantially rectangular transverse cross section with parts of the electrical conductor wire CR aligned with one another circumferentially and radially. Moreover, each of the intermediate conductor portions 152 has the film member FM wrapped therearound so as to have end portions of the film member FM overlapping each other in the circumferential direction. The film member FM is a rectangular sheet whose longitudinal dimension is longer than the axial length of the intermediate conductor portion 152 and whose lateral dimension is longer than the length of one circumference of the intermediate conductor portion 152. The film member FM is wrapped, in a state of being folded according to the cross-sectional shape of the intermediate conductor portion 152, around the intermediate conductor portion 152. After the film member FM is wrapped around the intermediate conductor portion 152, the gap between the electrical conductor wire CR of the intermediate conductor portion 152 and the film substrate is filled by the foaming of the adhesive layer. Further, at an overlap part OL where the end portions of the film member FM overlap each other in the circumferential direction, the end portions of the film member FM are bonded together by the adhesive layer.

For each of the intermediate conductor portions 152, the corresponding insulating coat 157 is provided so as to cover all of two circumferential side surfaces and two radial side surfaces of the intermediate conductor portion 152. Moreover, the corresponding insulating coat 157 has the overlap part OL where the end portions of the film member FM overlap each other in the circumferential direction; the overlap part OL is located on a part of the intermediate conductor portion 152 which faces one of the intermediate conductor portions 152 of the partial windings 151 of the other phases, i.e., on one of the two circumferential side surfaces of the intermediate conductor portion 152. In the present embodiment, for the pair of intermediate conductor portions 152 of each of the partial windings 151, the overlap parts OL of the corresponding insulating coats 157 are located on the same side in the circumferential direction.

In each of the first partial windings 151A, the corresponding insulating coats 157 are provided in a range extended from the intermediate conductor portions 152 to parts of the first bridging portions 153A that are located respectively on opposite axial sides of the intermediate conductor portions 152 and covered respectively with the insulating covers 161 and 162 (i.e., to parts of the first partial winding 151A which are located respectively inside the insulating covers 161 and 162). More specifically, referring to FIG. 17, in each of the first coil modules 150A, the first partial winding 151A is covered with neither of the insulating covers 161 and 162 in a range of AX1; and the corresponding insulating coats 157 are provided in a range extended both upward and downward than the range of AX1.

Next, the configurations of the insulating covers 161 and 162 will be described.

In each of the first partial windings 151A, the insulating cover 161 is mounted on that first bridging portion 153A of the first partial winding 151A which is located on one axial side, whereas the insulating cover 162 is mounted on that first bridging portion 153A of the first partial winding 151A which is located on the other axial side. The configuration of the insulating cover 161 is illustrated in FIGS. 21(a) and 21(b), which are perspective views of the insulating cover 161 respectively from two different directions.

Figure 21A:
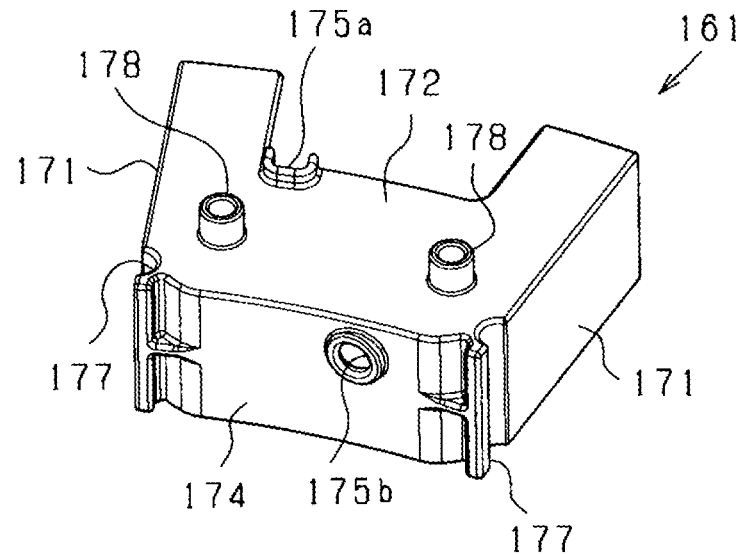
FIGS. 21(a) and 21(b) are perspective views illustrating the configuration of an insulating cover of the first coil module.
Figure 21B:
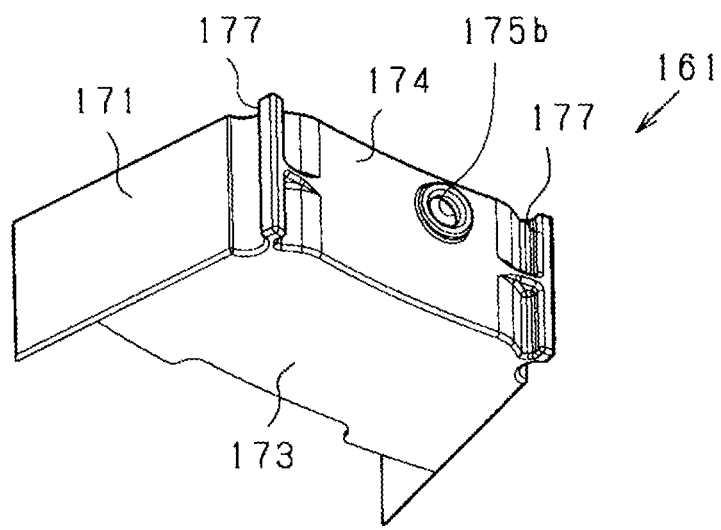

As shown in FIGS. 21(a) and 21(b), the insulating cover 161 has a pair of side walls 171 respectively on opposite sides in the circumferential direction, an outer wall 172 on the axially outer side, an inner wall 173 on the axially inner side, and a front wall 174 on the radially inner side. These walls 171-174 are each plate-shaped, and connected to each other in a three-dimensional shape such that the insulating cover 161 opens only on the radially outer side. Each of the side walls 171 is provided so as to extend, after the assembly of the coil modules 150 to the core assembly CA, toward the axis of the core assembly CA. After all the first coil modules 150A are arranged in alignment with each other in the circumferential direction, for each circumferentially-adjacent pair of the first coil modules 150A, a pair of the side walls 171 of the insulating covers 161 of the pair of the first coil modules 150A circumferentially face each other in a state of being in contact with or in close proximity to each other. Consequently, it becomes possible to suitably arrange all the first coil modules 150A in an annular shape while securing electrical insulation between each circumferentially-adjacent pair of the first coil modules 150A.

In the insulating cover 161, the outer wall 172 has an opening 175a for leading out the winding end portion 154 of the first partial winding 151A; and the front wall 174 has an opening 175b for leading out the winding end portion 155 of the first partial winding 151A. In addition, the winding end portion 154 of the first partial winding 151A is led out from the opening 175a of the outer wall 172 in the axial direction, whereas the winding end portion 155 of the first partial winding 151A is led out from the opening 175b of the front wall 174 in the radial direction.

Moreover, in the insulating cover 161, a pair of recesses 177 are formed respectively in the pair of side walls 171 and at the positions of the circumferential ends of the front wall 174, i.e., the positions where the front wall 174 intersects the pair of side walls 171; each of the recesses 177 is semicircular in cross-sectional shape and extends in the axial direction. Further, a pair of protrusions 178 are formed on the outer wall 172 and respectively on opposite sides of a centerline of the insulating cover 161 in the circumferential direction so as to be symmetrical with respect to the centerline; each of the protrusions 178 extends in the axial direction.

The explanation of the recesses 177 of the insulating cover 161 is supplemented here. As shown in FIG. 20, each of the first bridging portions 153A of the first partial windings 151A has such a curved shape as to be convex radially inward, i.e., toward the core assembly CA. Consequently, between each circumferentially-adjacent pair of the first bridging portions 153A of the first partial windings 151A, there is formed a gap whose width increases in the direction toward the distal ends of the first bridging portions 153A, i.e., in the radially inward direction. In view of the above, in the present embodiment, the recesses 177 are respectively formed, in the side walls 171, at positions outside the curved parts of the first bridging portions 153A by utilizing the gaps between the first bridging portions 153A located adjacent to one another in the circumferential direction.

In addition, each of the first partial windings 151A may have a temperature detector (e.g., thermistor) provided therein. In this case, the insulating cover 161 may further have formed therein an opening for leading out a signal line extending from the temperature detector. Consequently, the temperature detector could be suitably received in the insulating cover 161.

Although not illustrated in detail in the drawings, the insulating cover 162 provided on the other axial side has almost the same configuration as the insulating cover 161. Specifically, similar to the insulating cover 161, the insulating cover 162 has a pair of side walls 171 respectively on opposite sides in the circumferential direction, an outer wall 172 on the axially outer side, an inner wall 173 on the axially inner side, and a front wall 174 on the radially inner side. Moreover, in the insulating cover 162, a pair of semicircular recesses 177 are formed respectively in the pair of side walls 171 and at the positions of the circumferential ends of the front wall 174. Further, a pair of protrusions 178 are formed on the outer wall 172. On the other hand, unlike the insulating cover 161, the insulating cover 162 has no openings for leading out the winding end portions 154 and 155 of the first partial winding 151A.

The insulating covers 161 and 162 differ from each other in the axial height (i.e., the width of the pair of side walls 171 and the front wall 174 in the axial direction). Specifically, as shown in FIG. 17, the axial height W11 of the insulating cover 161 and the axial height W12 of the insulating cover 162 are set to satisfy the relationship of W11>W12. More specifically, when the electrical conductor wire CR is wound multiply, it is necessary to switch the winding turns of the electrical conductor wire CR (or to lane-change the electrical conductor wire CR) in a direction perpendicular to the winding direction (or circumferential direction); thus, the winding width may be increased due to the switching. In addition, of the insulating covers 161 and 162, the insulating cover 161 is a cover which covers the first bridging portion 153A that includes the winding start end and the winding finish end of the electrical conductor wire CR. At the first bridging portion 153A that includes the winding start end and the winding finish end of the electrical conductor wire CR, the winding margin (or overlapping margin) of the electrical conductor wire CR and thus the winding width may become larger than at the other portions of the first partial winding 151A. Taking this fact into account, the axial height W11 of the insulating cover 161 is set to be larger than the axial height W12 of the insulating cover 162. Consequently, unlike in the case of setting the axial heights W11 and W12 of the insulating covers 161 and 162 to be equal to each other, it becomes possible to prevent the number of turns of the electrical conductor wire CR from being limited by the insulating covers 161 and 162.

Next, the configuration of each of the second coil modules 150B will be described.

Figure 22A:
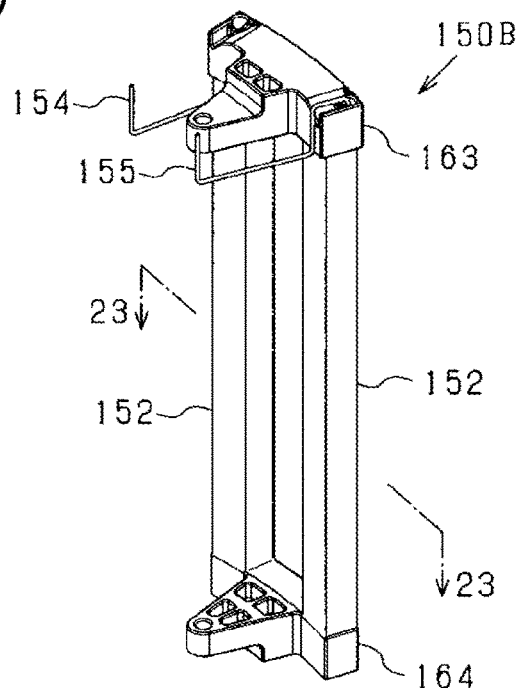
FIGS. 22(a) and 22(b) are perspective views illustrating the configuration of the second coil module.
Figure 22B:
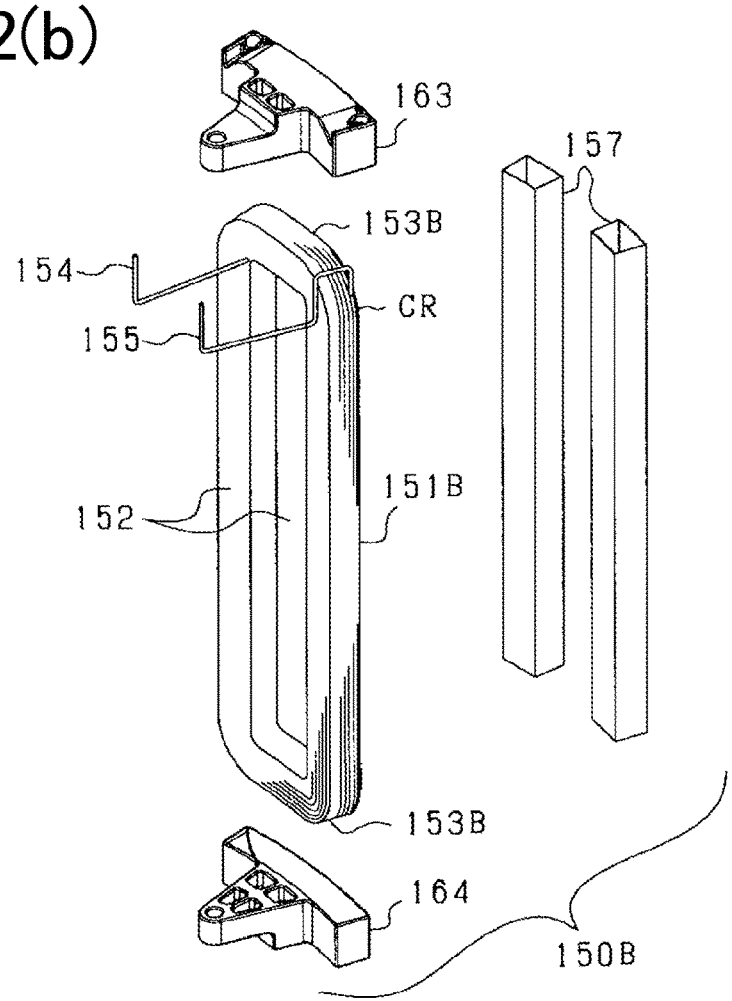
Figure 23:
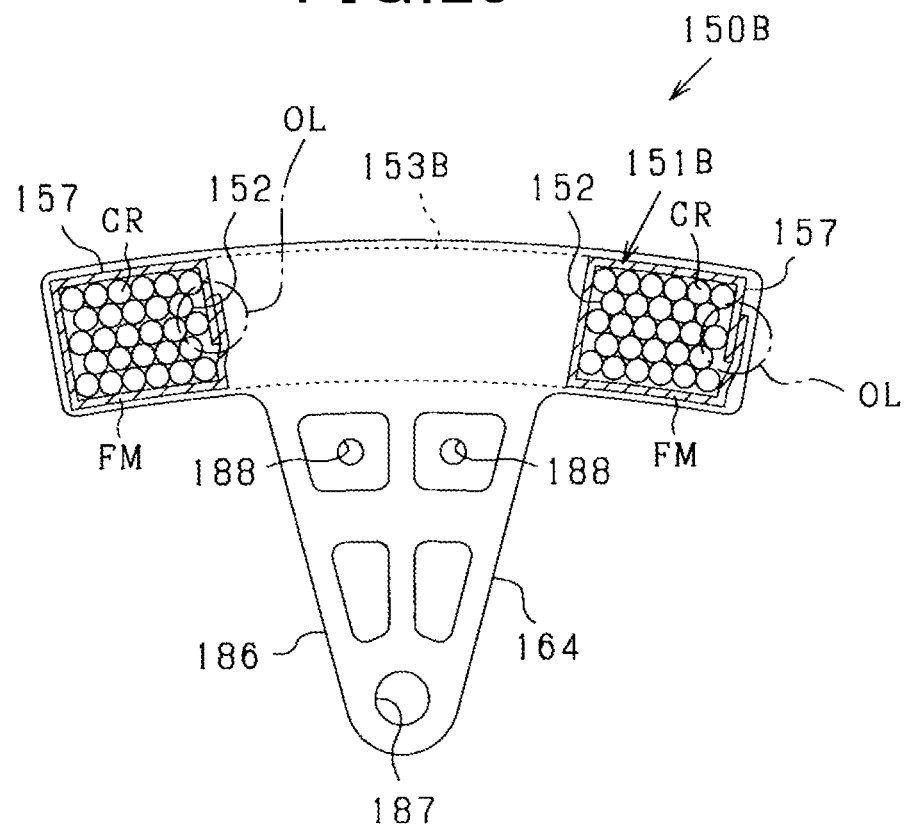
FIG. 23 is a cross-sectional view taken along the line 23-23 in FIG. 22(a)

FIG. 22(a) is a perspective view illustrating the configuration of each of the second coil modules 150B. FIG. 22(b) is a perspective view showing the components of each of the second coil modules 150B in an exploded manner. FIG. 23 is a cross-sectional view taken along the line 23-23 in FIG. 22(a).

As shown in FIGS. 22(a) and 22(b), each of the second coil modules 150B has the second partial winding 151B formed by winding the electrical conductor wire CR multiply and the insulating covers 163 and 164 mounted respectively on opposite axial end portions of the second partial winding 151B. The insulating covers 163 and 164 are formed of an electrically-insulative material such as a synthetic resin.

The second partial winding 151B has a pair of intermediate conductor portions 152 extending straight and parallel to each other, and a pair of second bridging portions 153B connecting the pair of intermediate conductor portions 152 respectively on opposite axial sides of the pair of intermediate conductor portions 152. The second partial winding 151B is formed into a ring shape by the pair of intermediate conductor portions 152 and the pair of second bridging portions 153B. The intermediate conductor portions 152 of the second partial winding 151B have the same configuration as the intermediate conductor portions 152 of the first partial winding 151A described above. On the other hand, the second bridging portions 153B of the second partial winding 151B have a different configuration from the first bridging portions 153A of the first partial winding 151A described above. That is, unlike the first bridging portions 153A of the first partial winding 151A, the second bridging portions 153B of the second partial winding 151B extend straight in the axial direction from the intermediate conductor portions 152 without being radially bent. The difference between the first and second partial windings 151A and 151B is clearly shown in FIG. 18.

In the second partial winding 151B, both end portions of the electrical conductor wire CR are led out from only one of the two second bridging portions 153B (i.e., from the upper second bridging portion 153B in FIG. 22(b)); the end portions respectively constitute winding end portions 154 and 155 of the second partial winding 151B. Moreover, the winding end portions 154 and 155 respectively represent the winding start end and the winding finish end of the electrical conductor wire CR. In addition, one of the winding end portions 154 and 155 is connected to an electric current input/output terminal, whereas the other of the winding end portions 154 and 155 is connected to the neutral point.

In the second partial winding 151B, each of the intermediate conductor portions 152 is covered with a sheet-like insulating coat 157. Each of the insulating coats 157 is formed by wrapping a film member FM around the corresponding intermediate conductor portion 152. The film member FM has an axial length not smaller than the axial length of an insulation covering range of the corresponding intermediate conductor portion 152.

The configuration of the insulating coats 157 is substantially the same for the first and second partial windings 151A and 151B. That is, as shown in FIG. 23, in the second partial winding 151B, each of the intermediate conductor portions 152 has the film member FM wrapped therearound so as to have end portions of the film member FM overlapping each other in the circumferential direction. For each of the intermediate conductor portions 152, the corresponding insulating coat 157 is provided so as to cover all of two circumferential side surfaces and two radial side surfaces of the intermediate conductor portion 152. Moreover, the corresponding insulating coat 157 has an overlap part OL where the end portions of the film member FM overlap each other in the circumferential direction; the overlap part OL is located on a part of the intermediate conductor portion 152 which faces one of the intermediate conductor portions 152 of the partial windings 151 of the other phases, i.e., on one of the two circumferential side surfaces of the intermediate conductor portion 152. In the present embodiment, for the pair of intermediate conductor portions 152 of the second partial winding 151B, the overlap parts OL of the corresponding insulating coats 157 are located on the same side in the circumferential direction.

In the second partial winding 151B, the corresponding insulating coats 157 are provided in a range extended from the intermediate conductor portions 152 to parts of the second bridging portions 153B that are located respectively on opposite axial sides of the intermediate conductor portions 152 and covered respectively with the insulating covers 163 and 164 (i.e., to parts of the second partial winding 151B which are located respectively inside the insulating covers 163 and 164). More specifically, referring to FIG. 17, in each of the second coil modules 150B, the second partial winding 151B is covered with neither of the insulating covers 163 and 164 in a range of AX2; and the corresponding insulating coats 157 are provided in a range extended both upward and downward than the range of AX2.

As described above, in the present embodiment, in each of the first and second partial windings 151A and 151B, the corresponding insulating coats 157 are provided in a range including parts of the bridging portions 153A or 153B of the partial winding. That is, in each of the first and second partial windings 151A and 151B, the corresponding insulating coats 157 are provided on parts of the bridging portions 153A or 153B which extend straight respectively from the intermediate conductor portions 152 as well as on the intermediate conductor portions 152. However, since the axial length of the first partial windings 151A is different from the axial length of the second partial windings 151B, the axial range of the corresponding insulating coats 157 is accordingly different between the first partial windings 151A and the second partial windings 151B.

Next, the configurations of the insulating covers 163 and 164 will be described.

In each of the second partial windings 151B, the insulating cover 163 is mounted on that second bridging portion 153B of the second partial winding 151B which is located on one axial side, whereas the insulating cover 164 is mounted on that second bridging portion 153B of the second partial winding 151B which is located on the other axial side. The configuration of the insulating cover 163 is illustrated in FIGS. 24(a) and 24(b), which are perspective views of the insulating cover 163 respectively from two different directions.

Figure 24A:
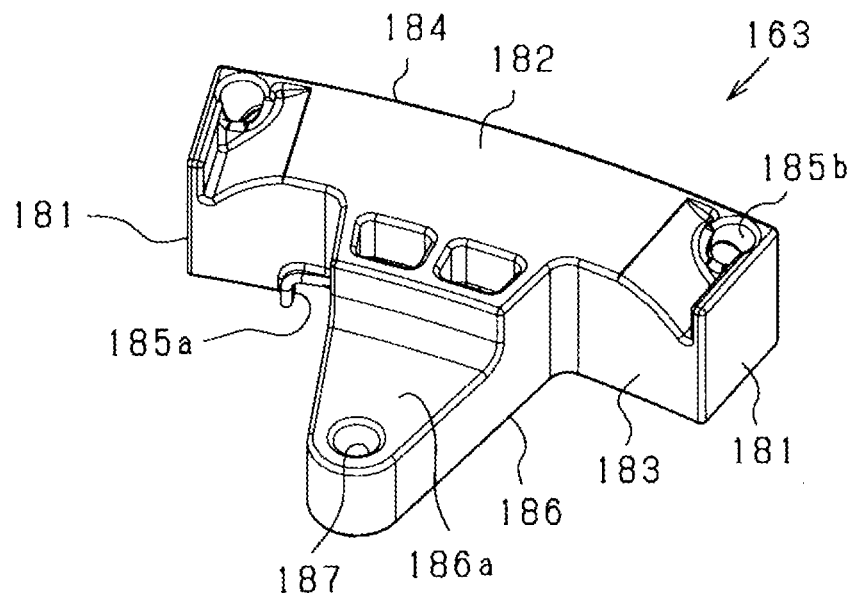
FIGS. 24(a) and 24(b) are perspective views illustrating the configuration of an insulating cover of the second coil module.
Figure 24B:
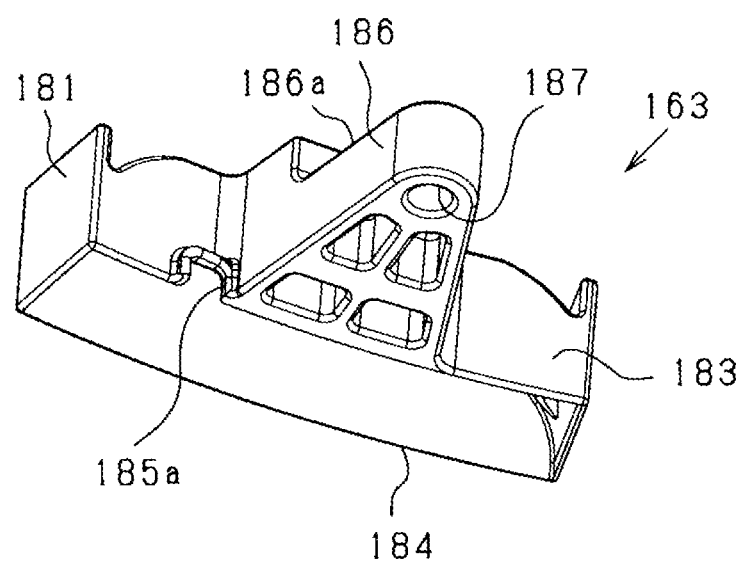

As shown in FIGS. 24(a) and 24(b), the insulating cover 163 has a pair of side walls 181 respectively on opposite sides in the circumferential direction, an outer wall 182 on the axially outer side, a front wall 183 on the radially inner side and a rear wall 184 on the radially outer side. These walls 181-184 are each plate-shaped, and connected to each other in a three-dimensional shape such that the insulating cover 163 opens only on the axially inner side. Each of the side walls 181 is provided so as to extend, after the assembly of the coil modules 150 to the core assembly CA, toward the axis of the core assembly CA. After all the second coil modules 150B are arranged in alignment with each other in the circumferential direction, for each circumferentially-adjacent pair of the second coil modules 150B, a pair of the side walls 181 of the insulating covers 163 of the pair of the second coil modules 150B circumferentially face each other in a state of being in contact with or in close proximity to each other. Consequently, it becomes possible to suitably arrange all the second coil modules 150B in an annular shape while securing electrical insulation between each circumferentially-adjacent pair of the second coil modules 150B.

In the insulating cover 163, the front wall 183 has an opening 185a for leading out the winding end portion 154 of the second partial winding 151B; and the outer wall 182 has an opening 185b for leading out the winding end portion 155 of the second partial winding 151B.

On the front wall 183 of the insulating cover 163, there is formed a protruding portion 186 that protrudes radially inward. Specifically, the protruding portion 186 is formed, at the center position between the two ends of the insulating cover 163 in the circumferential direction, so as to protrude radially inward from the second bridging portion 153B of the second partial winding 151B. The protruding portion 186 has such a tapered shape as to taper radially inward in a plan view. In a distal end part of the protruding portion 186, there is formed a through-hole 187 that extends in the axial direction. In addition, the configuration of the protruding portion 186 may be arbitrary, provided that it protrudes radially inward from the second bridging portion 153B of the second partial winding 151B and has the through-hole 187 formed at the center position between the two ends of the insulating cover 163 in the circumferential direction. However, considering a state of the insulating cover 163 overlapping the insulating covers 161 of the first coil modules 150A located axially inside the insulating cover 163, it is preferable for the insulating cover 163 to be formed with a small circumferential width so as to avoid interference with the winding end portions 154 and 155.

The axial thickness of the protruding portion 186 is reduced stepwise at the distal end part thereof on the radially inner side. The through-hole 187 is formed in a lower step part 186a of the protruding portion 186 which has a reduced axial thickness. After the second coil module 150B is assembled to the core assembly CA, the height from the axial end face of the inner cylinder member 81 is smaller at the lower step part 186a than at the second bridging portion 153B of the second partial winding 151B.

Moreover, as shown in FIG. 23, in the protruding portion 186, there are also formed through-holes 188 that penetrate the protruding portion 186 in the axial direction. Consequently, it becomes possible to fill, in a state of the insulating covers 161 and 163 overlapping each other in the axial direction, an adhesive between the insulating covers 161 and 163 through the through-holes 188.

Although not illustrated in detail in the drawings, the insulating cover 164 provided on the other axial side has almost the same configuration as the insulating cover 163. Specifically, similar to the insulating cover 163, the insulating cover 164 has a pair of side walls 181 respectively on opposite sides in the circumferential direction, an outer wall 182 on the axially outer side, a front wall 183 on the radially inner side and a rear wall 184 on the radially outer side. Moreover, the insulating cover 164 also has a protruding portion 186 formed on the front wall 183 to protrude radially inward, and a through-hole 187 formed in a distal end part of the protruding portion 186. On the other hand, unlike the insulating cover 163, the insulating cover 164 has no openings for leading out the winding end portions 154 and 155 of the second partial winding 151B.

The insulating covers 163 and 164 differ from each other in the radial width of the pair of side walls 181. Specifically, as shown in FIG. 17, the radial width W21 of the side walls 181 of the insulating cover 163 and the radial width W22 of the side walls 181 of the insulating cover 164 are set to satisfy the relationship of W21>W22. More specifically, of the insulating covers 163 and 164, the insulating cover 163 is a cover which covers the second bridging portion 153B that includes the winding start end and the winding finish end of the electrical conductor wire CR. At the second bridging portion 153B that includes the winding start end and the winding finish end of the electrical conductor wire CR, the winding margin (or overlapping margin) of the electrical conductor wire CR and thus the winding width may become larger than at the other portions of the second bridging portion 153B. Taking this fact into account, the radial width W21 of the side walls 181 of the insulating cover 163 is set to be larger than the radial width W22 of the side walls 181 of the insulating cover 164. Consequently, unlike in the case of setting the radial widths W21 and W22 of the insulating covers 163 and 164 to be equal to each other, it becomes possible to prevent the number of turns of the electrical conductor wire CR from being limited by the insulating covers 163 and 164.

Figure 25:
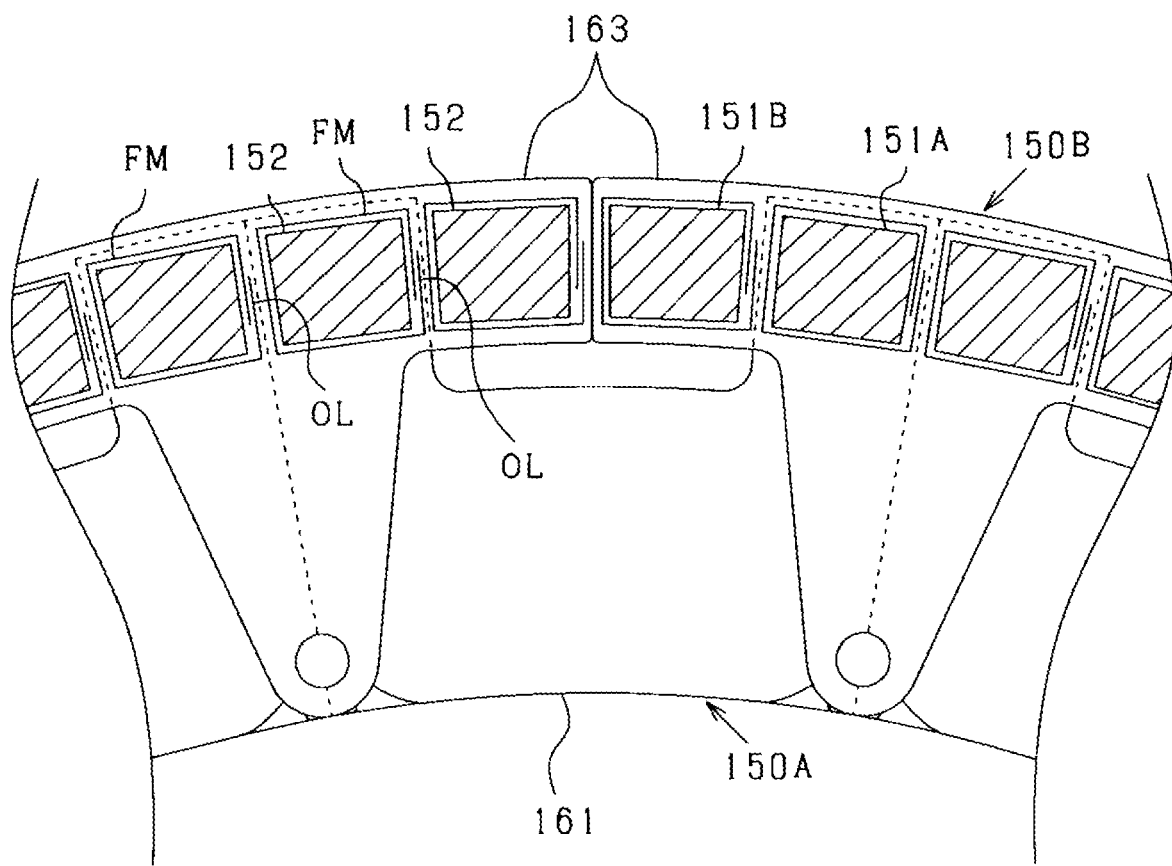
FIG. 25 is a partial cross-sectional view illustrating overlap position of film members in a state where coil modules are arranged in a circumferential direction.

FIG. 25 illustrates the overlap positions of the film members FM in a state where the first and second coil modules 150A and 150B are arranged in alignment with each other in the circumferential direction. As described above, in each of the first and second coil modules 150A and 150B, each of the intermediate conductor portions 152 has the film member FM wrapped therearound so that the end portions of the film member FM overlap each other in the circumferential direction on a part of the intermediate conductor portion 152 which faces one of the intermediate conductor portions 152 of the partial windings 151 of the other phases, i.e., on one of the two circumferential side surfaces of the intermediate conductor portion 152 (see FIGS. 20 and 23). Moreover, after the first and second coil modules 150A and 150B are arranged in alignment with each other in the circumferential direction, all the overlap parts OL of the film members FM in the coil modules 150A and 150B are located on the same side (i.e., the right side in FIG. 25) in the circumferential direction. Accordingly, in each circumferentially-adjacent pair of the intermediate conductor portions 152 of the partial windings 151A and 151B of different phases, the overlap parts OL of the film members FM are not superposed on each other in the circumferential direction. Consequently, between each circumferentially-adjacent pair of the intermediate conductor portions 152, there are interposed a maximum of three layers of the film member FM.

Next, the configuration related to the assembly of the coil modules 150A and 150B to the core assembly CA will be described.

In the present embodiment, the axial length of the first coil modules 150A is different from the axial length of the second coil modules 150B. Moreover, the shape of the first bridging portions 153A of the first partial windings 151A is different from the shape of the second bridging portions 153B of the second partial windings 151B. The coil modules 150A and 150B are mounted to the core assembly CA with the first bridging portions 153A of the first partial windings 151A located on the axially inner side and the second bridging portions 153B of the second partial windings 151B located on the axially outer side. Regarding the insulating covers 161-164, they are fixed to the core assembly CA so that: the insulating covers 161 and the insulating covers 163 overlap each other in the axial direction on one axial side of the coil modules 150A and 150B; and the insulating covers 162 and the insulating covers 164 overlap each other in the axial direction on the other axial side of the coil modules 150A and 150B.

Figure 26:
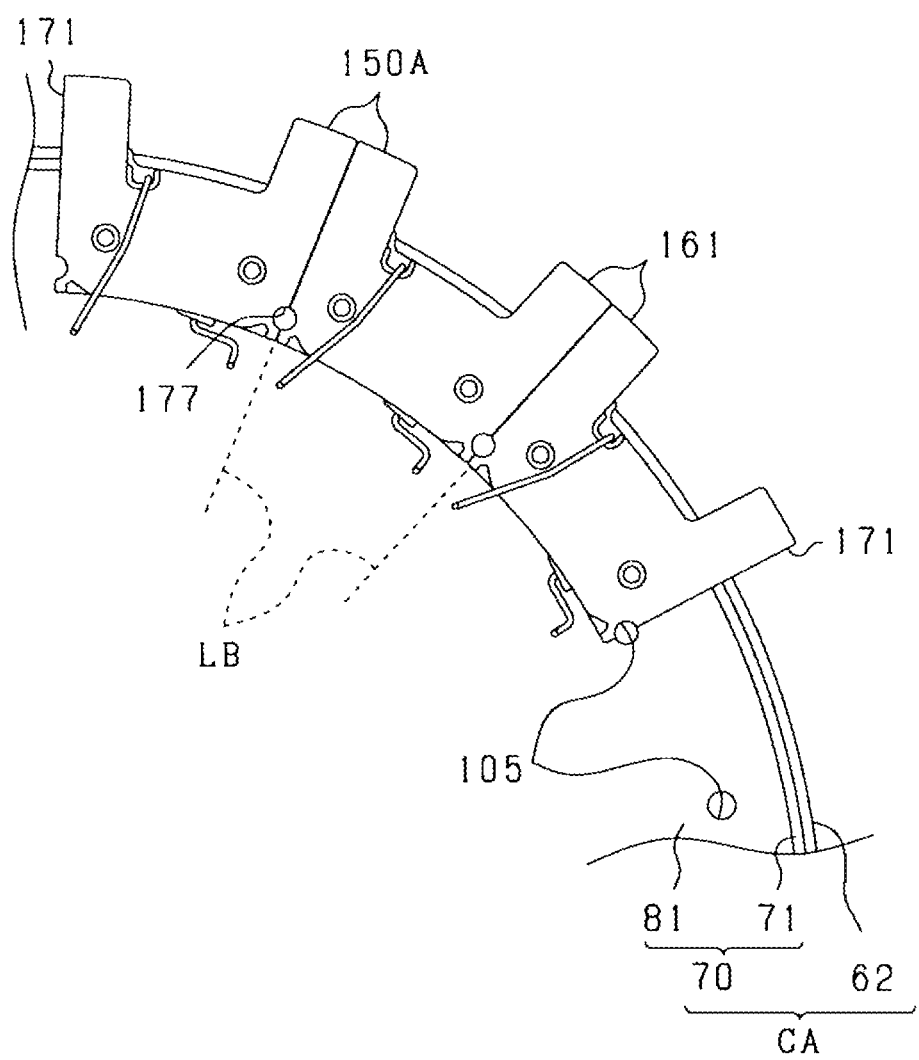
FIG. 26 is a plan view showing first coil modules in a state of having been assembled to the core assembly.
Figure 27:
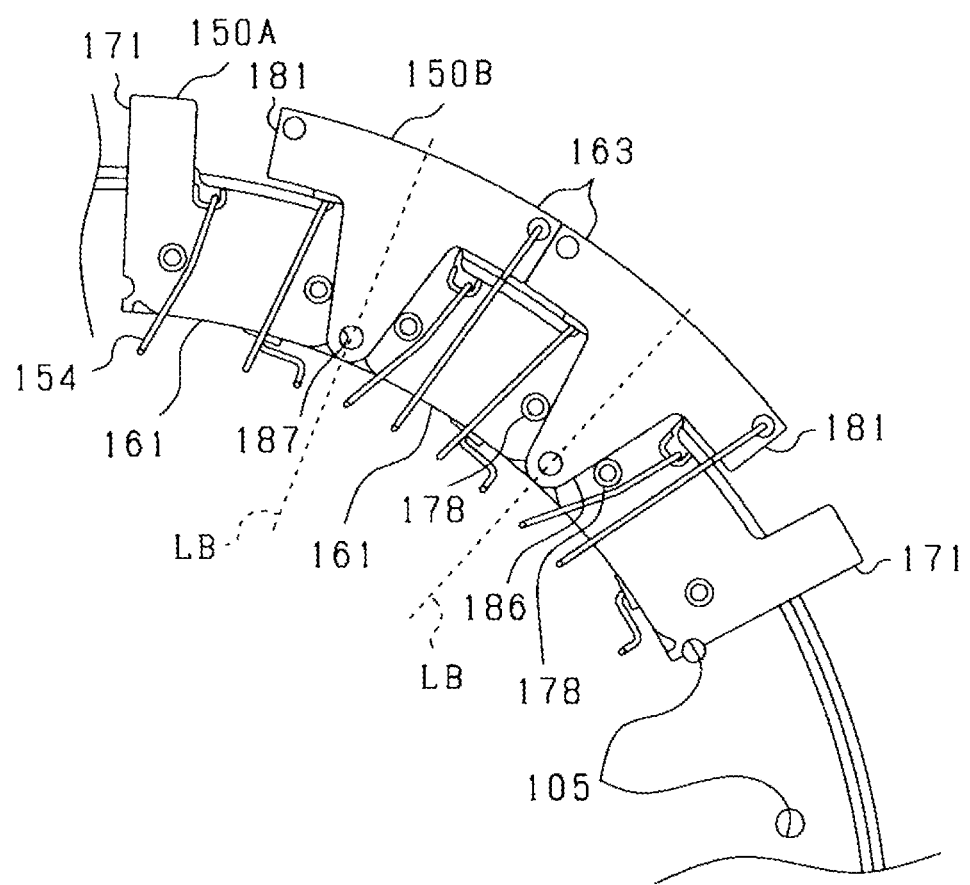
FIG. 27 is a plan view showing both the first coil modules and second coil modules in a state of having been assembled to the core assembly.
Figure 28A:
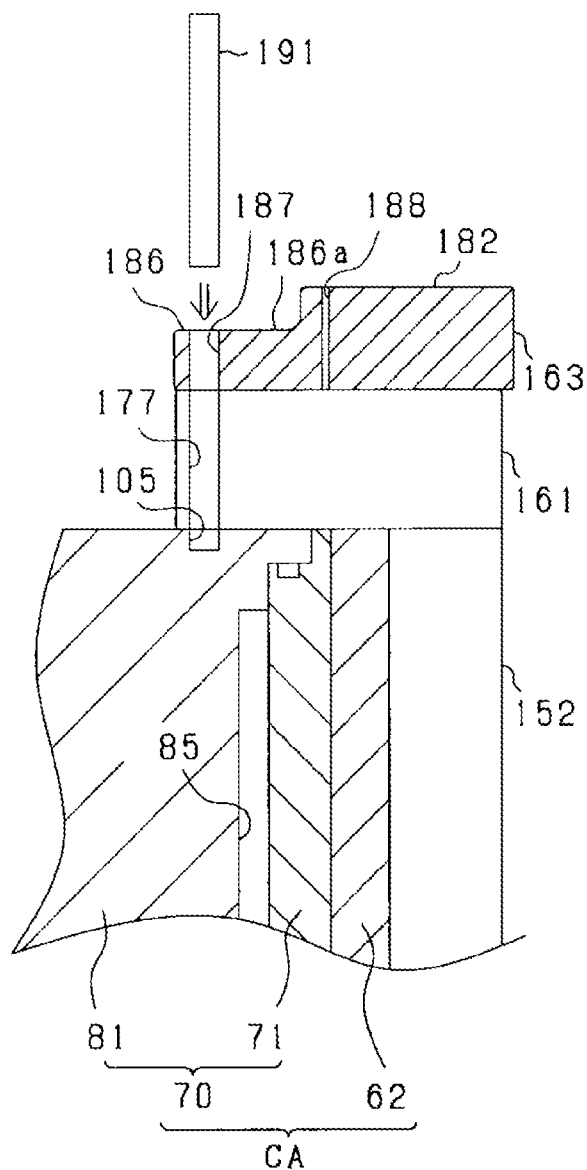
FIGS. 28(a) and 28(b) are longitudinal cross-sectional views illustrating the fixing of the first and second coil modules to the core assembly by fixing pins.
Figure 28B:
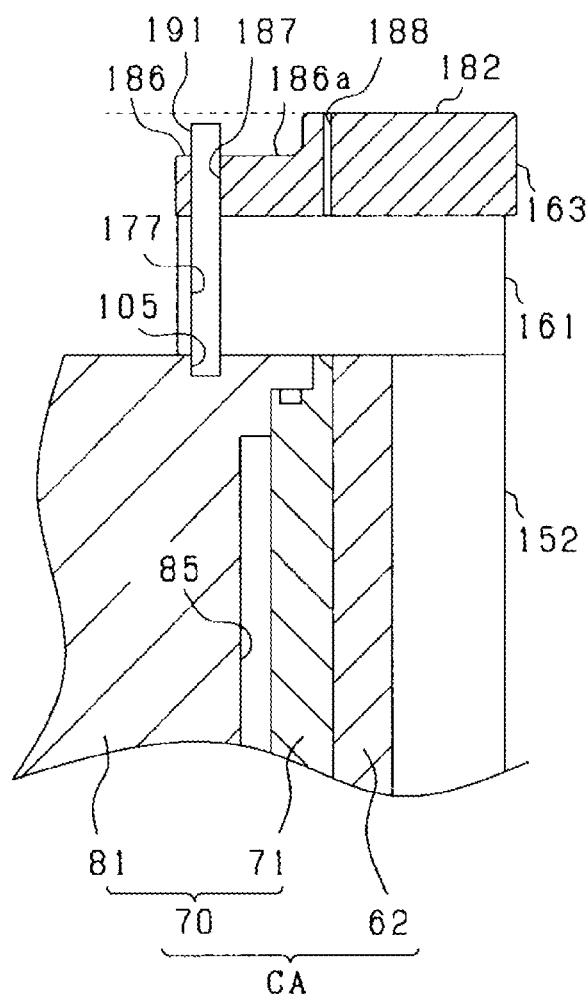

FIG. 26 is a plan view showing the insulating covers 161 arranged side by side in the circumferential direction in the state of the first coil modules 150A having been assembled to the core assembly CA. FIG. 27 is a plan view showing both the insulating covers 161 arranged side by side in the circumferential direction and the insulating covers 163 arranged side by side in the circumferential direction in the state of the first coil modules 150A and the second coil modules 150B having been assembled to the core assembly CA. FIG. 28(a) is a longitudinal cross-sectional view showing the assembly of the coil modules 150A and 150B to the core assembly CA before the fixing of the coil modules 150A and 150B to the core assembly CA by fixing pins 191. FIG. 28(b) is a longitudinal cross-sectional view showing the assembly of the coil modules 150A and 150B to the core assembly CA after the fixing of the coil modules 150A and 150B to the core assembly CA by the fixing pins 191.

As shown in FIG. 26, in a state of the first coil modules 150A having been assembled to the core assembly CA, the insulating covers 161 are arranged in the circumferential direction with the side walls 171 thereof in contact with or in close proximity to one another. More specifically, the insulating covers 161 are arranged such that the boundary lines LB between facing pairs of the side walls 171 respectively coincide with the recesses 105 formed in the axial end face of the inner cylinder member 81. Consequently, with each circumferentially-adjacent pair of the side walls 171 of the insulating covers 161 placed in contact with or in close proximity to each other, a plurality of through-holes are formed each of which is constituted of a circumferentially-adjacent pair of the recesses 177 of the insulating covers 161 and extends in the axial direction. In addition, the through-holes constituted of the recesses 177 of the insulating covers 161 are axially aligned respectively with the recesses 105 formed in the axial end face of the inner cylinder member 81.

Moreover, as shown in FIG. 27, the second coil modules 150B are further assembled to the core assembly CA and the first coil modules 150A which have been integrated into one piece. Consequently, the insulating covers 163 are arranged in the circumferential direction with the side walls 181 thereof in contact with or in close proximity to one another. Moreover, the first bridging portions 153A of the first partial windings 151A and the second bridging portions 153B of the second partial windings 151B are arranged so as to intersect one another on an imaginary circle on which the intermediate conductor portions 152 of the first and second partial windings 151A and 151B are aligned with each other in the circumferential direction. Furthermore, each of the insulating covers 163 is arranged so as to have the protruding portion 186 thereof axially overlapping a circumferentially-adjacent pair of the insulating covers 161 and the through-hole 187 of the protruding portion 186 axially connected with the through-hole constituted of a pair of the recesses 177 of the circumferentially-adjacent pair of the insulating covers 161.

Moreover, at this time, for each of the insulating covers 163, the protruding portion 186 of the insulating cover 163 is guided to a predetermined position by a pair of the protrusions 178 of a circumferentially-adjacent pair of the insulating covers 161. Consequently, the through-hole 187 formed in the protruding portion 186 is brought into axial alignment with both the through-hole constituted of a pair of the recesses 177 of the circumferentially-adjacent pair of the insulating covers 161 and a corresponding one of the recesses 105 formed in the axial end face of the inner cylinder member 81. More specifically, in the state of the coil modules 150A and 150B having been assembled to the core assembly CA, the recesses 177 of the insulating covers 161 are located behind the insulating covers 163; therefore, it may be difficult to axially align, for each of the insulating covers 163, the through-hole 187 formed in the protruding portion 186 of the insulating cover 163 with the through-hole constituted of a pair of the recesses 177 of a circumferentially-adjacent pair of the insulating covers 161. In this regard, in the present embodiment, with the protruding portion 186 of the insulating cover 163 being guided by a pair of the protrusions 178 of a circumferentially-adjacent pair of the insulating covers 161, the through-hole 187 formed in the protruding portion 186 can be easily brought into axial alignment with the through-hole constituted of a pair of the recesses 177 of the circumferentially-adjacent pair of the insulating covers 161.

Then, as shown in FIGS. 28(a) and 28(b), for each of the insulating covers 163, the protruding portion 186 of the insulating cover 163 is fixed, by a fixing pin 191, to the circumferentially-adjacent pair of the insulating covers 161 that axially overlap the protruding portion 186. More specifically, with the through-hole 187 of the protruding portion 186 axially aligned with both the through-hole constituted of a pair of the recesses 177 of the circumferentially-adjacent pair of the insulating covers 161 and a corresponding one of the recesses 105 of the inner cylinder member 81, the fixing pin 191 is inserted into the through-hole 187, the through-hole constituted of the pair of the recesses 177 and the corresponding recess 105. Consequently, the insulating covers 161 and 163 are together fixed to the inner cylinder member 81. With the above configuration, each of the second coil modules 150B is fixed, together with a circumferentially-adjacent pair of the first coil modules 150A, to the core assembly CA by a common fixing pin 191 at the coil end CE. It is preferable for the fixing pins 191 to be formed of a material having high thermal conductivity, such as a metal.

As shown in FIG. 28(b), each of the fixing pins 191 is assembled to the lower step part 186a of the protruding portion 186 of a corresponding one of the insulating covers 163. In this state, an upper end portion of the fixing pin 191 protrudes upward from the lower step portion 186a, but not beyond an upper surface (or the outer wall 182) of the corresponding insulating cover 163. That is, the fixing pin 191 is longer than the axial height of the overlap part between the protruding portion 186 (more specifically, the lower step portion 186a) of the corresponding insulating cover 163 and a corresponding pair of the insulating cover 161, and thus has a margin for protruding upward from the overlap part. Consequently, it becomes possible to facilitate the insertion of the fixing pin 191 into the recesses 105 and 177 and the through-hole 187 (i.e., facilitate the fixing of the corresponding coil modules 150A and 150B to the core assembly CA by the fixing pin 191). Moreover, since the upper end portion of the fixing pin 191 does not protrude beyond the upper surface (or the outer wall 182) of the corresponding insulating cover 163, the axial length of the stator 60 is prevented from being increased due to the protrusion of the fixing pin 191.

After the fixing of the insulating covers 161 and 163 by the fixing pins 191, the adhesive is filled between the insulating covers 161 and 163 through the through-holes 188 formed in the insulating covers 163. Consequently, the insulating covers 161 and 163 overlapping each other in the axial direction are firmly bonded together. In addition, in FIGS. 28(a) and 28(b), for the sake of convenience, the through-hole 188 is shown in the range from the upper surface to the lower surface of the insulating cover 163; however, the through-hole 188 is actually formed in a thin plate portion of the insulating cover 163 which is formed by wall thinning or the like.

As shown in FIG. 28(b), the position of fixing the insulating covers 161 and 163 by the fixing pins 191 is on an axial end face of the stator holder 70 located on the radially inner side (i.e., the left side in the figure) of the stator core 62. The insulating covers 161 and 163 are fixed by the fixing pins 191 to the stator holder 70. That is, the first bridging portions 153A of the first partial windings 151A are fixed to the axial end face of the stator holder 70. In this case, since the coolant passage 85 is formed in the stator holder 70, heat generated in the first partial windings 151A can be directly transferred from the first bridging portions 153A to the vicinity of the coolant passage 85 in the stator holder 70. Moreover, since the fixing pins 191 are inserted respectively in the recesses 105 of the stator holder 70, the heat transfer to the stator holder 70 can be enhanced through the fixing pins 191. Consequently, with the above configuration, it becomes possible to improve the performance of cooling the stator coil 61.

In the present embodiment, eighteen insulating covers 161 and eighteen insulating covers 163 are arranged respectively on the axially inner side and the axially outer side at the coil end CE so as to overlap each other in the axial direction. Moreover, eighteen recesses 105 are formed respectively at eighteen positions in the axial end face of the stator holder 70. That is, the number of the recesses 105 is equal to the number of the insulating covers 161 and to the number of the insulating covers 163. Furthermore, eighteen fixing pins 191 for fixing the insulating covers 161 and 163 are inserted respectively in the eighteen recesses 105.

Although not shown in the drawings, the insulating covers 162 and 164, which are located on the opposite axial side of the core assembly CA to the insulating covers 161 and 163, are fixed to the core assembly CA in a similar manner to the insulating covers 161 and 163. Specifically, in the state of the first coil modules 150A having been assembled to the core assembly CA, the insulating covers 162 are arranged in the circumferential direction with the side walls 171 thereof in contact with or in close proximity to one another. Consequently, a plurality of through-holes are formed each of which is constituted of a circumferentially-adjacent pair of the recesses 177 of the insulating covers 162 and extends in the axial direction. Moreover, the through-holes constituted of the recesses 177 of the insulating covers 162 are axially aligned respectively with the recesses 106 formed in the axial end face of the outer cylinder member 71. Further, in the state of the second coil modules 150B having been assembled to the assembly of the core assembly CA and the first coil modules 150A, the through-holes 187 of the insulating covers 164 are axially aligned respectively with the through-holes constituted of the recesses 177 of the insulating covers 162 and with the recesses 106 of the outer cylinder member 71. Then, the fixing pins 191 are inserted into the recesses 106 and 177 and the through-hole 187, thereby fixing the insulating covers 162 and 164 together to the outer cylinder member 71.

The coil modules 150A and 150B may be assembled to the core assembly CA by: first assembling all the first coil modules 150A to a radially outer part of the core assembly CA; then assembling all the second coil modules 150B to the assembly of the core assembly CA and the first coil modules 150A; and thereafter fixing all the coil modules 150A and 150B to the core assembly CA by the fixing pins 191. Alternatively, the coil modules 150A and 150B may be assembled to the core assembly CA by: first fixing a pair of the first coil modules 150A and one of the second coil modules 150B together to the core assembly CA by one of the fixing pins 191; and then repeating the assembling of one of the remaining first coil modules 150A, the assembling of one of the remaining second coil modules 150B and the fixing by one of the remaining fixing pins 191 in this order.

Next, the configuration of the busbar module 200 will be described.

Figure 29:
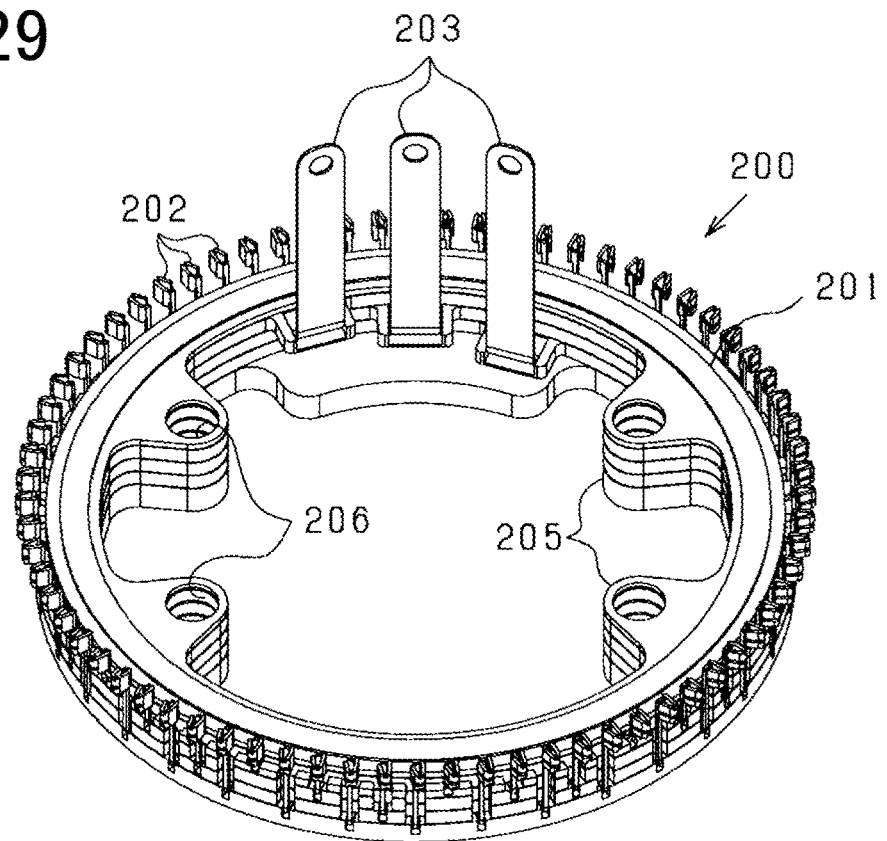
FIG. 29 is a perspective view of a busbar module of the rotating electric machine.
Figure 30:
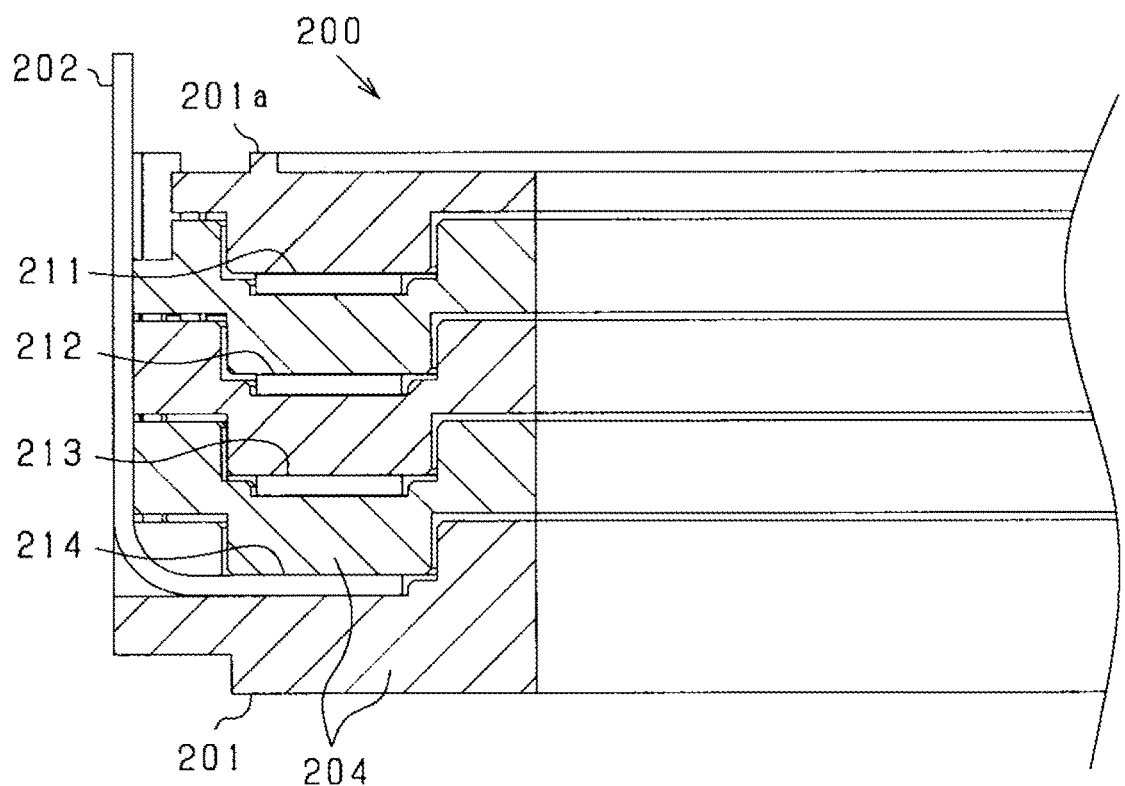
FIG. 30 is a cross-sectional view showing part of a longitudinal cross section of the busbar module.

The busbar module 200 is electrically connected with the partial windings 151 of the coil modules 150 of the stator coil 61. The busbar module 200 is a winding connecting member which connects, for each phase of the stator coil 61, first ends of the partial windings 151 of the phase in parallel with each other and second ends of the partial windings 151 of the phase together at the neutral point. FIG. 29 is a perspective view of the busbar module 200. FIG. 30 is a cross-sectional view showing part of a longitudinal cross section of the busbar module 200.

The busbar module 200 has an annular portion 201, a plurality of connection terminals 202 extending from the annular portion 201, and three input/output terminals 203 provided respectively for the three phase windings of the stator coil 61. The annular portion 201 is formed of an electrically insulative material, such as a resin, into an annular shape.

As shown in FIG. 30, the annular portion 201 includes a plurality (e.g., five in the present embodiment) of substantially annular lamination plates 204 that are laminated in the axial direction. Moreover, in the annular portion 201, there are embedded four busbars 211-214 each of which is annular-shaped and sandwiched between an axially-adjacent pair of the lamination plates 204. The busbars 211-214 include a U-phase busbar 211, a V-phase busbar 212, a W-phase busbar 213 and a neutral busbar 214. The busbars 211-214 are arranged in alignment with each other in the axial direction with plate surfaces thereof facing one another. The lamination plates 204 and the busbars 211-214 are joined to one another by an adhesive. It is preferable to employ adhesive sheets as the adhesive. Alternatively, a liquid or semiliquid adhesive may be applied between the lamination plates 204 and the busbars 211-214. Each of the connection terminals 202 is connected with a corresponding one of the busbars 211-214 so as to protrude radially outside from the annular portion 201.

On an upper surface of the annular portion 201, i.e., on an upper surface of that lamination plate 204 which is located axially outermost among all of the five lamination plates 204, there is formed a protrusion 201a that extends in an annular shape.

The busbar module 200 may be formed in any suitable manner such that the busbars 211-214 are embedded in the annular portion 201. For example, the busbar module 200 may be formed by insert-molding with the busbars 211-214 arranged at predetermined intervals. Moreover, the arrangement of the busbars 211-214 is not limited to the above-described configuration where all the busbars 211-214 are axially aligned with each other and all the plate surfaces of the busbars 211-214 are oriented in the same direction. For example, a configuration where all the busbars 211-214 are radially aligned with each other, a configuration where the busbars 211-214 are arranged in two rows in the axial direction as well as in two rows in the radial direction, or a configuration where the plate surfaces of the busbars 211-214 extend in different directions from each other may alternatively be employed.

As shown in FIG. 29, the connection terminals 202 are aligned with each other in the circumferential direction of the annular portion 201 and axially extend on the radially outer side of the annular portion 201. Moreover, the connection terminals 202 include U-phase connection terminals 202 connected with the U-phase busbar 211, V-phase connection terminals 202 connected with the V-phase busbar 212, and W-phase connection terminals 202 connected with the W-phase busbar 213, and neutral connection terminals 202 connected with the neutral busbar 214. The number of the connection terminals 202 is set to be equal to the number of the winding end portions 154 and 155 of the partial windings 151 of the coil modules 150. Each of the connection terminals 202 is connected to a corresponding one of the winding end portions 154 and 155 of the partial windings 151 of the coil modules 150. Consequently, the busbar module 200 is connected to each of the U-phase partial windings 151, the V-phase partial windings 151 and the W-phase partial windings 151.

The input/output terminals 203 are formed of, for example, a busbar material and arranged to extend in the axial direction. The input/output terminals 203 include a U-phase input/output terminal 203U, a V-phase input/output terminal 203V and a W-phase input/output terminal 203W. The U-phase, V-phase and W-phase input/output terminals 203U-203W are connected, in the annular portion 201, respectively with the U-phase, V-phase and W-phase busbars 211-213. Through these input/output terminals 203, electric power is inputted from an inverter (not shown in the drawings) to the phase windings of the stator coil 61 or outputted from the phase windings of the stator coil 61 to the inverter.

In addition, in the busbar module 200, there may be integrally provided current sensors that respectively detect phase currents flowing respectively through the phase windings of the stator coil 61. Further, in the busbar module 200, there may be provided a current detection terminal so that the detection results of the current sensors can be outputted to a controller (not shown in the drawings) through the current detection terminal.

The annular portion 201 has a plurality of protrusions 205 formed on the radially inner periphery thereof so as to protrude radially inward; the protrusions 205 serve as fixed portions of the busbar module 200 to the stator holder 70. Moreover, in each of the protrusions 205, there is formed a through-hole 206 that extends in the axial direction.

Figure 31:
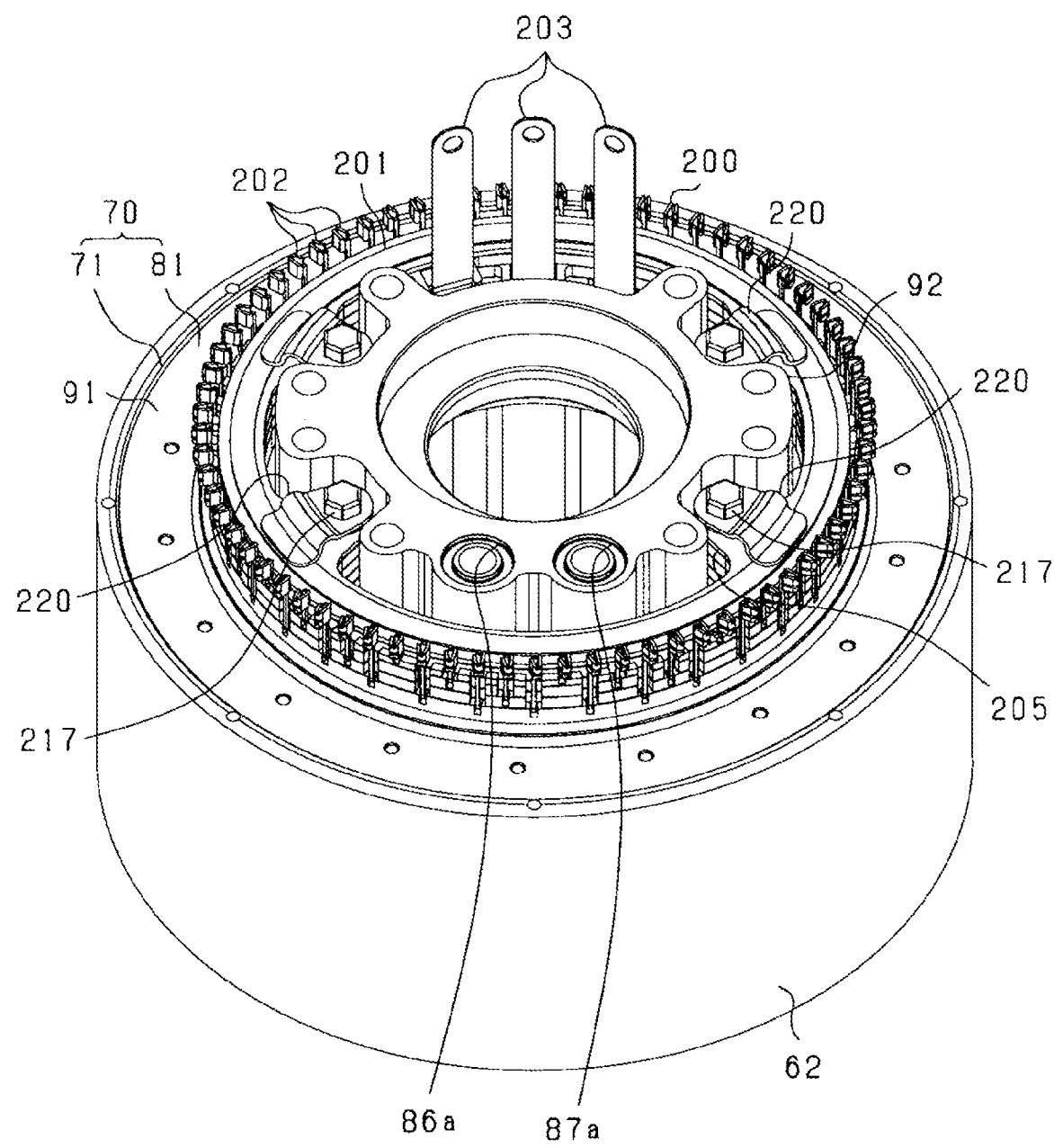
FIG. 31 is a perspective view showing the busbar module in a state of having been assembled to a stator holder.
Figure 32:
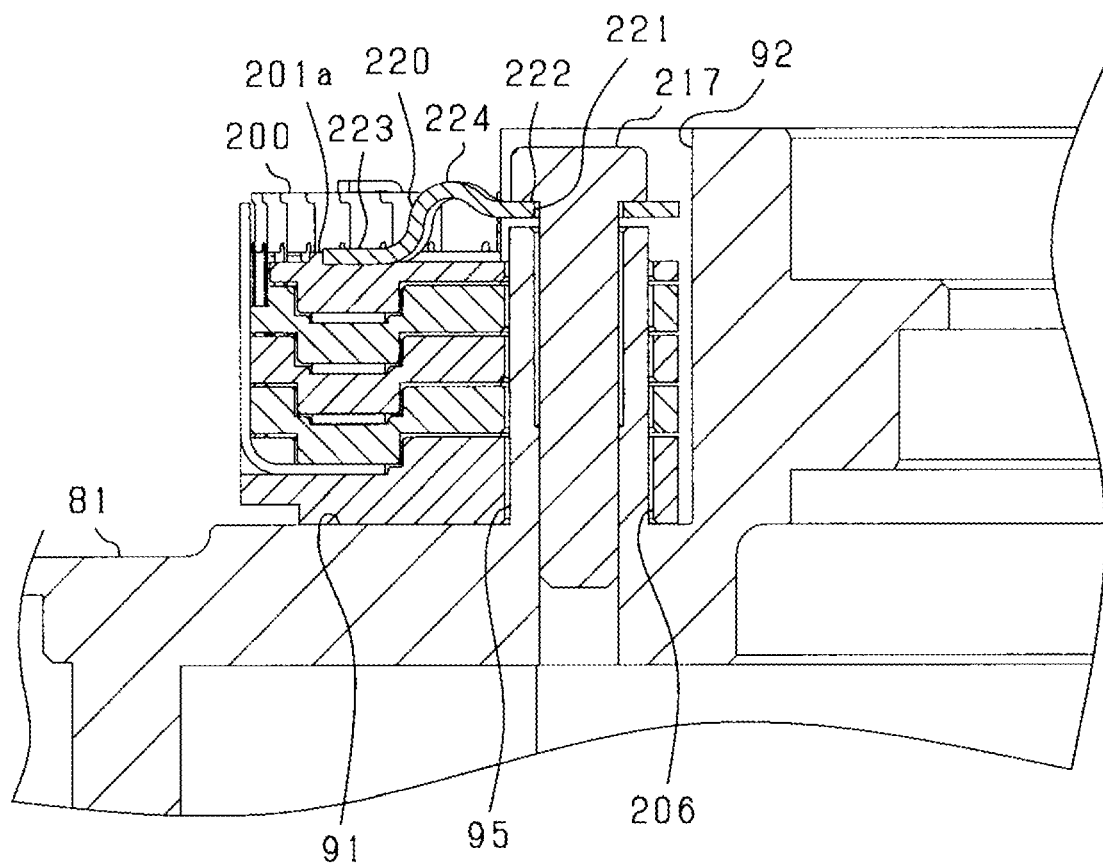
FIG. 32 is a longitudinal cross-sectional view illustrating the fixing of the busbar module to the stator holder.

FIG. 31 is a perspective view showing the busbar module 200 in a state of having been assembled to the stator holder 70. FIG. 32 is a longitudinal cross-sectional view illustrating the fixing of the busbar module 200 to the stator holder 70. In addition, the configuration of the stator holder 70 without the busbar module 200 assembled thereto is illustrated in FIG. 12.

As shown in FIG. 31, the busbar module 200 is placed on the end plate portion 91 so as to surround the boss portion 92 of the inner cylinder member 81. The busbar module 200 is fixed, in a state of being positioned by the assembly thereof to the pillar portions 95 (see FIG. 12) of the inner cylinder member 81, to the stator holder 70 (more specifically, to the inner cylinder member 81) by fastening fasteners 217 such as bolts.

More specifically, as shown in FIG. 32, each of the pillar portions 95 is formed on the end plate portion 91 of the inner cylinder member 81 so as to extend in the axial direction. Moreover, in the state of the pillar portions 95 being inserted respectively in the through-holes 206 formed in the protrusions 205 of the annular portion 201, the busbar module 200 is fixed to the pillar portions 95 by the fasteners 217. In the present embodiment, the busbar module 200 is fixed with retainer plates 220 that are formed of a metal material such as iron. Each of the retainer plates 220 has a fastened part 222, a pressing part 223 and a bend part 224. The fastened part 222 has an insertion hole 221 through which a corresponding one of the fasteners 217 is inserted. The pressing part 223 is provided to press the upper surface of the annular portion 201 of the busbar module 200. The bend part 224 is formed between the fastened part 222 and the pressing part 223.

In mounting each of the retainer plates 220, a corresponding one of the fasteners 217 is inserted through the insertion hole 221 formed in the fastened part 222 of the retainer plate 220 and screwed into the corresponding pillar portion 95 of the inner cylinder member 81. Moreover, the pressing part 223 of the retainer plate 220 is placed in contact with the upper surface of the annular portion 201 of the busbar module 200. As the corresponding fastener 217 is screwed into the corresponding pillar portion 95 of the inner cylinder member 81, the retainer plate 220 is pushed downward by the corresponding fastener 217, causing the annular portion 201 of the busbar module 200 to be pressed downward by the pressing part 223 of the retainer plate 220. In this case, the downward pressing force generated by the screwing of the corresponding fastener 217 is transmitted to the pressing part 223 through the bend part 224 of the retainer plate 220; therefore, the pressing by the pressing part 223 is made with elastic force of the bend part 224.

As described above, on the upper surface of the annular portion 201 of the busbar module 200, there is formed the annular protrusion 201a. Moreover, a distal end of the retainer plate 220 on the pressing part 223 side is configured to be capable of abutting the protrusion 201a. Consequently, it is possible to prevent the downward pressing force of the retainer plate 220 from escaping radially outward. That is, the pressing force generated with the screwing of the corresponding fastener 217 can be suitably transmitted to the pressing part 223 side.

In addition, as shown in FIG. 31, in the state of the busbar module 200 having been assembled to the stator holder 70, the input/output terminals 203 are located 180 degrees opposite in the circumferential direction to the inlet opening 86a and the outlet opening 87a both of which communicate with the coolant passage 85. It should be noted that the input/output terminals 203 may alternatively be provided at the same position as (or adjacent to) the openings 86a and 87a.

Next, explanation will be given of a relay member 230 for electrically connecting the input/output terminals 203 of the busbar module 200 to an external device provided outside the rotating electric machine 10.

As shown in FIG. 1, in the rotating electric machine 10, the input/output terminals 203 of the busbar module 200 are provided so as to protrude outward from the housing cover 242; and the input/output terminals 203 are connected to the relay member 230 on the outside of the housing cover 242. The relay member 230 is a member which relays the electrical connection between the input/output terminals 203 for respective phases extending from the busbar module 200 and electric power lines for respective phases extending from an external device such as an inverter.

Figure 33:
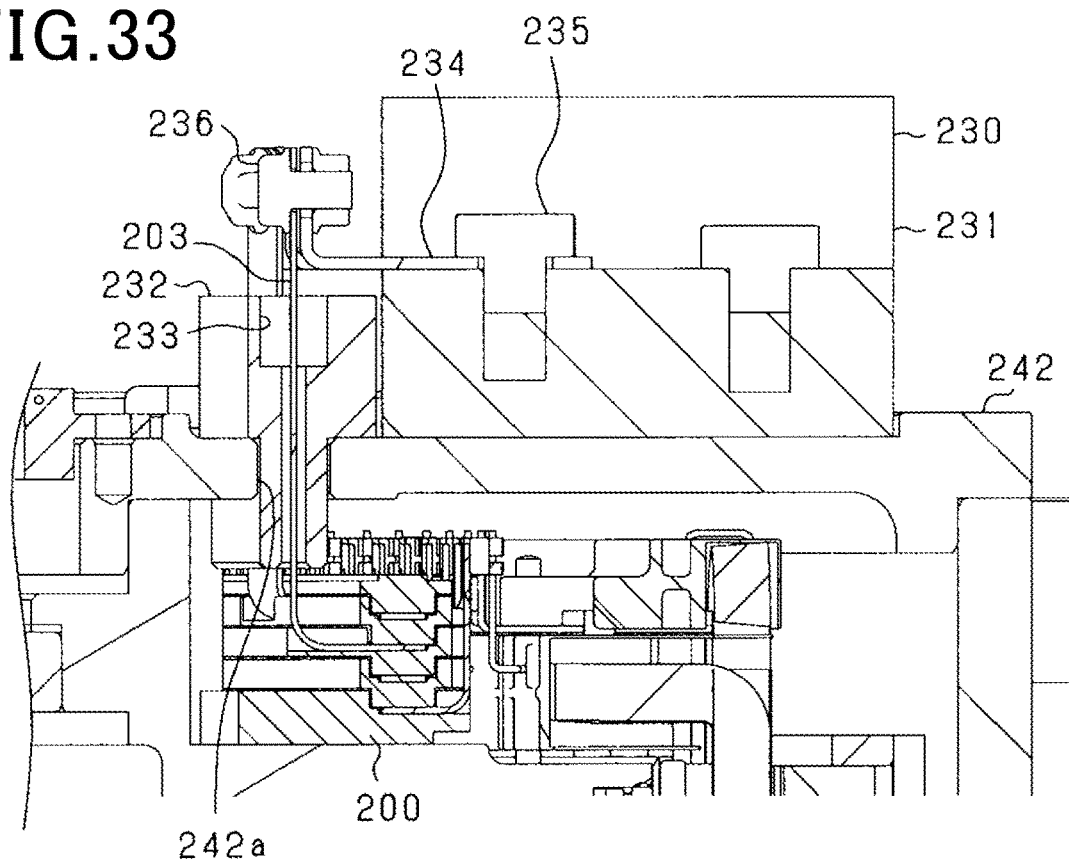
FIG. 33 is a longitudinal cross-sectional view showing a relay member in a state of having been mounted to a housing cover.
Figure 34:
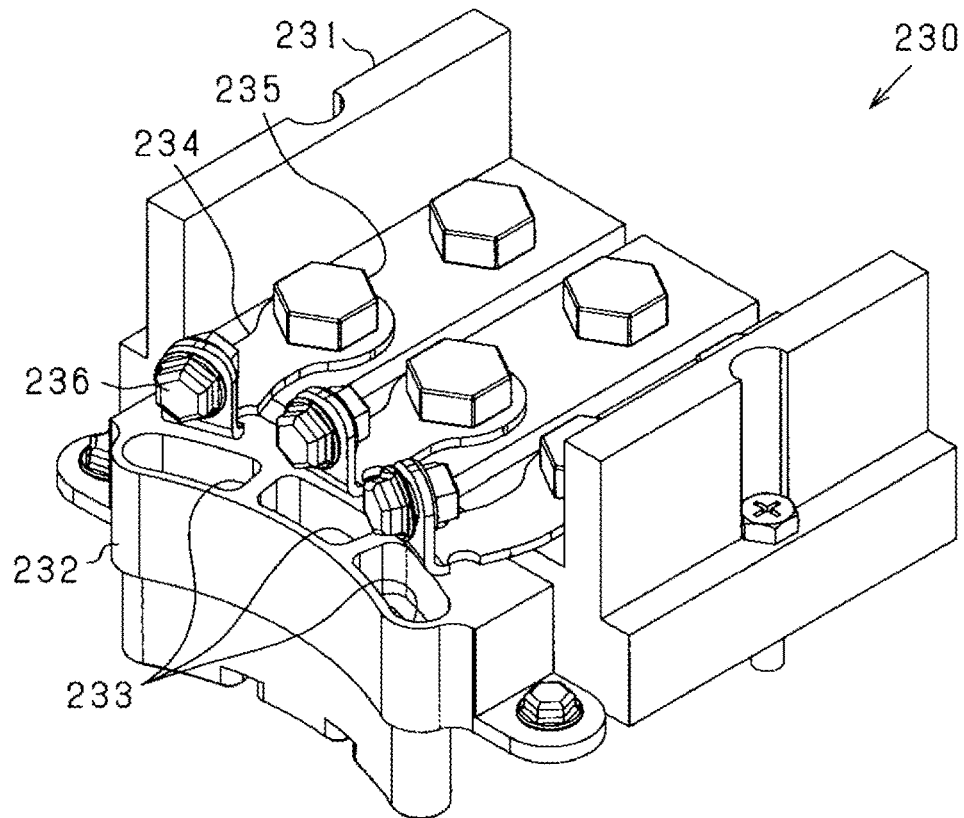
FIG. 34 is a perspective view of the relay member.

FIG. 33 is a longitudinal cross-sectional view showing the relay member 230 in a state of having been mounted to the housing cover 242. FIG. 34 is a perspective view of the relay member 230. As shown in FIG. 33, a through-hole 242a is formed in the housing cover 242, so that the input/output terminals 203 can be led out through the through-hole 242a.

The relay member 230 has a main body 231 fixed to the housing cover 242 and a terminal insertion portion 232 inserted in the through-hole 242a of the housing cover 242. The terminal insertion portion 232 has three insertion holes 233 in which the three input/output terminals 203 are respectively inserted. The insertion holes 233 have respective openings that are long in cross-sectional shape. Moreover, the insertion holes 233 are formed in alignment with each other in a direction substantially coinciding with each of the longitudinal directions thereof.

To the main body 231 of the relay member 230, there are mounted three relay busbars 234 for respective phases. Specifically, each of the relay busbars 234 is formed by bending in a substantially L-shape. Each of the relay busbars 234 is fastened to the main body 231 of the relay member 230 by a fastener 235 such as a bolt. Moreover, each of the relay busbars 234 is also fastened, by a fastener 236 such as a pair of a bolt and a nut, to a distal end portion of a corresponding one of the input/output terminals 203 that are inserted respectively in the insertion holes 233 formed in the terminal insertion portion 232 of the relay member 230.

In addition, although not shown in the drawings, the electric power lines for respective phases extending from the external device can be connected to the relay member 230 to input/output electric power respectively from/to the input/output terminals 203 of the busbar module 200.

Figure 35:
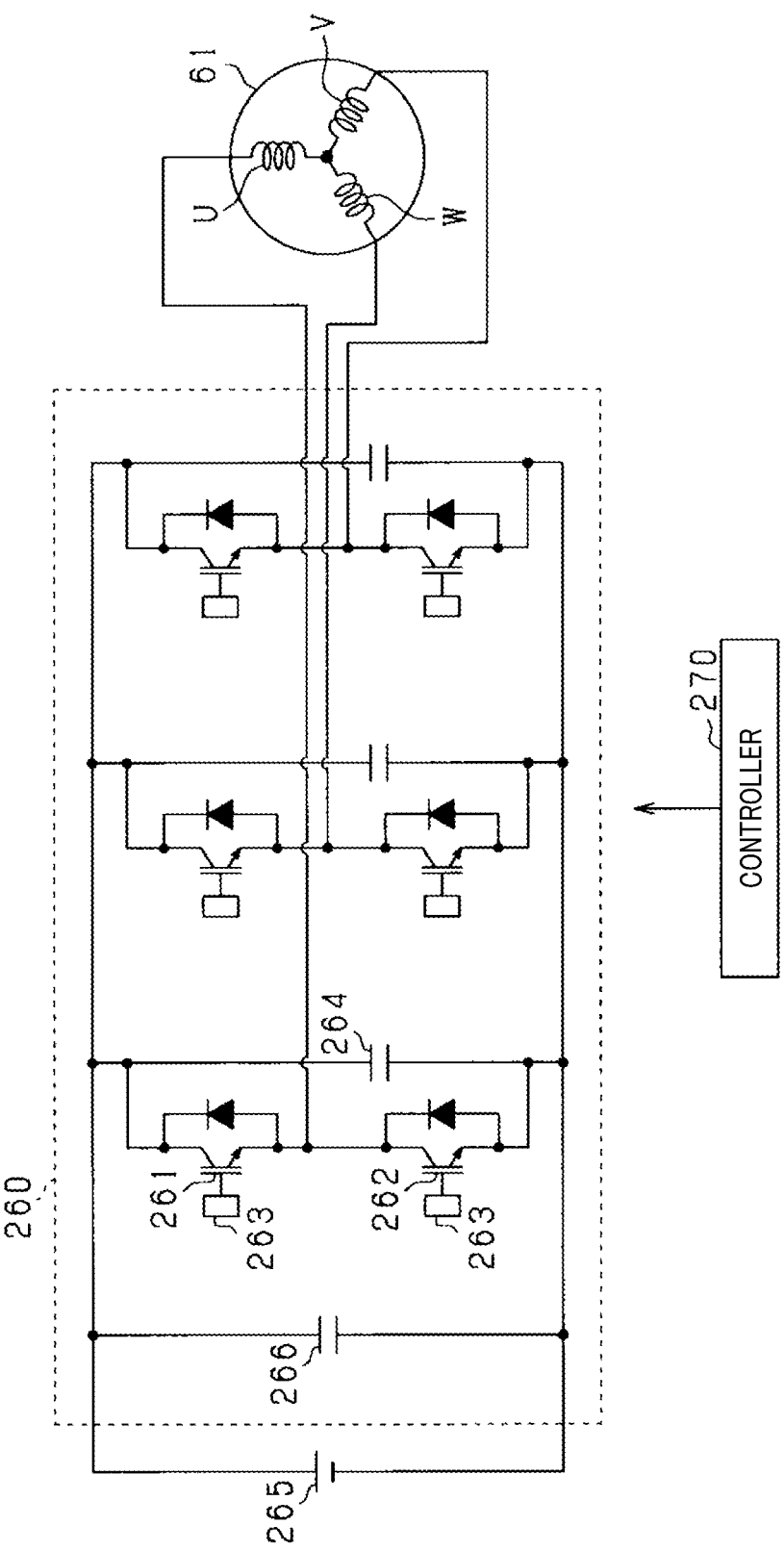
FIG. 35 is an electric circuit diagram of a control system of the rotating electric machine.
Figure 36:
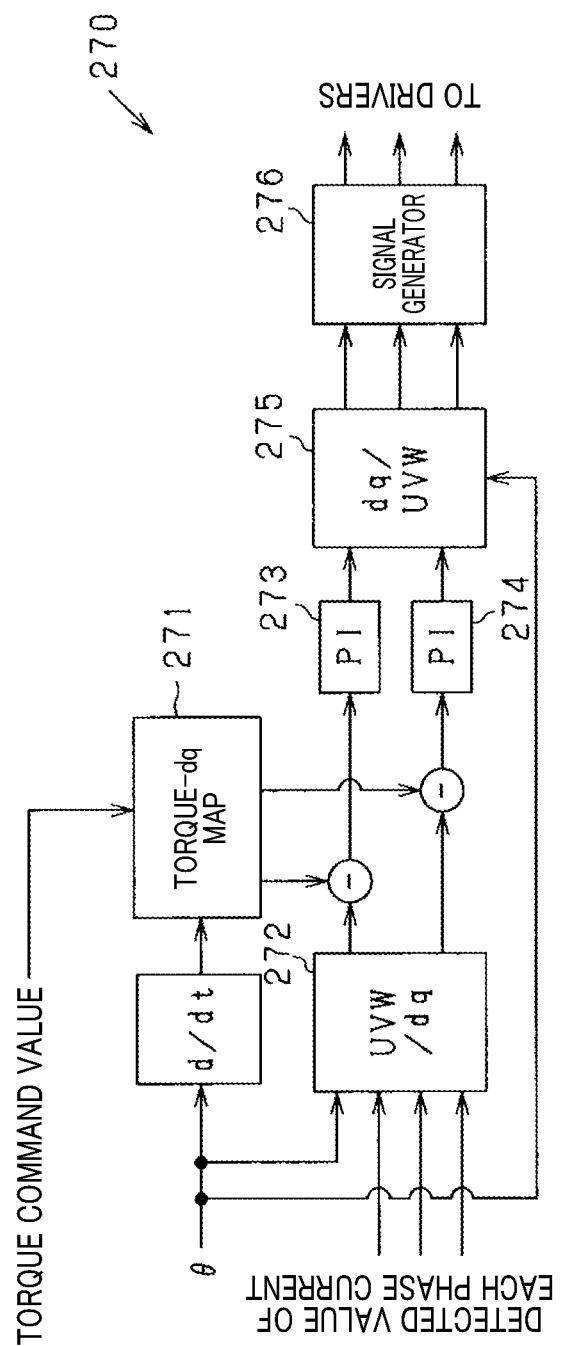
FIG. 36 is a functional block diagram illustrating a current feedback control process performed by a controller.

Next, the configuration of a control system that controls the rotating electric machine 10 will be described. FIG. 35 is an electric circuit diagram of the control system of the rotating electric machine 10. FIG. 36 is a functional block diagram illustrating a control process performed by a controller 270 of the control system.

As shown in FIG. 35, in the present embodiment, the stator coil 61 is comprised of the U, V, and W phase windings. To the stator coil 61, there is connected an inverter 260 that is an electric power converter. In the inverter 260, there is formed a full bridge circuit having a plurality of pairs of upper and lower arms. The number of pairs of the upper and lower arms is equal to the number of the phase windings of the stator coil 61. The full bridge circuit includes, for each of the U, V and W phases, one serially-connected unit consisting of an upper-arm switch 261 and a lower-arm switch 262. Each of the switches 261 and 262 is turned on and off by a corresponding switch driver 263, so as to supply alternating current to a corresponding one of the U, V, and W phase windings. Each of the switches 261 and 262 is configured with a semiconductor switching element such as a MOSFET or an IGBT. Moreover, each serially-connected unit, which corresponds to one of the U, V and W phases and consists of one upper-arm switch 261 and one lower-arm switch 262, has a charge supply capacitor 264 connected in parallel therewith to supply electric charge required for the switching operation of the switches 261 and 262.

To an intermediate junction point between the upper-arm and lower-arm switches 261 and 262 of each of the serially-connected units for respective phases, there is connected a first end of a corresponding one of the U-phase, V-phase and W-phase windings. The U-phase, V-phase and W-phase windings are star-connected (or Y-connected) to define a neutral point therebetween, at which second ends of these phase windings are connected with each other.

The controller 270 includes a microcomputer that is configured with a CPU and various memories. Based on various types of detected information on the rotating electric machine 10 and power running drive and electric power generation requests, the controller 270 performs energization control by turning on and off the switches 261 and 262 of the inverter 260. The detected information on the rotating electric machine 10 includes, for example, a rotation angle (or electrical angle information) of the rotor 20 detected by an angle detector such as a resolver, a power supply voltage (or inverter input voltage) detected by a voltage sensor, and phase currents detected by respective current sensors. The controller 270 controls the on/off operation of each of the switches 261 and 262 by, for example, PWM control at a predetermined switching frequency (or carrier frequency) or a rectangular wave control. The controller 270 may be either a built-in controller incorporated in the rotating electric machine 10 or an external controller provided outside the rotating electric machine 10.

In addition, in the rotating electric machine 10 according to the present embodiment, with employment of the slot-less structure (or toothless structure), the inductance of the stator 60 is lowered; thus the electrical time constant is accordingly lowered. When the electrical time constant is low, it is preferable to increase the switching frequency (or carrier frequency) and the switching speed. In this regard, in the present embodiment, the wiring inductance is lowered with the charge supply capacitor 264 connected in parallel with the upper-arm and lower-arm switches 261 and 262 of each of the serially-connected units for respective phases. Consequently, even with the increased switching speed, it is still possible to suitably cope with surge.

The inverter 260 has its high potential-side terminal connected to a positive terminal of a DC power supply 265 and its low potential-side terminal connected to a negative terminal of the DC power supply 265 (or ground). The DC power supply 265 may be implemented by, for example, an assembled battery that is composed of a plurality of battery cells connected in series with each other. Moreover, between the high potential-side and low potential-side terminals of the inverter 260, there is further connected a smoothing capacitor 266 in parallel with the DC power supply 265.

FIG. 36 is a block diagram illustrating a current feedback control process for controlling the U-phase, V-phase and W-phase currents.

In FIG. 36, a current command value setter 271 is configured to set, using a torque-dq map, both a d-axis current command value and a q-axis current command value on the basis of a power running torque command value or an electric power generation torque command value to the rotating electric machine 10 and an electrical angular speed ω obtained by differentiating the electrical angle θ with respect to time. In addition, in the case of the rotating electric machine 10 being used as a vehicular power source, the electric power generation torque command value is a regenerative torque command value.

A dq converter 272 is configured to convert current detected values (three phase currents), which are detected by the current sensors provided for respective phases, into d-axis current and q-axis current which are current components in a Cartesian two-dimensional rotating coordinate system whose d-axis indicates a field direction (or direction of an axis of a magnetic field).

A d-axis current feedback controller 273 is configured to calculate a d-axis command voltage as a manipulated variable for feedback-controlling the d-axis current to the d-axis current command value. A q-axis current feedback controller 274 is configured to calculate a q-axis command voltage as a manipulated variable for feedback-controlling the q-axis current to the q-axis current command value. These feedback controllers 273 and 274 are configured to calculate, using a PI feedback method, the command voltages on the basis of the differences of the d-axis current and the q-axis current from the respective current command values.

A three-phase converter 275 is configured to convert the d-axis and q-axis command voltages into U-phase, V-phase and W-phase command voltages. In addition, the above units 271-275 together correspond to a feedback controller for performing feedback control of fundamental currents by a dq conversion method. The U-phase, V-phase and W-phase command voltages are the feedback-controlled values.

An operation signal generator 276 is configured to generate, using a well-known triangular-wave carrier comparison method, operation signals for the inverter 260 on the basis of the U-phase, V-phase and W-phase command voltages. Specifically, the operation signal generator 276 generates the operation signals (or duty signals) for operating the upper-arm and lower-arm switches of the U, V and W phases by PWM control based on comparison in amplitude between signals, which are obtained by normalizing the U-phase, V-phase and W-phase command voltages with respect to the power supply voltage, and a carrier signal such as a triangular-wave signal. The operation signals generated by the operation signal generator 276 are outputted to the switch drivers 263 of the inverter 260. Then, the switches 261 and 262 of the U, V and W phases are turned on and off by the switch drivers 263 based on the operation signals.

Next, a torque feedback control process will be described. This process is performed mainly for reducing losses and thereby increasing the output of the rotating electric machine 10 in operating conditions where the output voltage of the inverter 260 becomes high, such as in a high-rotation region and a high-output region. The controller 270 selectively performs either one of the torque feedback control process and the current feedback control process according to the operating condition of the rotating electric machine 10.

Figure 37:
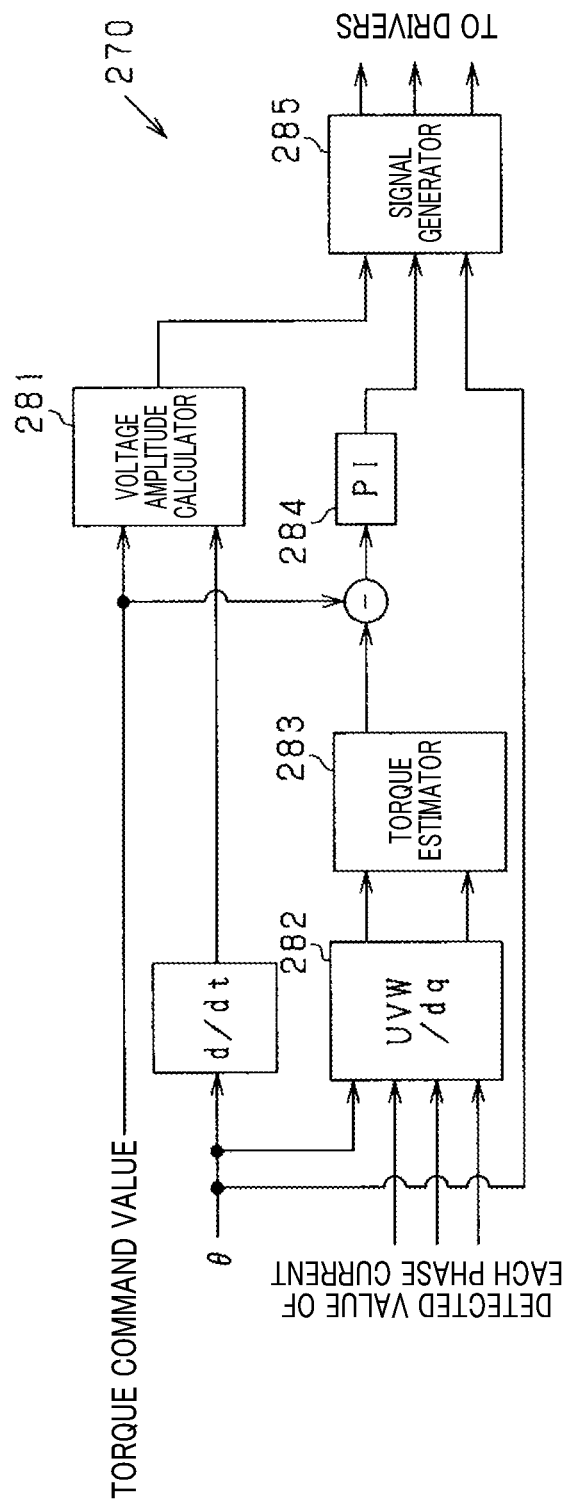
FIG. 37 is a functional block diagram illustrating a torque feedback control process performed by the controller.

FIG. 37 is a block diagram illustrating the torque feedback control process corresponding to the U, V and W phases.

A voltage amplitude calculator 281 is configured to calculate a voltage amplitude command, which indicates a command value of the amplitudes of voltage vectors, on the basis of the power running torque command value or the electric power generation torque command value to the rotating electric machine 10 and the electrical angular speed co obtained by differentiating the electrical angle θ with respect to time.

Similar to the above-described dq converter 272, a dq converter 282 is configured to convert current detected values, which are detected by the current sensors provided for respective phases, into d-axis current and q-axis current. A torque estimator 283 is configured to calculate a torque estimated value corresponding to the U, V and W phases on the basis of the d-axis current and q-axis current obtained by the dq converter 282. In addition, the torque estimator 283 may calculate the voltage amplitude command on the basis of map information associating the d-axis and q-axis currents with the voltage amplitude command.

A torque feedback controller 284 is configured to calculate a voltage phase command, which indicates command values of the phases of the voltage vectors, as a manipulated variable for feedback-controlling the torque estimated value to the power running torque command value or the electric power generation torque command value. More specifically, the torque feedback controller 284 calculates, using a PI feedback method, the voltage phase command on the basis of the difference of the torque estimated value from the power running torque command value or the electric power generation torque command value.

An operation signal generator 285 is configured to generate operation signals for the inverter 260 on the basis of the voltage amplitude command, the voltage phase command and the electrical angle θ. Specifically, the operation signal generator 285 first calculates U-phase, V-phase and W-phase command voltages on the basis of the voltage amplitude command, the voltage phase command and the electrical angle θ. Then, the operation signal generator 285 generates the operation signals for operating the upper-arm and lower-arm switches of the U, V and W phases by PWM control based on comparison in amplitude between signals, which are obtained by normalizing the calculated U-phase, V-phase and W-phase command voltages with respect to the power supply voltage, and a carrier signal such as a triangular-wave signal. The operation signals generated by the operation signal generator 285 are outputted to the switch drivers 263 of the inverter 260. Then, the switches 261 and 262 of the U, V and W phases are turned on and off by the switch drivers 263 based on the operation signals.

In addition, as an alternative, the operation signal generator 285 may generate the switch operation signals on the basis of pulse pattern information, the voltage amplitude command, the voltage phase command and the electrical angle θ. The pulse pattern information is map information associating the switch operation signals with the voltage amplitude command, the voltage phase command and the electrical angle θ.

Modifications of First Embodiment

Hereinafter, modifications of the above-described embodiment will be described.

Figure 38:
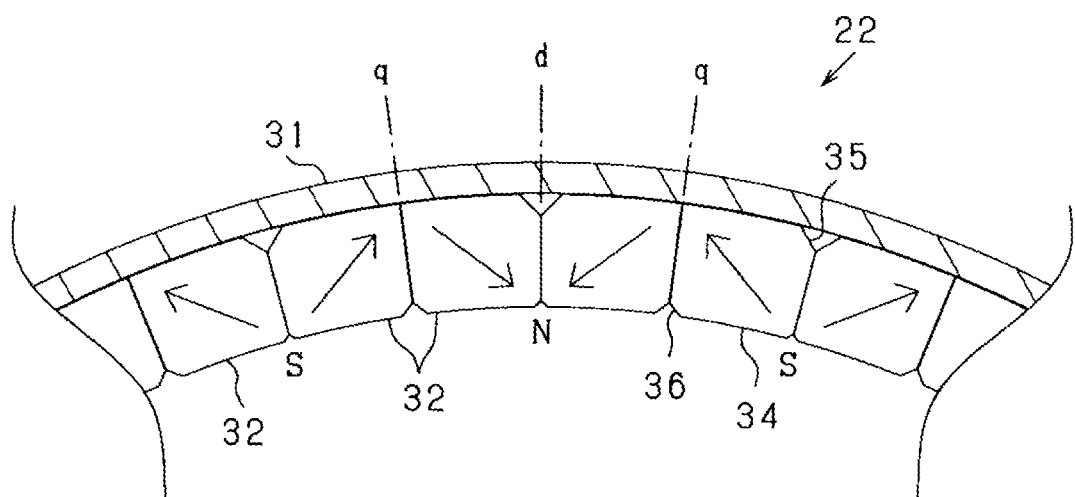
FIG. 38 is a transverse partial cross-sectional view illustrating the cross-sectional structure of a magnet unit according to a modification.

The configuration of the magnets 32 in the magnet unit 22 may be modified as follows. In the magnet unit 22 shown in FIG. 38, the directions of the easy axes of magnetization in the magnets 32 are oblique to the radial directions; and straight magnet magnetic paths are formed along the directions of the easy axes of magnetization. With this configuration, it is also possible to make the magnet magnetic paths in the magnets 32 longer than the radial width of the magnets 32, thereby improving the permeance.

The magnet unit 22 may alternatively employ magnets that arranged in a Halbach array.

In each of the partial windings 151, the bridging portions 153 may be bent radially inward or radially outward. More specifically, with respect to the core assembly CA, each of the first bridging portions 153A of the first partial windings 151A may be bent to the core assembly CA side or to the opposite side to the core assembly CA. Moreover, each of the second bridging portions 153B of the second partial windings 151B may also be bent radially inward or radially outward such that it extends, on the axially outer side of the first bridging portions 153A of the first partial windings 151A, circumferentially across part of at least one of the first bridging portions 153A.

The partial windings 151 constituting the stator coil 61 may include only one type of partial windings 151 instead of the two types of partial windings 151 (i.e., the first partial windings 151A and the second partial windings 151B). Specifically, each of the partial windings 151 may be formed to have a substantially L-shape or a substantially Z-shape in a side view. In the case of each of the partial windings 151 being formed to have a substantially L-shape in a side view, the bridging portion of the partial winding on one axial side is bent radially inward or radially outward while the bridging portion of the partial winding on the other axial side extends straight in the axial direction without being radially bent. On the other hand, in the case of each of the partial windings 151 being formed to have a substantially Z-shape in a side view, the bridging portion of the partial winding on one axial side is bent radially inward while the bridging portion of the partial winding on the other axial side is bent radially outward. In either of the above cases, the coil modules 150 may be fixed to the core assembly CA by the insulating covers covering the bridging portions of the partial windings as described above.

In the above-described embodiment, in each of the phase windings of the stator coil 61, all the partial windings 151 constituting the phase winding are connected in parallel with each other. As an alternative, in each of the phase windings of the stator coil 61, all the partial windings 151 constituting the phase winding may be divided into a plurality of partial-winding groups; each of the partial-winding groups includes a predetermined number of the partial windings connected in parallel with each other and all the partial-winding groups are connected in series with each other. For example, in the case of each of the phase windings of the stator coil 61 being formed of n partial windings 151, then n partial windings 151 may be divided into two (or three) partial-winding groups; each of the two (or three) partial-winding groups includes n/2 (or n/3) partial windings 151 connected in parallel with each other and the two (or three) partial-winding groups are connected in series with each other. As another alternative, in each of the phase windings of the stator coil 61, all the partial windings 151 constituting the phase winding may be connected in series with each other.

In the rotating electric machine 10 according to the above-described embodiment, the stator coil 61 is configured as a three-phase coil to include the U-phase, V-phase and W-phase windings. Alternatively, the stator coil 61 may be configured as a two-phase coil to include only a U-phase winding and a V-phase winding. In this case, in each of the partial windings 151, the pair of intermediate conductor portions 152 may be formed apart from each other by one coil-pitch and have one intermediate conductor portion 152 of one partial winding 151 of the other phase arranged therebetween in the circumferential direction.

Figure 39A:
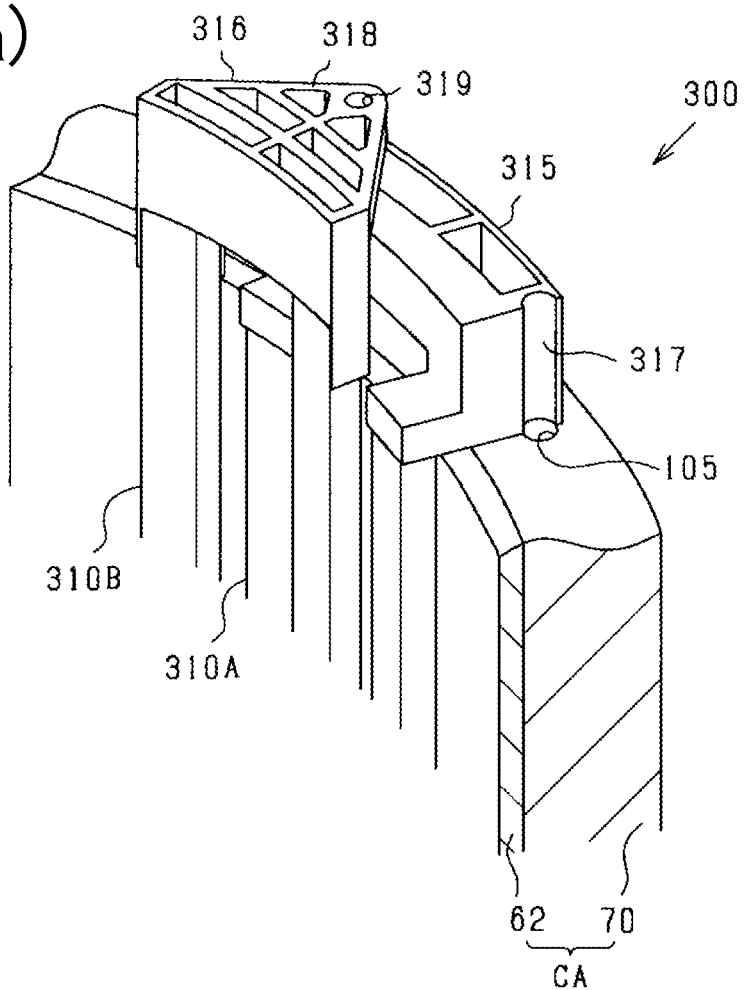
FIGS. 39(a) and 39(b) are diagrams illustrating the configuration of a stator unit of an inner rotor type rotating electric machine.
Figure 39B:
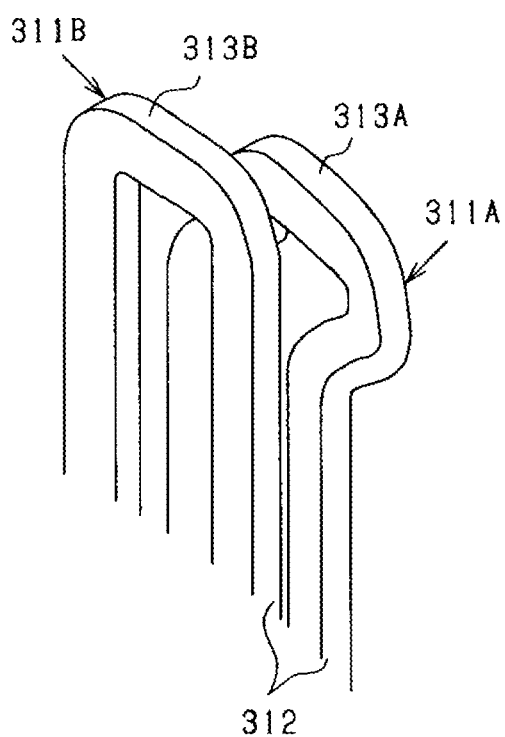

The rotating electric machine 10 according to the above-described embodiment is configured as an outer rotor type SPM (Surface Permanent Magnet) rotating electric machine. Alternatively, the rotating electric machine 10 may be configured as an inner rotor type SPM rotating electric machine. FIGS. 39(*a*) and 39(*b*) are diagrams illustrating the configuration of a stator unit 300 of an inner rotor type SPM rotating electric machine. Specifically, FIG. 39(*a*) is a perspective view showing coil modules 310A and 310B assembled to a core assembly CA. FIG. 39(*b*) is a perspective view showing partial windings 311A and 311B included respectively in the coil modules 310A and 310B. In this example, the core assembly CA includes a stator core 62 and a stator holder 70 assembled to a radially outer periphery of the stator core 62. Moreover, there are a plurality of coil modules 310A and 310B assembled to a radially inner periphery of the stator core 62.

The partial windings 311A have substantially the same configuration as the first partial windings 151A described above. That is, each of the partial windings 311A is ring-shaped to have a pair of intermediate conductor portions 312 and a pair of bridging portions 313A located respectively on opposite axial sides of the pair of intermediate conductor portions 312 to connect the pair of intermediate conductor portions 312. Moreover, each of the bridging portions 313A is bent to the core assembly CA side (i.e., radially outward). On the other hand, the partial windings 311B have substantially the same configuration as the second partial windings 151B described above. That is, each of the partial windings 311B is ring-shaped to have a pair of intermediate conductor portions 312 and a pair of bridging portions 313B located respectively on opposite axial sides of the pair of intermediate conductor portions 312 to connect the pair of intermediate conductor portions 312. Moreover, each of the bridging portions 313B extends straight in the axial direction without being radially bent. Furthermore, each of the bridging portions 313B extends, on the axially outer side of the bridging portions 313A of the partial windings 311A, circumferentially across part of at least one of the bridging portions 313A. Each of the bridging portions 313A of the partial windings 311A has an insulating cover 315 mounted thereon, whereas each of the bridging portions 313B of the partial windings 311B has an insulating cover 316 mounted thereon.

Each of the insulating covers 315 has a pair of recesses 317 formed respectively in opposite circumferential side walls thereof; each of the recesses 317 is semicircular in cross-sectional shape and extends in the axial direction. On the other hand, each of the insulating covers 316 has a protruding portion 318 that protrudes radially outward from the bridging portion 313B. Moreover, in a distal end part of the protruding portion 318, there is formed a through-hole 319 that extends in the axial direction.

Figure 40:
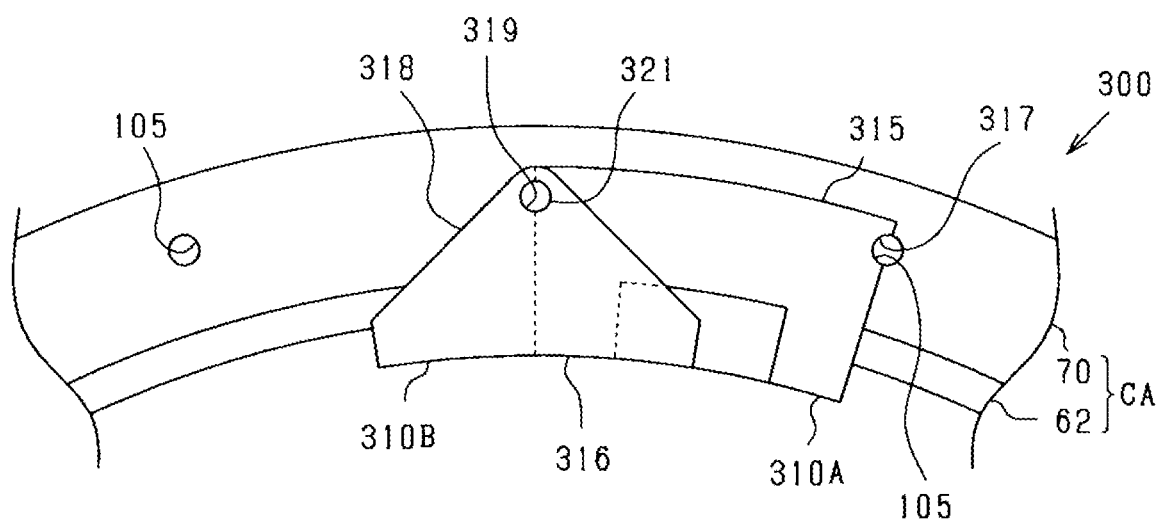
FIG. 40 is a plan view showing coil modules in a state of having been assembled to a core assembly in the inner rotor type rotating electric machine.

FIG. 40 is a plan view showing the coil modules 310A and 310B in a state of having been assembled to the core assembly CA. In addition, in the example shown in FIG. 40, in each of the axial end faces of the stator holder 70, there are formed a plurality of recesses 105 at equal intervals in the circumferential direction. Moreover, the stator holder 70 has a cooling structure using a liquid coolant or air. For example, the stator holder 70 may have, as an air-cooled structure, a plurality of heat-dissipating fins formed on the outer circumferential surface thereof.

As shown in FIG. 40, the insulating covers 315 and 316 are arranged so as to overlap one another in the axial direction. Moreover, in the state where the recesses 105 of the stator holder 70, the recesses 317 formed in the side walls of the insulating covers 315 and the through-holes 319 formed in the protruding portions 318 of the insulating covers 316 are aligned with one another in the axial direction, fixing pins 321 are inserted respectively into the axially-aligned groups of the recesses 105 and 317 and the through-holes 319. Consequently, the insulating covers 315 and 316 are together fixed to the stator holder 70.

Moreover, in the example shown in FIG. 40, the insulating covers 315 and 316 are fixed by the fixing pins 321 to the axial end faces of the stator holder 70 that is located radially outside the stator core 62. In this case, since the stator holder 70 has the cooling structure formed therein, heat generated in the partial windings 311A and 311B can be easily transferred to the stator holder 70, thereby improving the performance of cooling the stator coil 61.

In the rotating electric machine 10 according to the above-described embodiment, the stator 60 is configured to have a toothless structure. Alternatively, the stator 60 may be configured to have protrusions (e.g., teeth) extending radially from a back yoke. In this case, the coil modules 150 may be assembled to the back yoke.

In the rotating electric machine 10 according to the above-described embodiment, the phase windings of the stator coil 61 are star-connected together. Alternatively, the phase windings of the stator coil 61 may be Δ-connected together.

Second Embodiment

Next, a rotating electric machine according to the second embodiment will be described. In the present embodiment, the rotating electric machine is configured as an inner rotor type SPM (Surface Permanent Magnet) rotating electric machine. Specifically, the rotating electric machine includes a rotor having a plurality of magnetic poles whose polarities alternate in a circumferential direction and a stator having a multi-phase stator coil. Moreover, the rotor is rotatably supported on a radially inner side of the stator. In addition, in the present embodiment, the rotor functions as a "field system" and the stator functions as an "armature".

Hereinafter, the configuration of a stator unit 400, which includes the stator 410 according to the present embodiment, will be described in detail.

Figure 41:
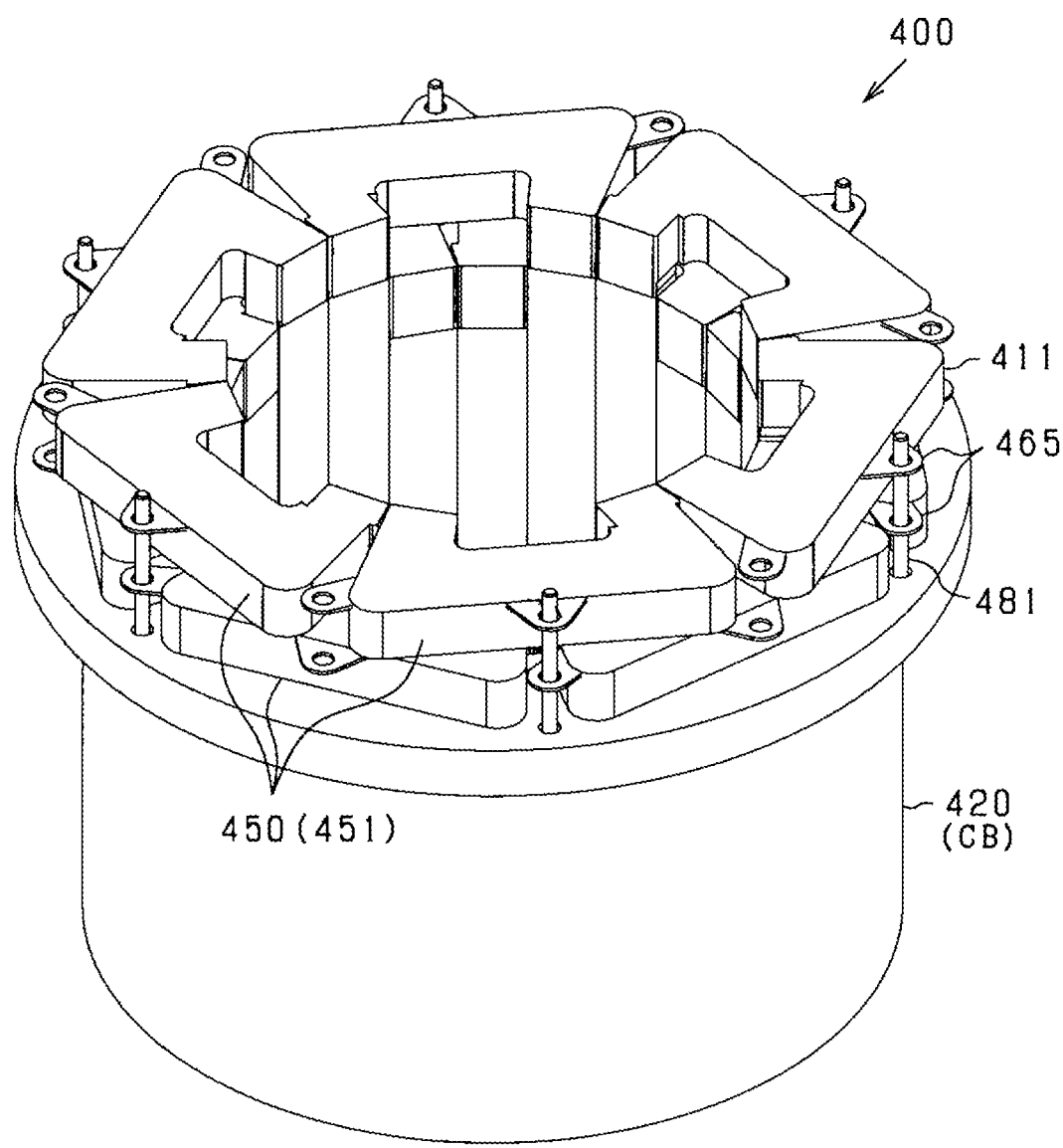
FIG. 41 is a perspective view of a stator unit according to a second embodiment.
Figure 42A:
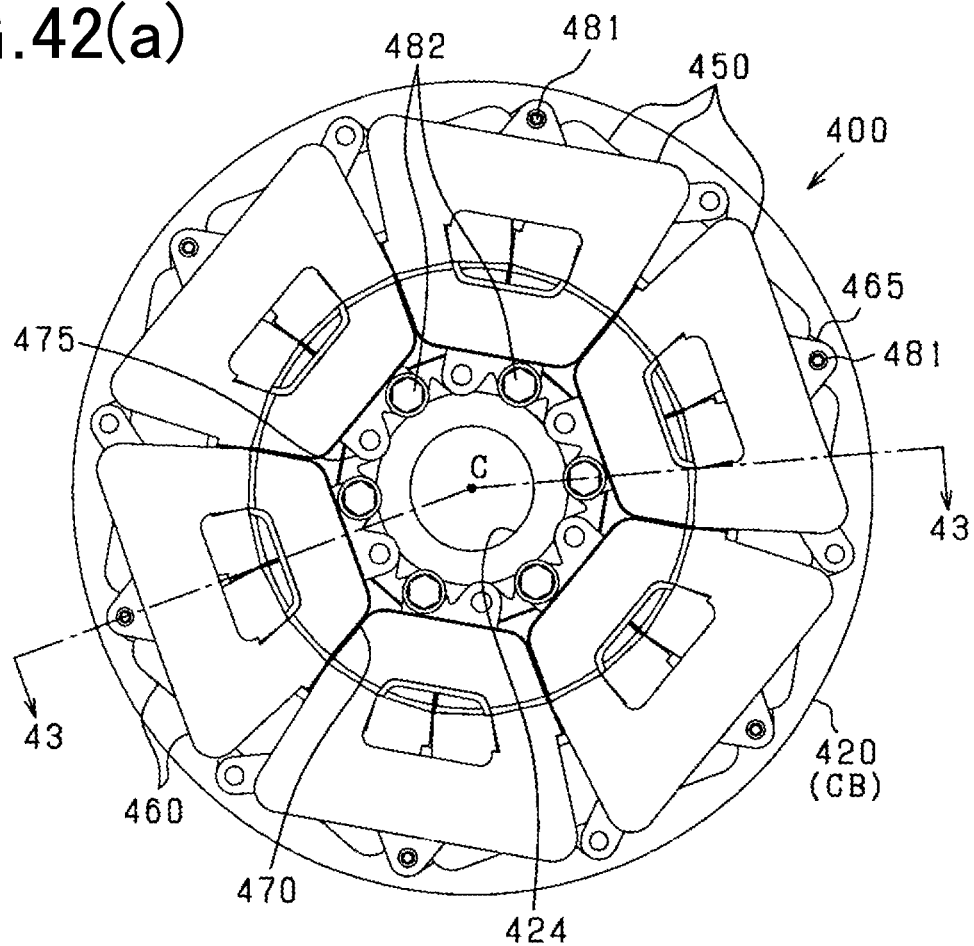
FIG. 42(a) is a plan view of the stator unit according to the second embodiment.
Figure 42B:
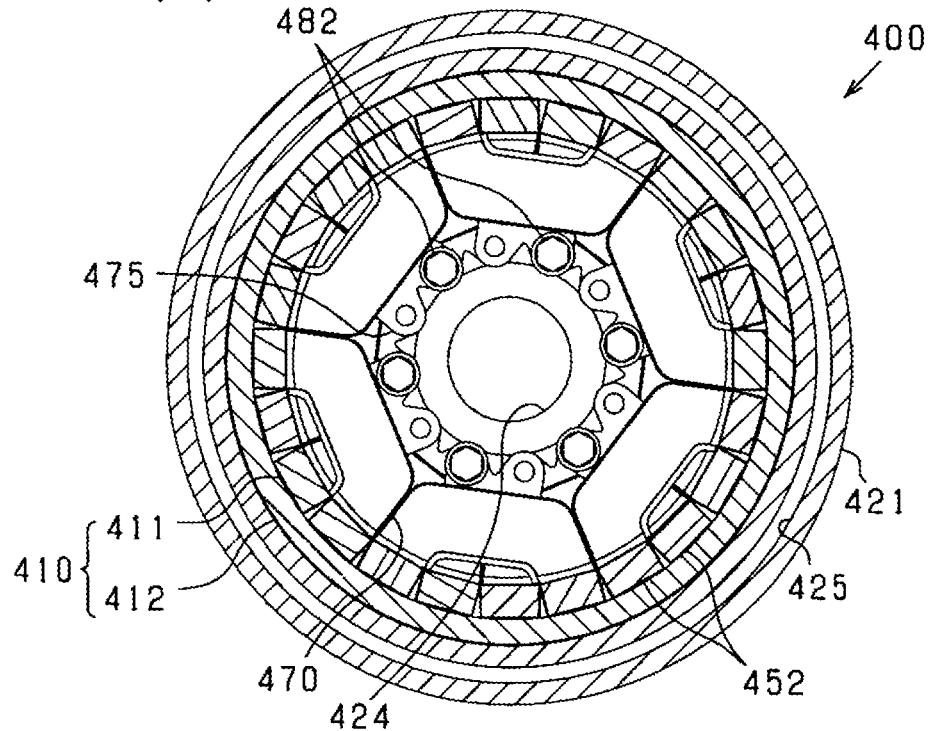
FIG. 42(b) is a transverse cross-sectional view of the stator unit according to the second embodiment.
Figure 43:
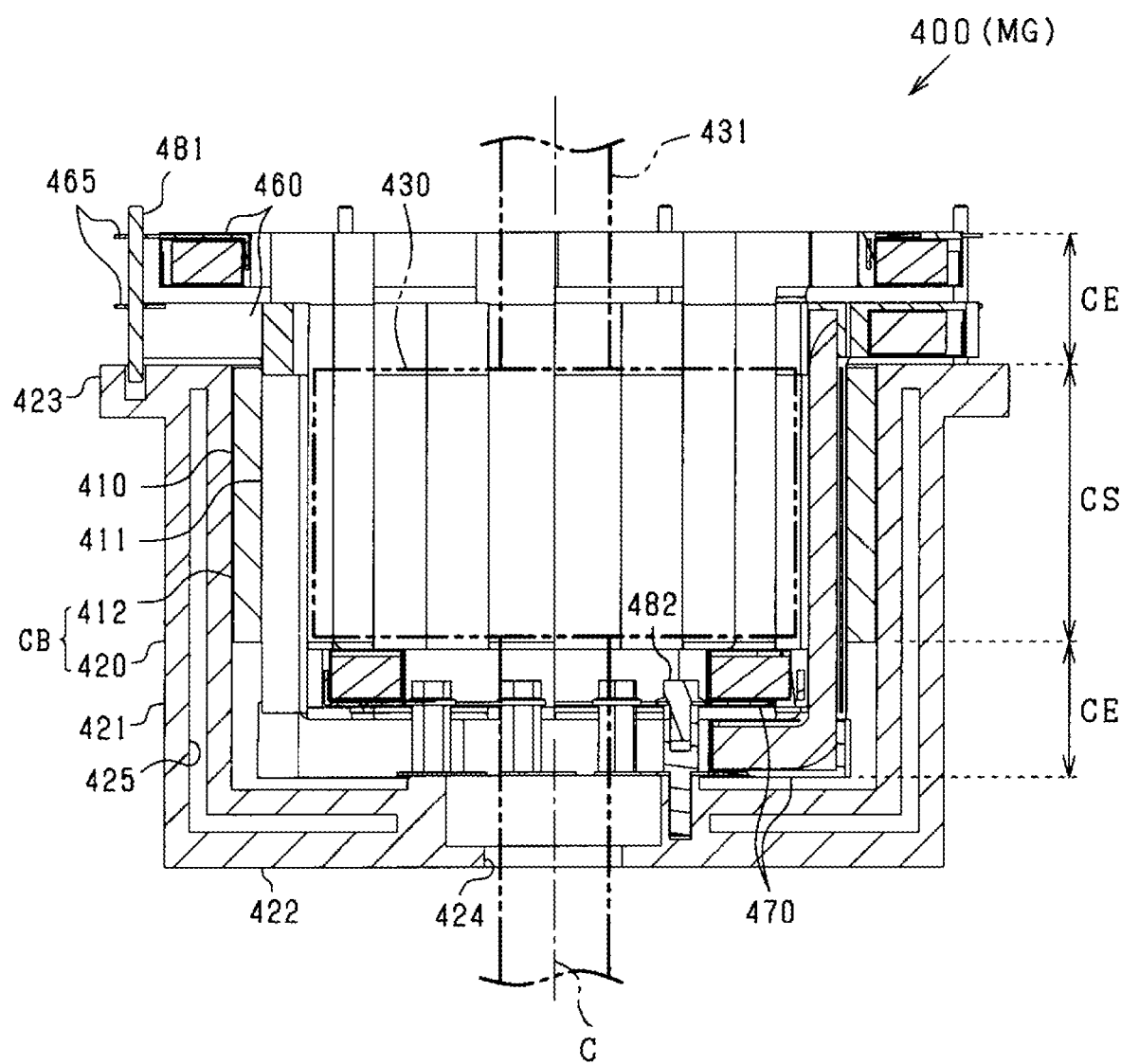
FIG. 43 is a longitudinal cross-sectional view of the stator unit according to the second embodiment.
Figure 44:
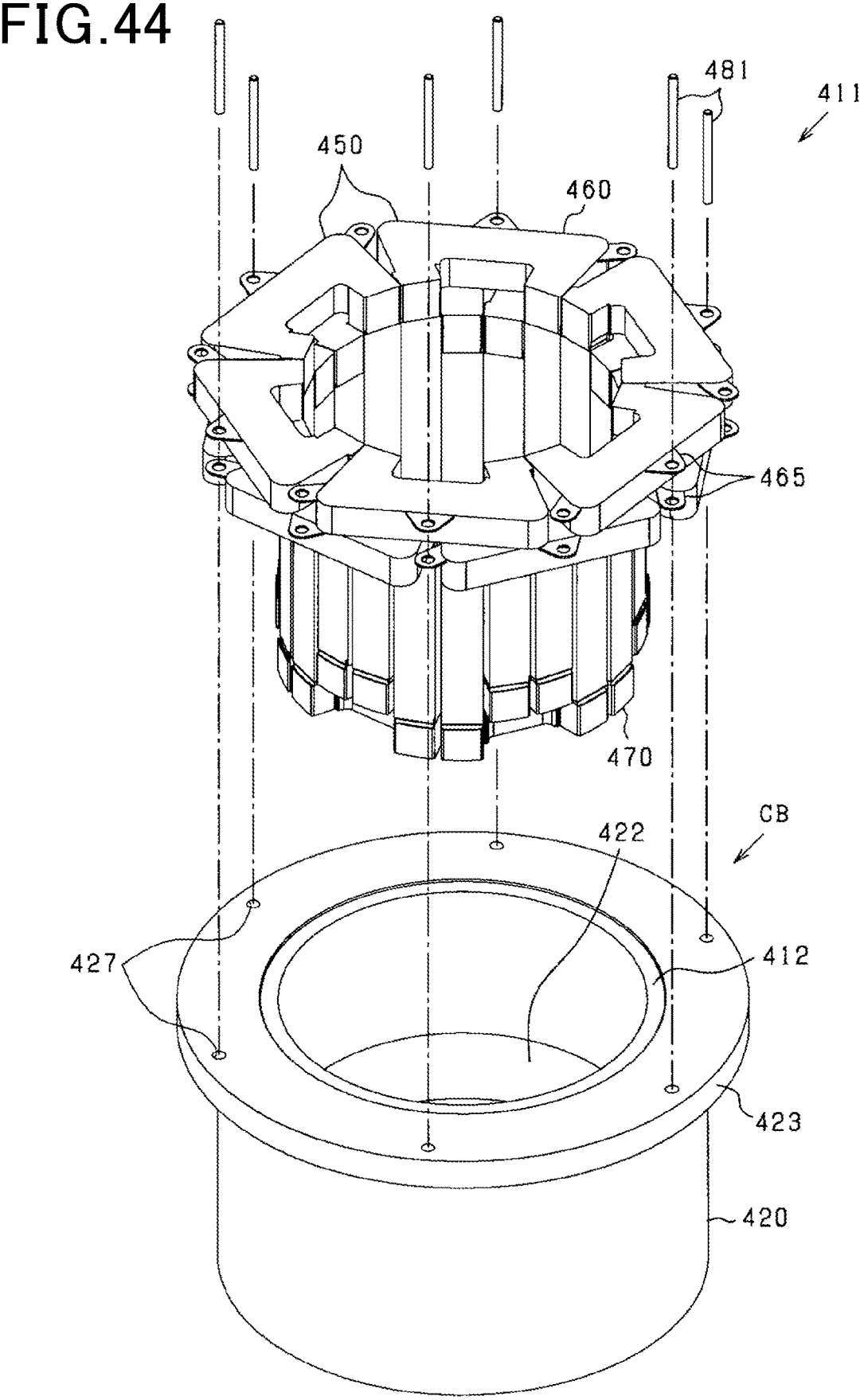
FIG. 44 is an exploded perspective view showing a core assembly and a stator coil of the stator unit according to the second embodiment in an exploded manner.

FIG. 41 is a perspective view showing an overview of the stator unit 400. FIG. 42(a) is a plan view of the stator unit 400. FIG. 42(b) is a transverse cross-sectional view of the stator unit 400. FIG. 43 is a longitudinal cross-sectional view of the stator unit 400. FIG. 44 is an exploded perspective view showing a core assembly CB and a stator coil 411 of the stator unit 400 in an exploded manner. In addition, FIG. 43 is a cross-sectional view taken along the line 43-43 passing through the stator center point C in FIG. 42(a).

The stator unit 400 includes, in addition to the stator 410, a stator holder 420 arranged radially outside the stator 410. Further, the stator 410 includes the aforementioned stator coil 411 and a stator core 412. Moreover, the stator core 412 and the stator holder 420 are integrated into the core assembly CB. To the core assembly CB, there are assembled a plurality of partial windings 451 which constitute the stator coil 411. In addition, in the present embodiment, the stator coil 411 corresponds to an "armature coil"; the stator core 412 corresponds to an "armature core"; the stator holder 420 corresponds to an "armature holding member"; and the core assembly CB corresponds to a "winding support member".

In FIG. 43, the rotor 430, which is arranged radially inside the stator 410, is shown by imaginary lines. The rotating electric machine MG according to the present embodiment is configured to include the stator 410 and the rotor 430. The rotor 430 is provided integrally with a rotating shaft 431 so as to rotate together with the rotating shaft 431. In the present embodiment, the rotor 430 has a similar configuration to the rotor 20 described in the first embodiment; therefore, only brief explanation of the rotor 430 will be given hereinafter.

The rotor 430 includes a rotor carrier as a "magnet holding member" fixed to the rotating shaft 431, and an annular magnet unit as a "magnet section" fixed to the rotor carrier. However, in the present embodiment, the rotating electric machine MG has an inner rotor structure; therefore, the magnet unit is fixed to a radially outer periphery of the rotor carrier, not to a radially inner periphery of the rotor carrier as in the first embodiment. The magnet unit has a plurality of magnets arranged in alignment with each other in the circumferential direction of the rotor 430 such that the polarities of the magnetic poles of the magnet unit (i.e., the magnetic poles of the rotor 430) alternately change in the circumferential direction. The magnet unit is configured to intensively generate magnetic flux on d-axis-side areas of magnetic flux acting surfaces of the magnets; the d-axis represents the centers of the magnetic poles. Specifically, in the magnets, the orientation of the easy axes of magnetization on the d-axis side is different from the orientation of the easy axes of magnetization on the q-axis side. On the d-axis side, the easy axes of magnetization are oriented to be parallel to the d-axis. In contrast, on the q-axis side, the easy axes of magnetization are oriented to be perpendicular to the q-axis (see FIG. 7); the q-axis represents the boundaries between the magnetic poles. In the rotating electric machine MG, the stator coil 411 and the magnet unit of the rotor 430 are radially opposed to each other with an air gap formed therebetween.

Figure 45:
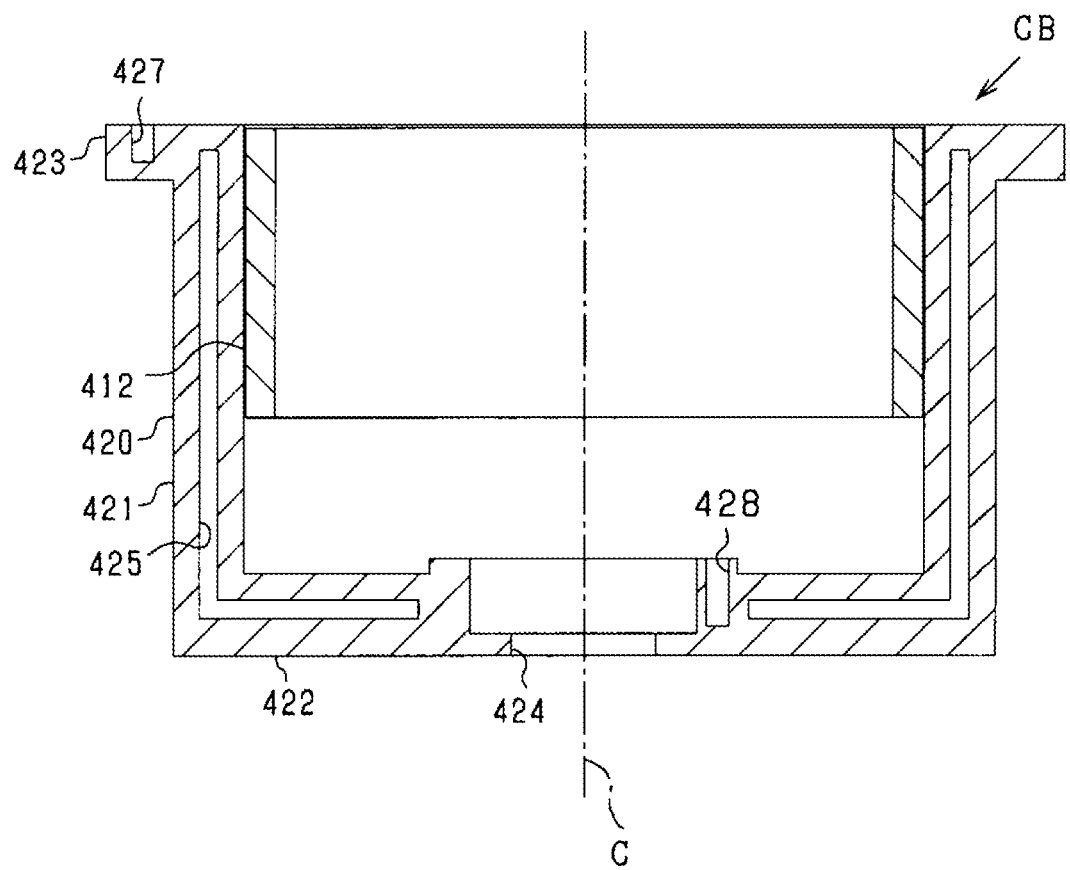
FIG. 45 is a longitudinal cross-sectional view of the core assembly according to the second embodiment.

The core assembly CB will be described. FIG. 45 is a longitudinal cross-sectional view of the core assembly CB. It should be noted that similar to FIG. 43, FIG. 45 is a cross-sectional view taken along the line 43-43 in FIG. 42(a).

As shown in FIGS. 44 and 45, the core assembly CB is composed of the stator holder 420 having a bottomed cylindrical shape and the stator core 412 having a cylindrical shape and assembled to a radially inner periphery of the stator holder 420. The stator core 412 is constituted of a core sheet laminate in which a plurality of core sheets are laminated in the axial direction; the core sheets are formed of a magnetic material such as a magnetic steel sheet. The stator coil 411 is provided on the radially inner side (i.e., the rotor 430 side) of the stator core 412. The stator core 412 has an inner circumferential surface without unevenness and functions as a back yoke. In the present embodiment, the stator core 412 may have the same configuration and thus the same slot-less structure as the stator core 62 in the first embodiment.

As shown in FIG. 45, the stator holder 420 has a cylindrical portion 421, a bottom portion 422 formed at one axial end of the cylindrical portion 421, and an annular flange 423 formed at the other axial end of the cylindrical portion 421 and extending radially outward. In the bottom portion 422, there is formed a through-hole 424 through which the rotating shaft 431 provided integrally with the rotor 430 is inserted. The stator holder 420 may be formed of a metal, such as aluminum or cast iron, or Carbon Fiber-Reinforced Plastic (CFRP). In addition, in the present embodiment, each of the bottom portion 422 and the flange 423 corresponds to a "pedestal portion".

In the cylindrical portion 421 of the stator holder 420, there is formed, as a cooling portion, a coolant passage 425 through which coolant such as cooling water flows. The coolant passage 425 is formed in an annular shape along the circumferential direction of the stator holder 420. Moreover, although not shown in detail in the drawings, the coolant flows into the coolant passage 425 via an inflow port, then flows through the coolant passage 425 in the circumferential direction, and thereafter flows out of the coolant passage 425 via an outflow port. In the configuration shown in FIG. 45, the coolant passage 425 is formed in a region including the cylindrical portion 421 and the bottom portion 422 of the stator holder 420. However, the coolant passage 425 may alternatively be formed in a region further including the flange 423 in addition to the cylindrical portion 421 and the bottom portion 422. That is, the coolant passage 425 may be formed at least in the cylindrical portion 421, more specifically at least at a position radially outside the stator core 412.

As shown in FIG. 45, in the stator holder 420, there are formed recesses 427 and 428 that are used for fixing a plurality of coil modules 450 to be described later. Specifically, in the flange 423 of the stator holder 420, there are formed a plurality of recesses 427 at equal intervals in the circumferential direction. On the other hand, in the bottom portion 422 of the stator holder 420, there are formed a plurality of recesses 428 at equal intervals in the circumferential direction. Moreover, the recesses 427 are formed in alignment with each other on an imaginary circle that is concentric with the core assembly CB; the recesses 428 are also formed in alignment with each other on an imaginary circle that is concentric with the core assembly CB. In addition, in the present embodiment, each of the number of the recesses 427 and the number of the recesses 428 is set to be ½ of the number of the coil modules 450. However, each of the number of the recesses 427 and the number of the recesses 428 may alternatively be set to be equal to the number of the coil modules 450. Next, the configuration of the stator coil 411 will be described in detail.

FIGS. 41 to 43 show the stator coil 411 in a state of having been assembled to the core assembly CB. As shown in FIGS. 41 to 43, the partial windings 451 constituting the stator coil 411 are assembled to the radially inner periphery of the core assembly CB (i.e., the radially inner periphery of the stator core 412) so as to be aligned with one another in the circumferential direction.

The stator coil 411 includes a plurality of phase windings and is formed into a hollow cylindrical (or an annular) shape by arranging the phase windings in a predetermined sequence in the circumferential direction. In the present embodiment, the stator coil 411 is configured as a three-phase coil which includes U-phase, V-phase and W-phase windings.

Each of the phase windings of the stator coil 411 is constituted of a plurality of partial windings 451; the partial windings 451 are individually provided as coil modules 450. That is, each of the coil modules 450 has one of the partial windings 451 of the phase windings provided integrally therein. The number of the coil modules 450 constituting the stator coil 411 is set according to the number of the magnetic poles of the rotor 430. In the coil side CS of the stator coil 411, the electrical conductor sections of the plurality of phases are arranged in a predetermined sequence and in alignment with each other in the circumferential direction by arranging the coil modules 450 (i.e., the partial windings 451) of the plurality of phases in the predetermined sequence and in alignment with one another in the circumferential direction. In FIG. 44, there are shown the coil modules 450 arranged side by side in the circumferential direction. In the present embodiment, the number of the magnetic poles is set to 24; however, the number of the magnetic poles may be arbitrarily set. In the stator coil 411, each of the phase windings is formed by connecting the partial windings 451 of the phase winding, which are included in the respective coil modules 450, in parallel or in series with each other.

As shown in FIG. 43, the stator 410 has, in the axial direction, a part thereof corresponding to the coil side CS that radially faces the stator core 412, and parts thereof corresponding respectively to the coil ends CE that are located respectively on opposite axial sides of the coil side CS. In addition, the coil side CS also radially faces the magnet unit of the rotor 430. The coil modules 450 are assembled to the radially inner periphery of the stator core 412 so that opposite axial end portions of each of the coil modules 450 protrude axially outward respectively from opposite axial end faces of the stator core 412 (i.e., protrude respectively to opposite axial sides of the stator core 412 where the coil ends CE are respectively located).

In the present embodiment, all the coil modules 450 employed in the stator coil 411 are configured in the same form and arranged side by side in the circumferential direction in a state of being offset in two stages in the axial direction. Moreover, in the present embodiment, each of the partial windings 451 included in the respective coil modules 450 is radially bent respectively toward opposite sides at the coil ends CE respectively at opposite axial sides of the stator core 412. Specifically, each of the partial windings 451 has one coil end portion (i.e., one bridging portion) bent radially inward on one axial side of the stator core 412 and the other coil end portion (i.e., the other bridging portion) bent radially outward on the other axial side of the stator core 412. That is, each of the partial windings 451 has a substantially Z-shape in a side view.

All of N coil modules 450 employed in the stator coil 411 are evenly divided into two groups so that each group includes N/2 coil modules 450. Moreover, the two groups of the coil modules 450 are arranged respectively in two different stages in the axial direction. More particularly, in the present embodiment, a total of twelve coil modules 450 are employed in the stator coil 411. The twelve coil modules 450 are evenly divided into two groups so that each group includes six coil modules 450. Moreover, the two groups of the coil modules 450 are assembled in two different stages in the axial direction.

Figure 46:
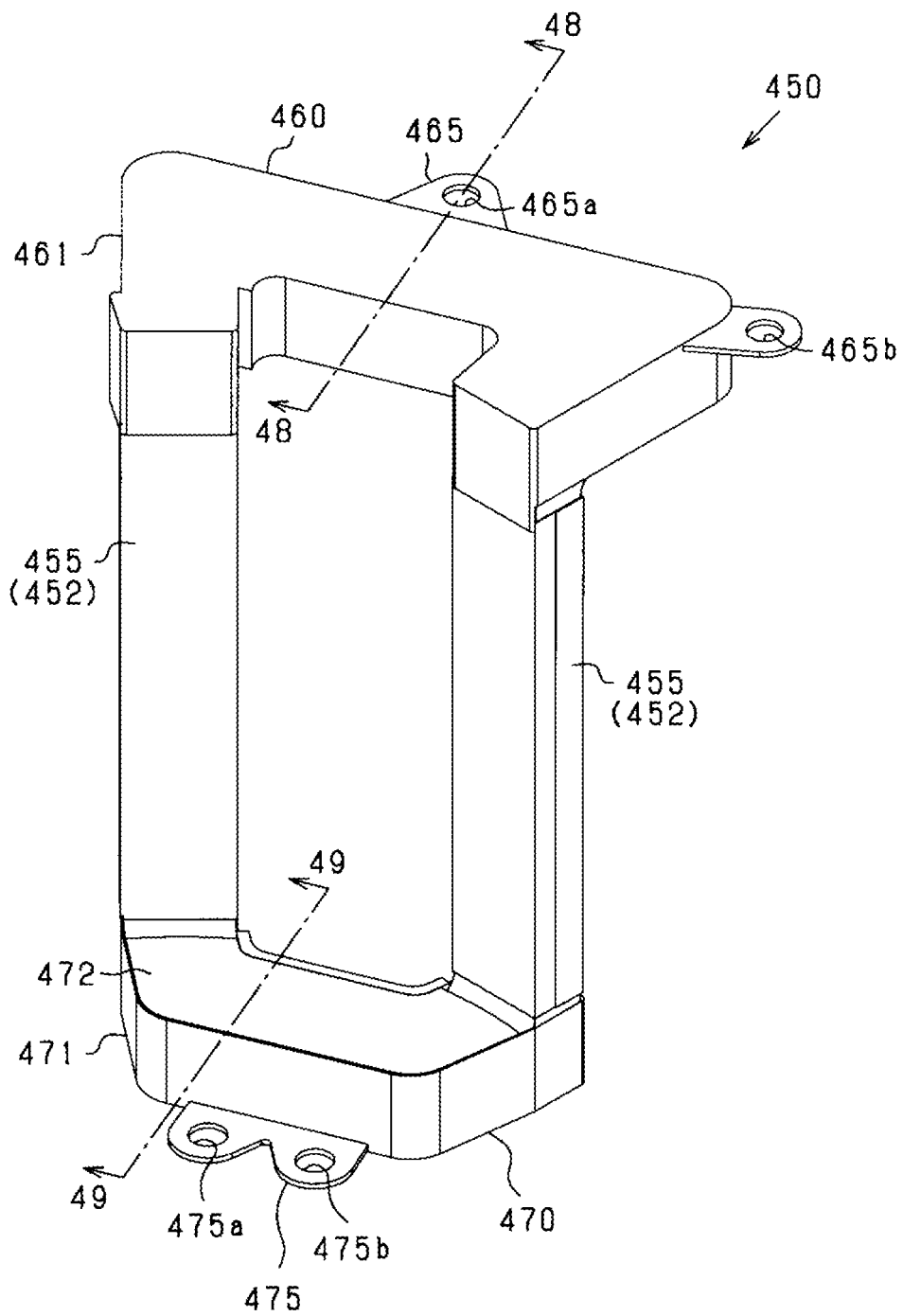
FIG. 46 is a perspective view illustrating the configuration of a coil module according to the second embodiment.
Figure 47:
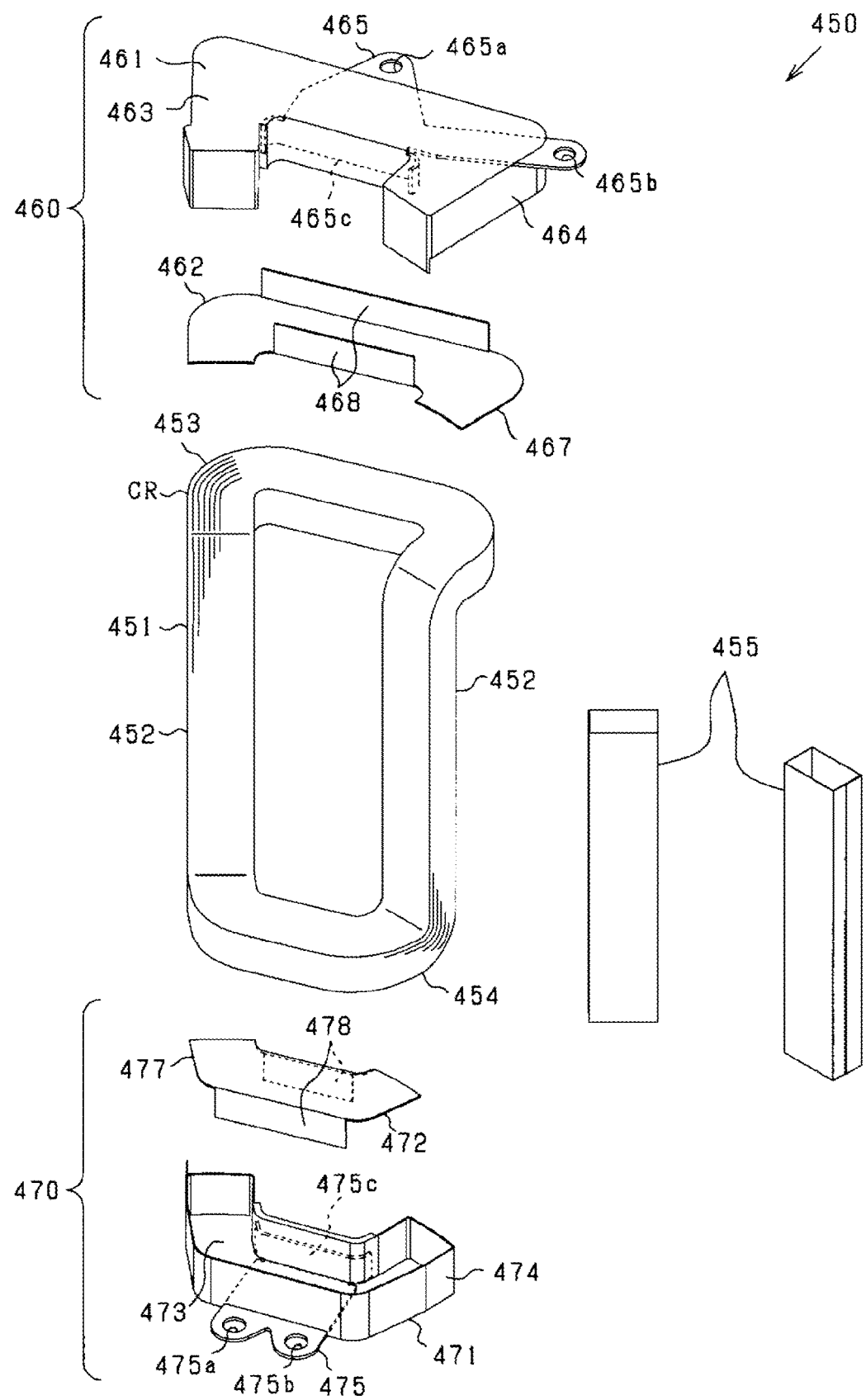
FIG. 47 is an exploded perspective view showing components of the coil module according to the second embodiment in an exploded manner.

FIG. 46 is a perspective view illustrating the configuration of each of the coil modules 450. FIG. 47 is a perspective view illustrating components of each of the coil modules 450 in an exploded manner.

As shown in FIGS. 46 and 47, each of the coil modules 450 has a partial winding 451 formed by winding an electrical conductor wire CR multiply and insulating covers 460 and 470 mounted respectively on opposite axial end portions of the partial winding 451.

The partial winding 451 has a pair of intermediate conductor portions 452 extending straight and parallel to each other, and a pair of bridging portions 453 and 454 connecting the pair of intermediate conductor portions 452 respectively on opposite axial sides of the pair of intermediate conductor portions 452. The partial winding 451 is formed into a ring shape by the pair of intermediate conductor portions 452 and the pair of bridging portions 453 and 454. The pair of intermediate conductor portions 452 are formed apart from each other by a predetermined multiple of one coil-pitch, so as to allow the intermediate conductor portions 452 of the partial windings 451 of the other phases to be arranged therebetween in the circumferential direction. More particularly, in the present embodiment, the pair of intermediate conductor portions 452 are formed apart from each other by two coil-pitches and have one intermediate conductor portion 452 of one partial winding 451 of each of the other two phases arranged therebetween in the circumferential direction.

The pair of bridging portions 453 and 454, which are located respectively on opposite axial sides of the pair of intermediate conductor portions 452, are radially bent respectively toward opposite sides. Each of the bridging portions 453 and 454 constitutes a portion of a corresponding one of the coil ends CE (see FIG. 43). Moreover, each of the bridging portions 453 and 454 is bent in a direction perpendicular to the pair of intermediate conductor portions 452, i.e., in a direction perpendicular to the axial direction. The bridging portions 453 and 454 have different shapes in a plan view (i.e., different shapes when viewed along the axial direction). Specifically, the bridging portion 453 has its circumferential width increasing in the direction toward the bending distal end thereof (i.e., increasing in the radially outward direction), whereas the bridging portion 454 has its circumferential width decreasing in the direction toward the bending distal end thereof (i.e., decreasing in the radially inward direction). Consequently, those parts of the bridging portions 453 and 454 which radially extend are oriented in directions extending radially from the stator center point C (see FIG. 42(a)).

Each of the intermediate conductor portions 452 of the partial windings 451 is provided as one of coil side conductor portions that are arranged one by one in the circumferential direction at the coil side CS. On the other hand, each of the bridging portions 453 and 454 of the partial windings 451 is provided as a coil end conductor portion that connects, at a corresponding one of the coil ends CE, a pair of the intermediate conductor portions 452 of the same phase located respectively at two different circumferential positions.

Similar to the partial windings 151 described in the first embodiment, each of the partial windings 451 is formed, by winding the electrical conductor wire CR multiply, so as to have a quadrangular transverse cross section. That is, the intermediate conductor portions 452 of each of the partial windings 451 are formed to have a substantially rectangular transverse cross section with parts of the electrical conductor wire CR both circumferentially aligned in a plurality of rows and radially aligned in a plurality of rows in the intermediate conductor portions 452 (see FIG.

Moreover, in each of the partial windings 451, each of the intermediate conductor portions 452 is covered with a sheet-like insulating coat 455. The insulating coat 455 has the same configuration as the insulating coats 157 of the partial windings 151 described in the first embodiment. Specifically, the insulating coat 455 is formed by wrapping a film member around the intermediate conductor portion 452. The film member has an axial length not smaller than the axial length of an insulation covering range of the intermediate conductor portion 452. Moreover, the insulating coat 455 is formed around the intermediate conductor portion 452 such that end portions of the film member overlap each other in the circumferential direction.

Next, the configurations of the insulating covers 460 and 470 will be described. The insulating covers 460 and 470 are formed to respectively surround the entire peripheries of the bridging portions 453 and 454 so as to electrically insulate the partial winding 451 from the other partial windings 451 at the bridging portions 453 and 454.

Figure 48A:
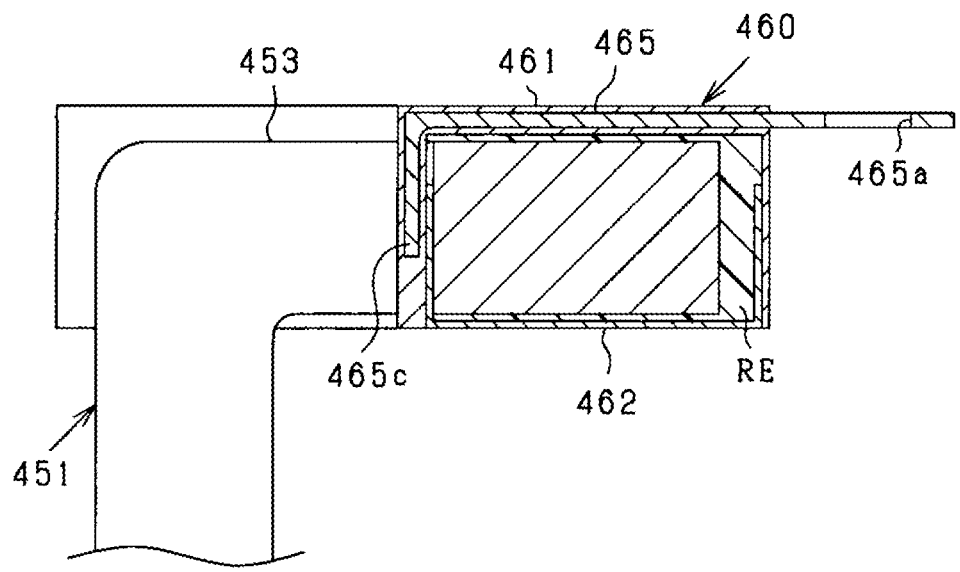
FIG. 48(a) is a cross-sectional view of the coil module according to the second embodiment taken along the line 48-48 in FIG. 46.
Figure 48B:
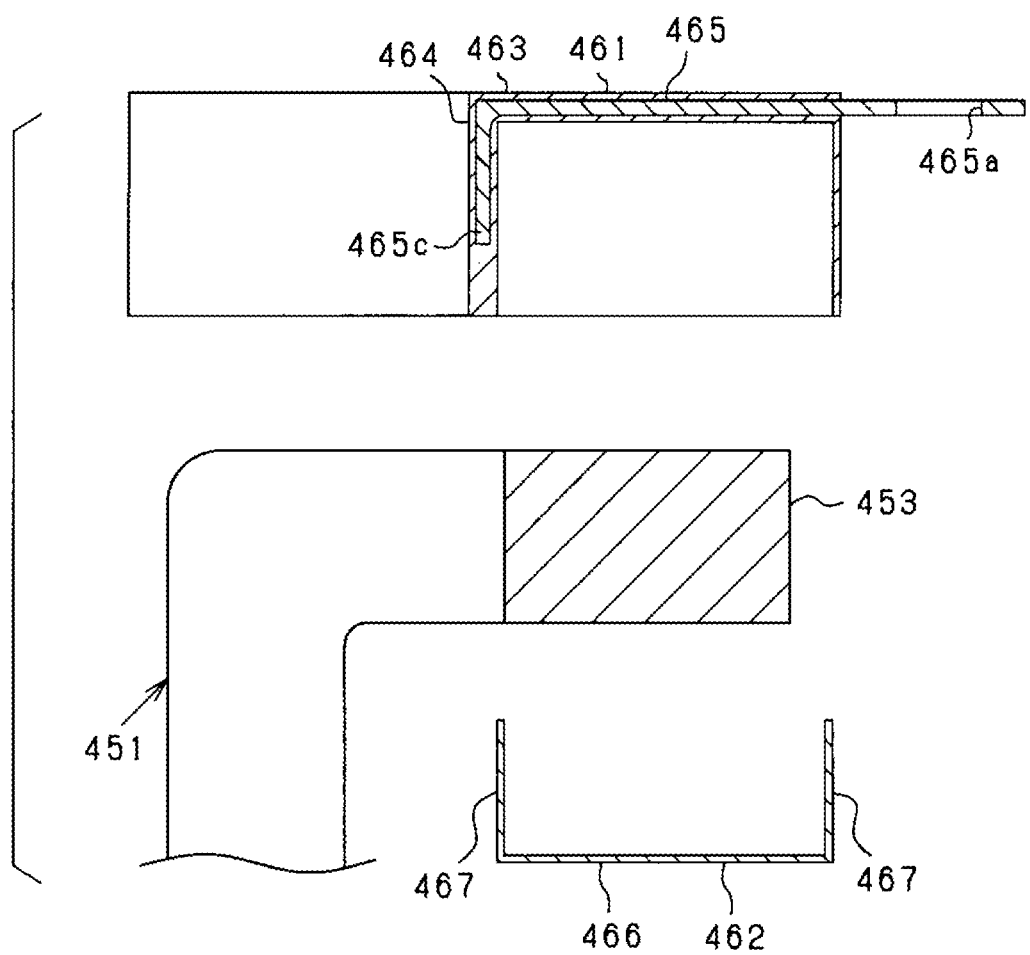
FIG. 48(b) is an exploded cross-sectional view of the coil module according to the second embodiment.
Figure 49A:
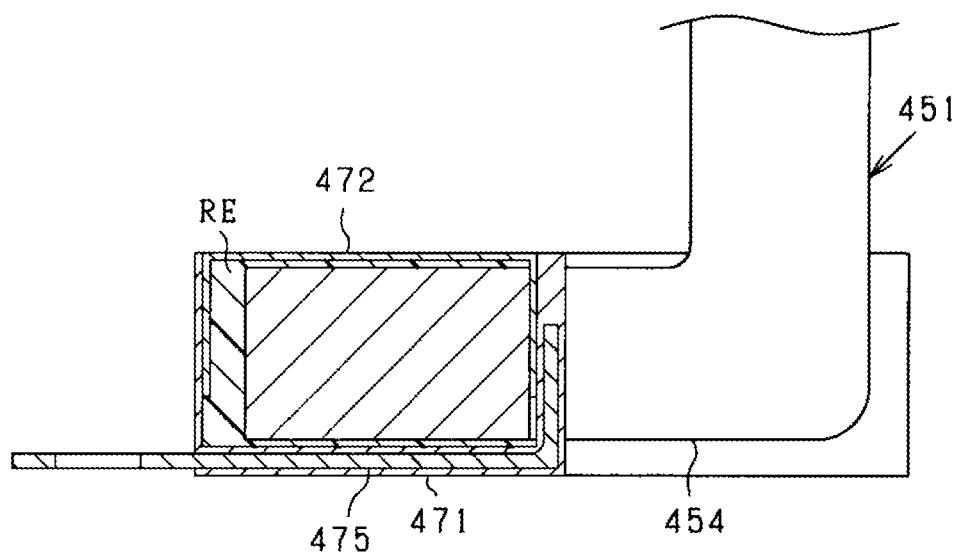
FIG. 49(a) is a cross-sectional view of the coil module according to the second embodiment taken along the line 49-49 in FIG. 46.
Figure 49B:
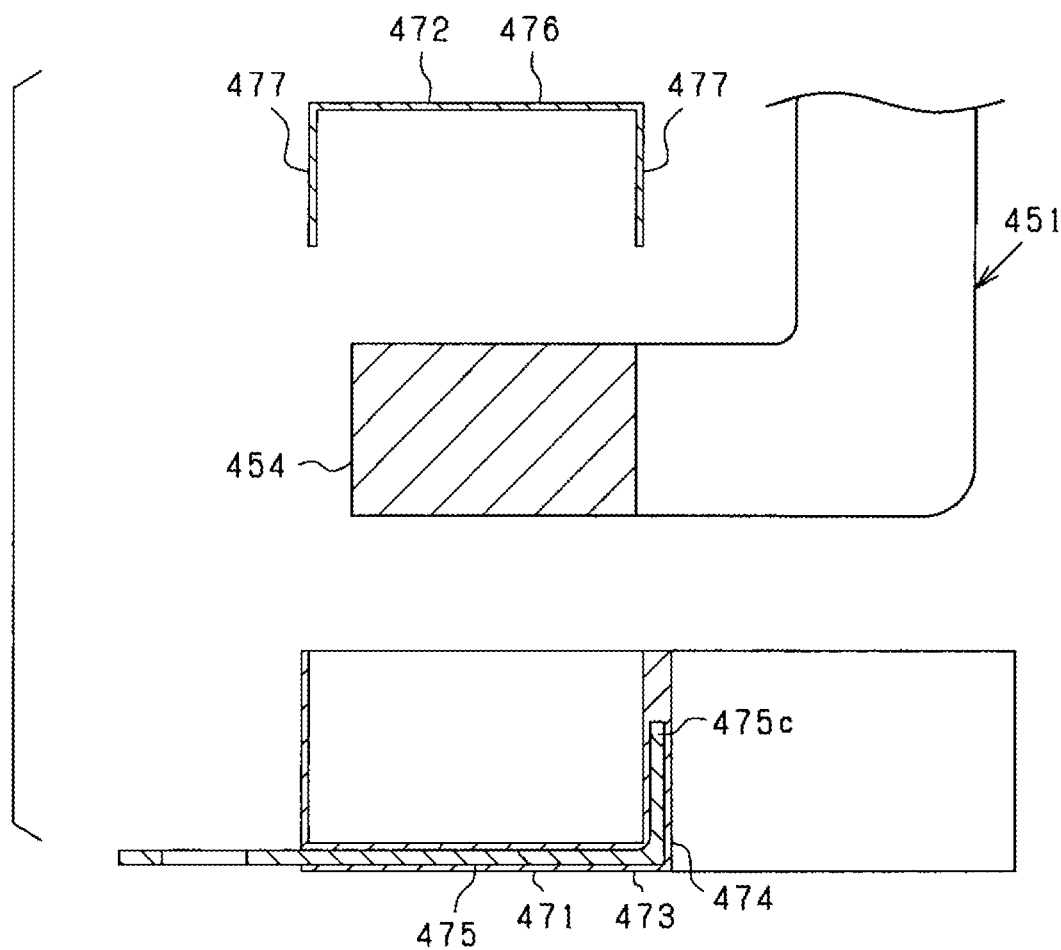
FIG. 49(b) is another exploded cross-sectional view of the coil module according to the second embodiment.

The insulating cover 460 is mounted on the bridging portion 453 located on one axial side in the partial winding 451, whereas the insulating cover 470 is mounted on the bridging portion 454 located on the other axial side in the partial winding 451. The insulating covers 460 and 470 are formed of an electrically-insulative material such as a synthetic resin. By the insulating covers 460 and 470, the partial winding 451 is electrically insulated from the other partial windings 451 at the bridging portions 453 and 454. FIG. 48(a) is a cross-sectional view taken along the line 48-48 in FIG. 46 through the coil module 450 on the bridging portion 453 side. FIG. 48(b) is an exploded cross-sectional view showing the configuration of FIG. 48(a) in an exploded manner. FIG. 49(a) is a cross-sectional view taken along the line 49-49 in FIG. 46 through the coil module 450 on the bridging portion 454 side. FIG. 49(b) is an exploded cross-sectional view showing the configuration of FIG. 49(a) in an exploded manner.

As shown in FIGS. 48(a) and 48(b), the insulating cover 460 is configured to be dividable in the axial direction. The insulating cover 460 has an outer cover member 461 covering the bridging portion 453 from the axially outer side and an inner cover member 462 covering the bridging portion 453 from the axially inner side. Further, the outer cover member 461 has an end plate portion 463 facing an axially outer end surface of the bridging portion 453 and a peripheral wall portion 464 extending axially inward from the end plate portion 463. A bracket 465, which is made of a metal plate, is provided integrally with the end plate portion 463 into one piece. For example, the bracket 465 may be embedded in the end plate portion 463 of the outer cover member 461 that is a resin-molded part.

In addition, the outer cover member 461 and the inner cover member 462 correspond to "divided cover members". While the outer cover member 461 and the inner cover member 462 are configured to be mounted in the axial direction in the present embodiment, they may alternatively be configured to be mounted in the radial direction (the same applies to the outer cover member 471 and the inner cover member 472 which will be described later).

Figure 50A:
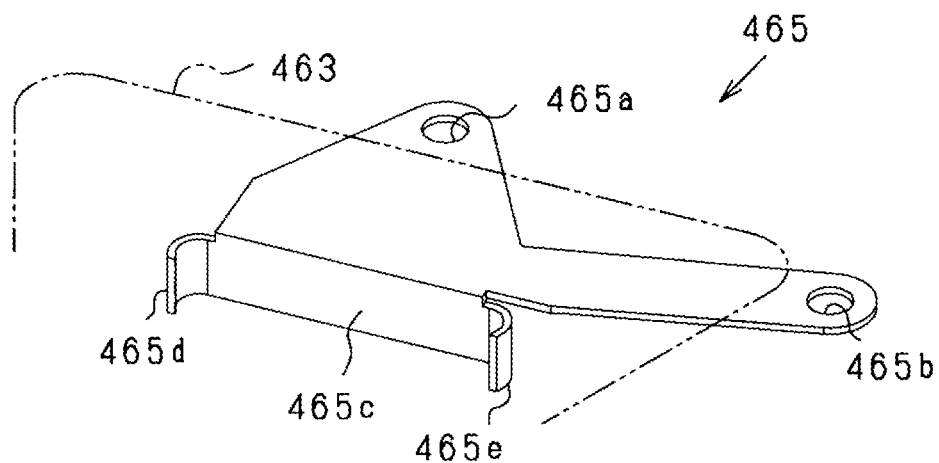
FIGS. 50(a) and 50(b) are perspective views of brackets of the coil module according to the second embodiment.

The bracket 465 is a support member that supports one axial end portion of the coil module 450 in the state of the coil module 450 having been assembled to the core assembly CB. The configuration of the bracket 465 is shown in FIG. 50(a). In addition, in FIG. 50(a), the end plate portion 463 of the outer cover member 461 is shown by an imaginary line.

The bracket 465 has protruding portions that protrude from the end plate portion 463 of the outer cover member 461; and through-holes 465a and 465b are formed in the protruding portions. More specifically, the bracket 465 has two protruding portions that protrude outside the end plate portion 463 of the outer cover member 461 respectively at two different circumferential positions. One of the two protruding portions protrudes radially outward at a circumferential center position of the end plate portion 463 in a plan view, and has the through-hole 465a formed therein. The other of the two protruding portions protrudes circumferentially outward from the end plate portion 463 in a plan view, and has the through-hole 465b formed therein.

Moreover, the bracket 465 also has a bent portion 465c that is axially bent. Specifically, the bent portion 465c is bent at an end of the insulating cover 460 on the radially opposite side to the location where the bracket 465 protrudes radially outward from the insulating cover 460. In the state of the insulating cover 460 having been assembled to the bridging portion 453, the bent portion 465c radially faces the bridging portion 453. In the present embodiment, the bridging portion 453 of the partial winding 451 is bent radially outward; and the bent portion 465c radially faces the inner side of a curved part of the bridging portion 453 which is convex radially outward. Consequently, the bent portion 465c of the bracket 465 or the peripheral wall portion 464 of the insulating cover 460 which is integrated with the bent portion 465c can radially engage with the bridging portion 453 of the partial winding 451 on the radially opposite side to the through-hole 465a.

Furthermore, the bent portion 465c has a pair of curved end portions 465d and 465e formed respectively at opposite circumferential ends thereof and curved to extend radially inward. The curved end portions 465d and 465e serve as engaging portions to circumferentially engage with the bridging portion 453 of the partial winding 451 from the bending inside of the bridging portion 453 in the state of the insulating cover 460 having been assembled to the bridging portion 453. That is, the insulating cover 460 is provided such that the bracket 465 is sandwiched between two electrical conductor portions of the bridging portion 453 spaced apart in the circumferential direction (i.e., two electrical conductor portions of the bridging portion 453 extending respectively from the pair of intermediate conductor portions 452 of the partial winding 451 to the coil end CE side).

As shown in FIG. 47, the inner cover member 462 has an end plate portion 467 facing an axially inner end surface of the bridging portion 453 and two standing portions 468 extending axially outward from the end plate portion 467.

The two standing portions 468 are located respectively on the radially inner and radially outer sides of the distal part (i.e., the curved part) of the bridging portion 453 to radially face the bridging portion 453.

In assembling the insulating cover 460 to the bridging portion 453 of the partial winding 451, the inner cover member 462 is first mounted to the bridging portion 453 and then the outer cover member 461 is mounted to the inner cover member 462. It is preferable that the bridging portion 453 and the outer and inner cover members 461 and 462 are joined to each other by joining means such as an adhesive. In addition, the order of mounting the outer and inner cover members 461 and 462 may be arbitrarily changed.

As shown in FIG. 48(a), in the state of the insulating cover 460 having been mounted to the bridging portion 453 of the partial winding 451, the bridging portion 453 is surrounded by the insulating cover 460 from both the axial direction and the radial direction and the two protruding portions of the bracket 465 protrude outside the insulating cover 460. Moreover, a filler RE, which may be formed, for example, of a synthetic resin, is filled in the insulating cover 460.

As shown in FIGS. 49(a) and 49(b), the insulating cover 470 is configured to be dividable in the axial direction. The insulating cover 470 has an outer cover member 471 covering the bridging portion 454 from the axially outer side and an inner cover member 472 covering the bridging portion 454 from the axially inner side. Further, the outer cover member 471 has an end plate portion 473 facing an axially outer end surface of the bridging portion 454 and a peripheral wall portion 474 extending axially inward from the end plate portion 473. A bracket 475, which is made of a metal plate, is provided integrally with the end plate portion 473 into one piece. For example, the bracket 475 may be embedded in the end plate portion 473 of the outer cover member 471 that is a resin-molded part.

Figure 50B:
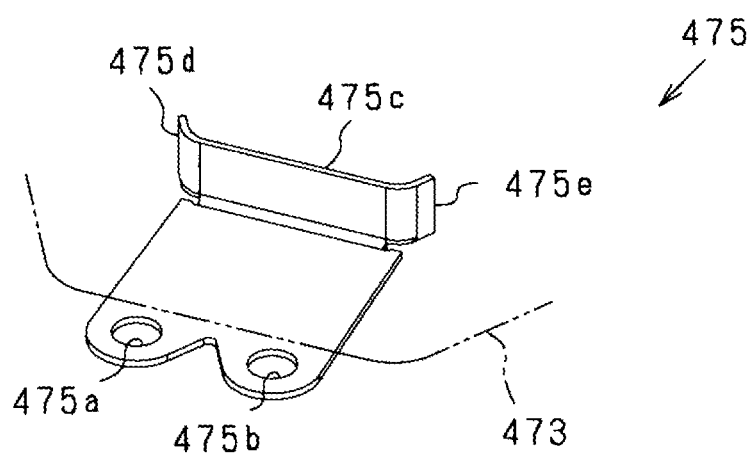

The bracket 475 is a support member that supports the other axial end portion of the coil module 450 in the state of the coil module 450 having been assembled to the core assembly CB. The configuration of the bracket 475 is shown in FIG. 50(b). In addition, in FIG. 50(b), the end plate portion 473 of the outer cover member 471 is shown by an imaginary line.

The bracket 475 has a protruding portion that protrudes radially inward from the end plate portion 473 of the outer cover member 471; and through-holes 475a and 475b are formed in the protruding portion. More specifically, the protruding portion of the bracket 475 protrudes radially inward at a circumferential center position of a radially inner periphery of the end plate portion 473; and the through-holes 475a and 475b are formed apart from each other in the protruding portion.

Moreover, the bracket 475 also has a bent portion 475c that is axially bent. Specifically, the bent portion 475c is bent at an end of the insulating cover 470 on the radially opposite side to the location where the bracket 475 protrudes radially inward from the insulating cover 470. In the state of the insulating cover 470 having been assembled to the bridging portion 454, the bent portion 475c radially faces the bridging portion 454. In the present embodiment, the bridging portion 454 of the partial winding 451 is bent radially inward; and the bent portion 475c radially faces the inner side of a curved part of the bridging portion 454 which is convex radially inward. Consequently, the bent portion 475c of the bracket 475 or the peripheral wall portion 474 of the insulating cover 470 which is integrated with the bent portion 475c can radially engage with the bridging portion 454 of the partial winding 451 on the radially opposite side to the through-holes 475a and 475b.

Furthermore, the bent portion 475c has a pair of curved end portions 475d and 475e formed respectively at opposite circumferential ends thereof and curved to extend radially outward. The curved end portions 475d and 475e serve as engaging portions to circumferentially engage with the bridging portion 454 of the partial winding 451 from the bending inside of the bridging portion 454 in the state of the insulating cover 470 having been assembled to the bridging portion 454. That is, the insulating cover 470 is provided such that the bracket 475 is sandwiched between two electrical conductor portions of the bridging portion 454 spaced apart in the circumferential direction (i.e., two electrical conductor portions of the bridging portion 454 extending respectively from the pair of intermediate conductor portions 452 of the partial winding 451 to the coil end CE side).

As shown in FIG. 47, the inner cover member 472 has an end plate portion 477 facing an axially inner end surface of the bridging portion 454 and two standing portions 478 extending axially outward from the end plate portion 477. The two standing portions 478 are located respectively on the radially inner and radially outer sides of the distal part (i.e., the curved part) of the bridging portion 454 to radially face the bridging portion 454.

In assembling the insulating cover 470 to the bridging portion 454 of the partial winding 451, the inner cover member 472 is first mounted to the bridging portion 454 and then the outer cover member 471 is mounted to the inner cover member 472. It is preferable that the bridging portion 454 and the outer and inner cover members 471 and 472 are joined to each other by joining means such as an adhesive. In addition, the order of mounting the outer and inner cover members 471 and 472 may be arbitrarily changed.

As shown in FIG. 49(a), in the state of the insulating cover 470 having been mounted to the bridging portion 454 of the partial winding 451, the bridging portion 454 is surrounded by the insulating cover 470 from both the axial direction and the radial direction and the protruding portion of the bracket 475 protrudes outside the insulating cover 470. Moreover, a filler RE, which may be formed, for example, of a synthetic resin, is filled in the insulating cover 470.

Figure 51A:
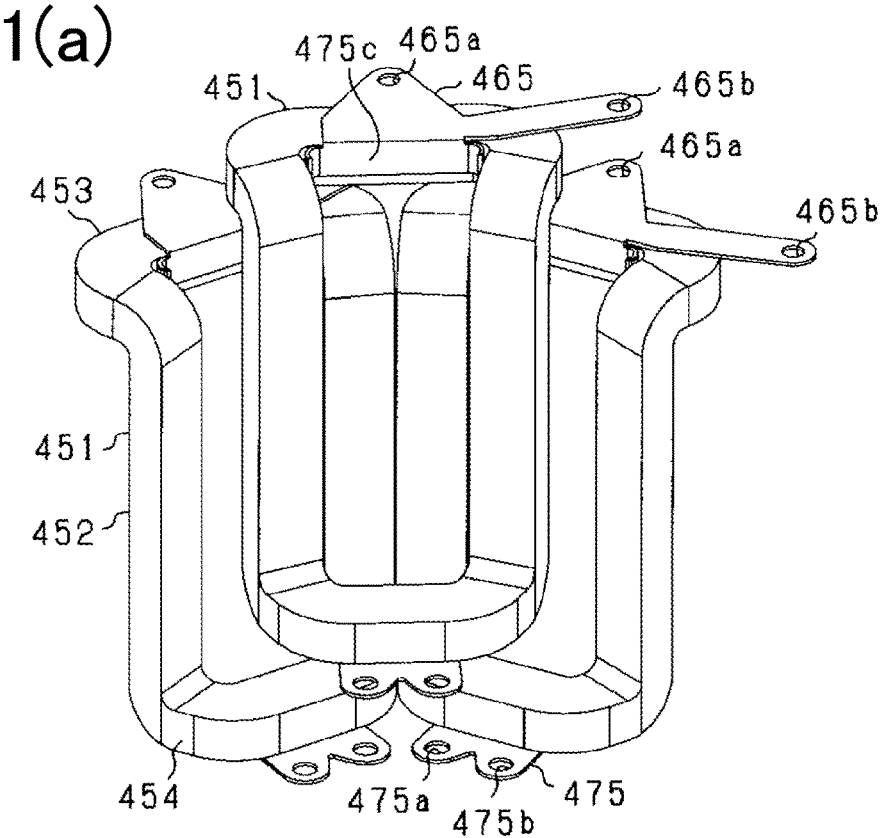
FIGS. 51(a) and 51(b) are perspective views illustrating the positional relationship between partial windings and brackets of coil modules according to the second embodiment.
Figure 51B:
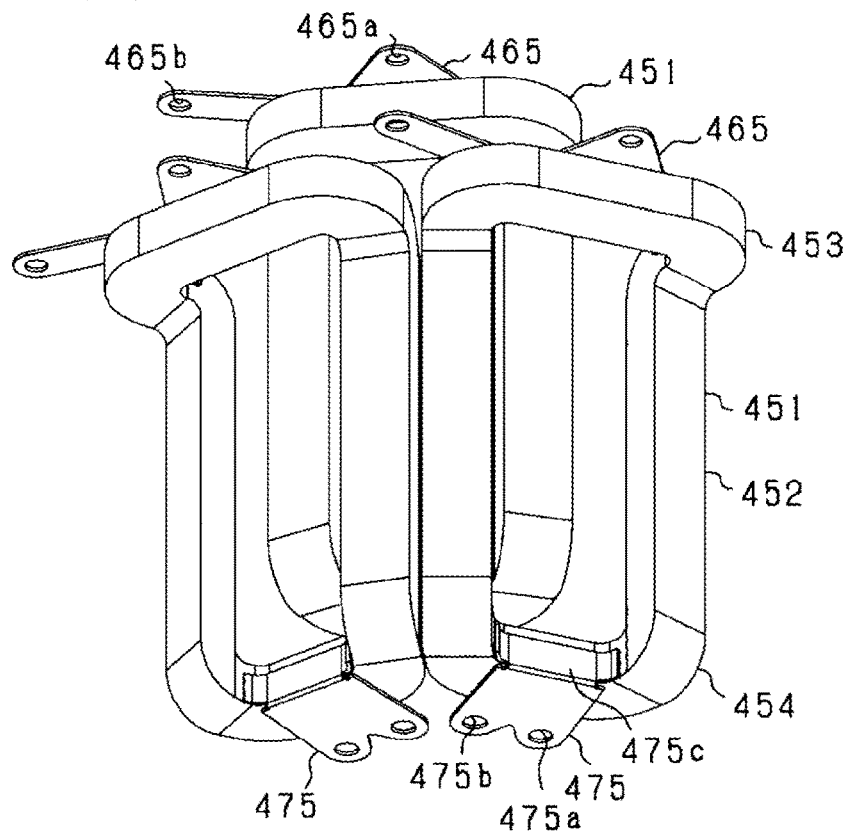

FIGS. 51(a) and 51(b) are perspective views illustrating the positional relationship between the partial windings 451 and the brackets 465 and 475 of the coil modules 450 in the stator coil 411. It should be noted that in FIGS. 51(a) and 51(b), for the sake of facilitating understanding, the insulating covers 460 and 470 (i.e., the outer cover members 461 and 471 and the inner cover members 462 and 472) and the insulating coats 455 are removed from the coil modules 450. In addition, FIG. 51(a) is a perspective view showing the assembled state of three partial windings 451 from the radially inner side thereof, whereas FIG. 51(b) is a perspective view showing the assembled state of the three partial windings 451 from the radially outer side thereof.

As shown in FIG. 51(a), at one axial end of the stator coil 411, for each of the coil modules 450, the bracket 465 is provided such that: the bent portion 465c of the bracket 465 radially faces the bridging portion 453 of the partial winding 451 from the radially inner side of the bridging portion 453; and the remainder of the bracket 465 extends radially outward from the bent portion 465c. Moreover, as shown in FIG. 51(b), at the other axial end of the stator coil 411, for each of the coil modules 450, the bracket 475 is provided such that: the bent portion 475c of the bracket 475 radially faces the bridging portion 454 of the partial winding 451 from the radially outer side of the bridging portion 454; and the remainder of the bracket 475 extends radially inward from the bent portion 475c.

Figure 52:
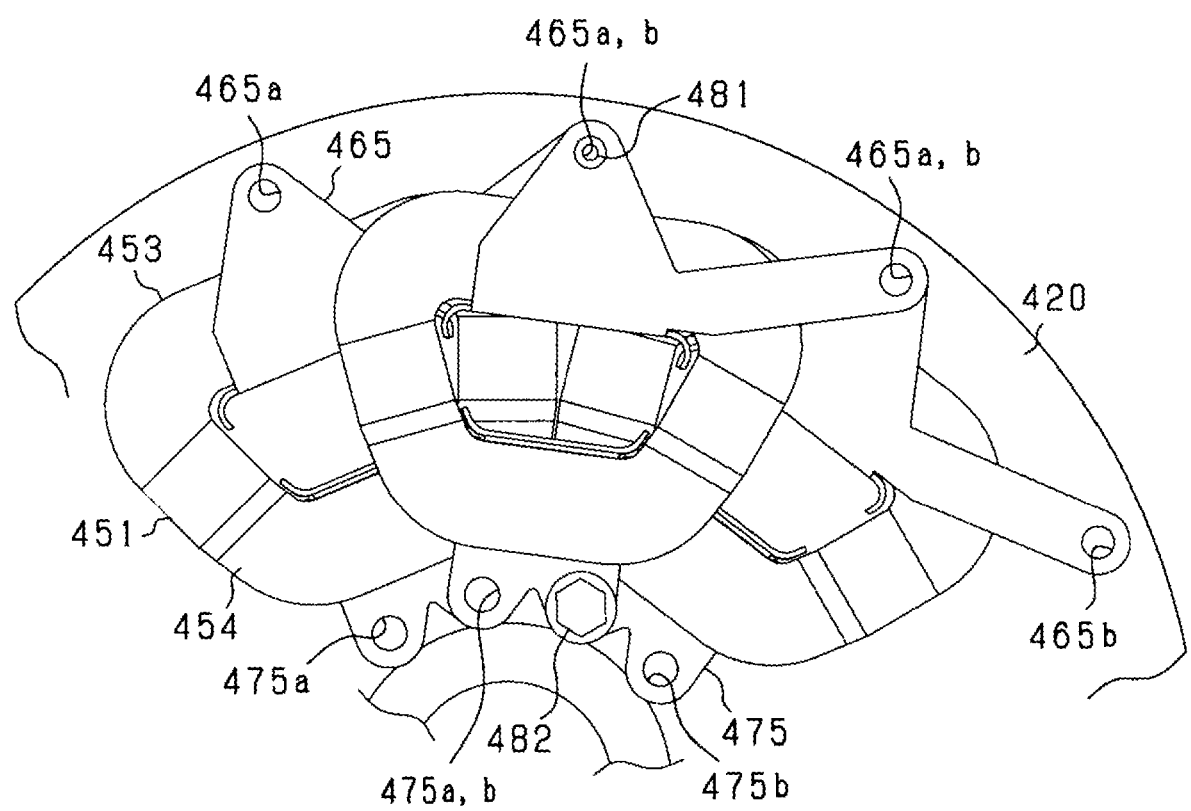
FIG. 52 is a plan view showing the partial windings and brackets of three adjacent coil modules according to the second embodiment.

Hereinafter, a specific configuration of fixing the partial windings 451 (thus the coil modules 450) by the brackets 465 and 475 will be described. FIG. 52 is a plan view showing three partial windings 451 arranged on the stator holder 420 (i.e., on the core assembly CB). One of the three partial windings 451 is arranged in an upper stage (i.e., on the front side in the direction perpendicular to the paper surface of FIG. 52), while the other two partial windings 451 are arranged in a lower stage (i.e., on the rear side in the direction perpendicular to the paper surface of FIG. 52). It should be noted that in FIG. 52, the insulating covers 460 and 470 (i.e., the outer cover members 461 and 471 and the inner cover members 462 and 472) and the insulating coats 455 are removed from the coil modules 450 as in FIGS. 51(a) and 51(b).

In FIG. 52, the bridging portions 453 and 454 of the partial windings 451 overlap one another in the axial direction; in the overlapping state, the brackets 465 and 475 (thus the insulating covers 460 and 470 including the brackets 465 and 475) are mechanically joined in pairs to the stator holder 420 by respective joining members 481 and 482. Consequently, it becomes possible to fix the insulating covers 460 and 470 to the stator holder 420.

Specifically, at one axial end of the stator coil 411, for each axially-overlapping pair of the brackets 465, a pair of the through-holes 465a and 465b formed in the pair of brackets 465 are axially aligned with each other. More specifically, in each of the brackets 465, there are formed two through-holes 465a and 465b respectively at two different circumferential positions. For each axially-overlapping pair of the brackets 465, the through-hole 465a formed in one of the pair of brackets 465 and the through-hole 465b formed in the other of the pair of brackets 465 are axially aligned with each other. Moreover, as described above, in the flange 423 of the stator holder 420, there are formed the recesses 427 (see FIG. 45); in the state of the partial windings 451 having been arranged on the stator holder 420, each of the recesses 427 of the stator holder 420 is axially aligned with a corresponding pair of the through-holes 465a and 465b of the brackets 465. Then, each of the joining members 481 is inserted into a corresponding axially-aligned trio of the through-holes 465a and 465b of the brackets 465 and the recesses 427 of the stator holder 420. Consequently, each of the brackets 465 (thus each of the insulating covers 460) is mechanically joined to the stator holder 420.

Each of the joining members 481 for fixing the bridging portions 453 of the partial windings 451 may be implemented by, for example, a metal fixing pin and be fixed, for example by press fitting or screwing, to a corresponding one of the recesses 427 of the stator holder 420. Moreover, with the joining members 481 inserted in the corresponding through-holes 465a and 465b of the brackets 465, the brackets 465 are joined to one another in a state of engaging with one another.

At the other axial end of the stator coil 411, for each axially-overlapping pair of the brackets 475, a pair of the through-holes 475a and 475b formed in the pair of brackets 475 are axially aligned with each other. More specifically, in each of the brackets 475, there are formed two through-holes 475a and 475b respectively at two different circumferential positions. For each axially-overlapping pair of the brackets 475, the through-hole 475a formed in one of the pair of brackets 475 and the through-hole 475b formed in the other of the pair of brackets 475 are axially aligned with each other. Moreover, as described above, in the bottom portion 422 of the stator holder 420, there are formed the recesses 428 (see FIG. 45); in the state of the partial windings 451 having been arranged on the stator holder 420, each of the recesses 428 of the stator holder 420 is axially aligned with a corresponding pair of the through-holes 475a and 475b of the brackets 475. Then, each of the joining members 482 is inserted into a corresponding axially-aligned trio of the through-holes 475a and 475b of the brackets 475 and the recesses 428 of the stator holder 420. Consequently, each of the brackets 475 (thus each of the insulating covers 470) is mechanically joined to the stator holder 420.

Figure 53:
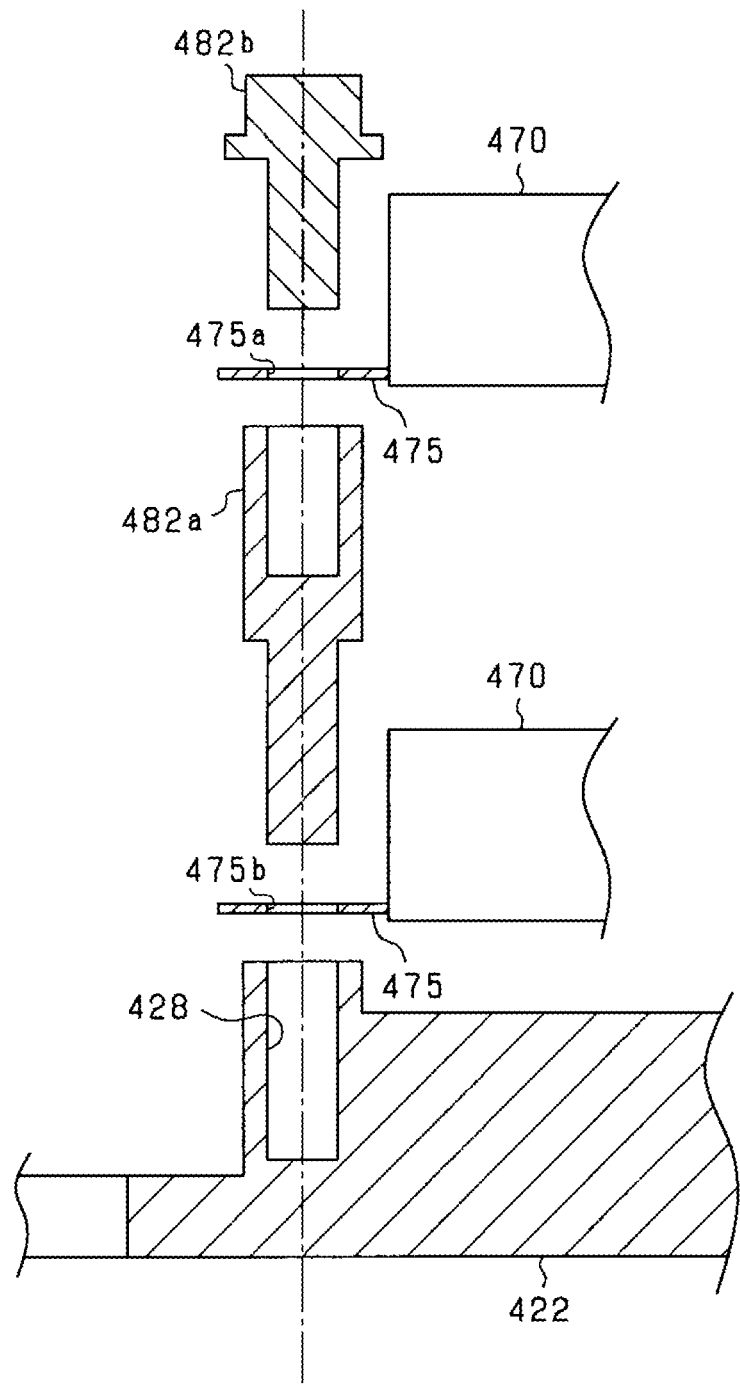
FIG. 53 is a diagram illustrating the configuration of a joining member of the stator unit according to the second embodiment.

The joining members 482 for fixing the bridging portions 454 of the partial windings 451 have a connection structure of being axially separable and connectable. FIG. 53 shows a specific configuration of the joining members 482. As shown in FIG. 53, each of the joining members 482 is formed of a metal material and composed of two joining bolts 482a and 482b that are axially separable from and connectable to each other. Moreover, the joining bolt 482a can be screwed into a corresponding one of the recesses 428 formed in the bottom portion 422 of the stator holder 420; and the joining bolt 482b can be screwed into the joining bolt 482a. In addition, in each of the recesses 428 formed in the bottom portion 422 of the stator holder 420, there is formed a female thread. Consequently, a corresponding one of the brackets 475 of the insulating covers 470 in the lower stage is fixed by the joining bolt 482a; and a corresponding one of the brackets 475 of the insulating covers 470 in the upper stage is fixed by the joining bolt 482b. It should be noted that each of the joining members 482 may alternatively be composed of two joining members that are axially separable from and connectable to each other and configured to be fixed by press-fitting.

The joining members 481 and 482 may be modified to have other forms. For example, in the present embodiment, the joining structure by the joining members 481 at one axial end of the stator coil 411 is different from the joining structure by the joining members 482 at the other axial end of the stator coil 411; however, the joining structures may be modified to be identical to each other. Moreover, the joining may be realized by other joining means, such as welding or an adhesive.

As shown in FIG. 52, for each of the partial windings 451, the bridging portions 453 and 454 of the partial winding 451 are arranged to axially overlap the bridging portions 453 and 454 of two different ones of the partial windings 451 respectively on one circumferential side and the other circumferential side of the partial winding 451. Moreover, the combination of every two of the partial windings 451 together joined to the stator holder 420 by a corresponding one of the joining members 481 at one axial end of the stator coil 411 is different from the combination of every two of the partial windings 451 together joined to the stator holder 420 by a corresponding one of the joining members 482 at the other axial end of the stator coil 411. That is, in the present embodiment, the pairs of the partial windings 451 joined together at the bridging portions 453 thereof by the corresponding joining members 481 are different from the pairs of the partial windings 451 joined together at the bridging portions 454 thereof by the corresponding joining members 482. For example, of the three partial windings 451 shown in FIG. 52, the left partial winding 451 and the center partial winding 451 are joined together at the bridging portions 453 thereof by a corresponding one of the joining members 481, while the center partial winding 451 and the right partial winding 451 are joined together at the bridging portions 454 thereof by a corresponding one of the joining members 482.

In the completed state of the stator unit 400, as shown in FIG. 42(a), the through-holes 465a and 465b of the insulating covers 460 are arranged in pairs to axially overlap each other at twelve locations in the circumferential direction. That is, there are twelve axially-overlapping pairs of the through-holes 465a and 465b of the insulating covers 460 respectively at twelve locations in the circumferential direction. Moreover, of the twelve axially-overlapping pairs of the through-holes 465a and 465b of the insulating covers 460, the joining by the joining members 481 is performed only at every other axially-overlapping pair of the through-holes 465a and 465b in the circumferential direction. That is, the joining by the joining members 481 is performed at only six of the twelve axially-overlapping pairs of the through-holes 465a and 465b of the insulating covers 460. On the other hand, the through-holes 475a and 475b of the insulating covers 470 are arranged in pairs to axially overlap each other at twelve locations in the circumferential direction. That is, there are twelve axially-overlapping pairs of the through-holes 475a and 475b of the insulating covers 470 respectively at twelve locations in the circumferential direction. Moreover, of the twelve axially-overlapping pairs of the through-holes 475a and 475b of the insulating covers 470, the joining by the joining members 482 is performed only at every other axially-overlapping pair of the through-holes 475a and 475b in the circumferential direction. That is, the joining by the joining members 482 is performed at only six of the twelve axially-overlapping pairs of the through-holes 475a and 475b of the insulating covers 470. Furthermore, as described above, the pairs of the coil modules 450 (i.e., the partial windings 451) joined together at the insulating covers 460 (i.e., the bridging portions 453) thereof by the corresponding joining members 481 are different from the pairs of the coil modules 450 (i.e., the partial windings 451) joined together at the insulating covers 470 (i.e., the bridging portions 454) thereof by the corresponding joining members 482.

In addition, the stator unit 400 may alternatively be configured such that the pairs of the coil modules 450 joined together at the insulating covers 460 thereof by the corresponding joining members 481 are the same as the pairs of the coil modules 450 joined together at the insulating covers 470 thereof by the corresponding joining members 482. Moreover, the stator unit 400 may alternatively be configured such that: the joining by the joining members 481 is performed at all of the twelve axially-overlapping pairs of the through-holes 465a and 465b of the insulating covers 460; and/or the joining by the joining members 482 is performed at all of the twelve axially-overlapping pairs of the through-holes 475a and 475b of the insulating covers 470.

Next, the configuration related to the assembly of the coil modules 450 to the core assembly CB will be described.

Figure 54:
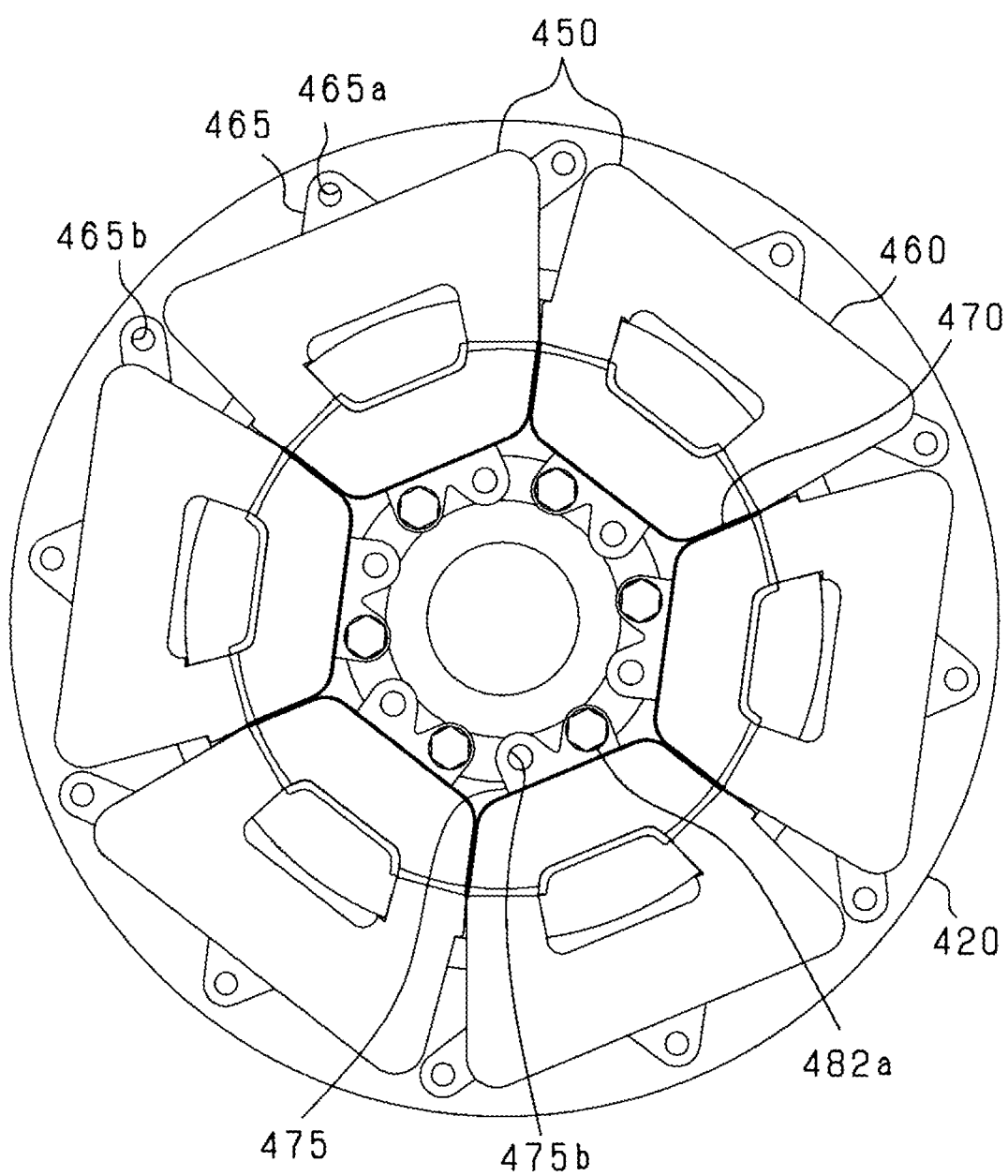
FIG. 54 is a plan view showing lower-stage coil modules arranged in alignment with each other in a circumferential direction in the stator unit according to the second embodiment.

In assembling the coil modules 450 to the core assembly CB, first, the six lower-stage coil modules 450 are arranged side by side in the circumferential direction on the core assembly CB, as shown in FIG. 54. That is, a plurality (more particularly, six in the present embodiment) of the insulating covers 460 are arranged at the same axial position and side by side in the circumferential direction. Further, the positional alignment of the through-holes 465a and 465b of the insulating covers 460 with respect to the recesses 427 (see FIGS. 44 and 45) of the stator holder 420 is performed. As shown in FIG. 44, in the case of the number of the recesses 427 being ½ of the total number of the lower-stage and upper-stage coil modules 450, of the through-holes 465a and 465b of the insulating covers 460, for example, only the through-holes 465b are axially aligned respectively with the recesses 427 of the stator holder 420.

Moreover, before placing the lower-stage coil modules 450 on the core assembly CB, the joining members 481 may be first fixed respectively to the recesses 427 of the stator holder 420 by press fitting or screwing; then, the lower-stage coil modules 450 may be placed on the core assembly CB with the joining members 481 being inserted respectively through the through-holes 465b of the brackets 465 of the insulating covers 460. Consequently, all the insulating covers 460 of the lower-stage coil modules 450 are fixed to the stator holder 420.

Meanwhile, as shown in FIG. 54, a plurality (more particularly, six in the present embodiment) of the insulating covers 470 are arranged at the same axial position and side by side in the circumferential direction. Further, the positional alignment of the through-holes 475a and 475b of the insulating covers 470 with respect to the recesses 428 (see FIG. 45) of the stator holder 420 is performed. Specifically, in the case of the number of the recesses 428 being ½ of the total number of the lower-stage and upper-stage coil modules 450, of the through-holes 475a and 475b of the insulating covers 470, for example, only the through-holes 475a are axially aligned respectively with the recesses 428 of the stator holder 420. Thereafter, the joining bolts 482a of the joining members 482 are respectively inserted through the through-holes 475a of the brackets 475 of the insulating covers 470 into the recesses 428 of the stator holder 420. Consequently, all the insulating covers 470 of the lower-stage coil modules 450 are fixed to the stator holder 420.

Next, the six upper-stage coil modules 450 are placed on the six lower-stage coil modules 450, as shown in FIGS. 42(a) and 42(b). Consequently, at one axial end of the stator coil 411, the insulating covers 460 of all the coil modules 450 are arranged in two stages (i.e., the upper and lower stages) in the axial direction; at the other axial end of the stator coil 411, the insulating covers 470 of all the coil modules 450 are arranged in two stages (i.e., the upper and lower stages) in the axial direction. Moreover, the intermediate conductor portions 452 of all the coil modules 450 are arranged in alignment with each other in a row in the circumferential direction. In this state, all of the upper-stage and lower-stage insulating covers 460 are joined to the stator holder 420 with the joining members 481 inserted respectively into the axially-aligned trios of the through-holes 465a and 465b of the brackets 465 of the upper-stage and lower-stage insulating covers 460 and the recesses 427 of the stator holder 420. On the other hand, all of the upper-stage and lower-stage insulating covers 470 are joined to the stator holder 420 with the joining members 482 inserted respectively into the axially-aligned trios of the through-holes 475a and 475b of the brackets 475 of the upper-stage and lower-stage insulating covers 470 and the recesses 428 of the stator holder 420.

In the stator unit 400 in the completed state as shown in FIGS. 41 to 43, the brackets 465 and 475 provided respectively in the insulating covers 460 and 470 of the coil modules 450 are mechanically joined to the core assembly CB by the joining members 481 and 482, thereby fixing the coil modules 450 to the core assembly CB. Moreover, in the coil modules 450, both the interphase insulation between the partial windings 451 and the ground insulation of the partial windings 451 with respect to the stator core 412 can be secured by the insulating covers 460 and 470.

In the present embodiment, the coil modules 450 are joined, by the joining members 481 and 482, to the stator holder 420 that has the coolant passage 425 formed therein. Consequently, heat generated in the partial windings 451 can be transmitted from the bridging portions 453 and 454 of the partial windings 451 to the vicinity of the coolant passage 425 of the stator holder 420 via the brackets 465 and 475 and the joining members 481 and 482. Moreover, in the present embodiment, the brackets 465 and 475 are partially exposed from the insulating covers 460 and 470 and joined to the core assembly CB by the joining members 481 and 482 on the outside of the insulating covers 460 and 470. Consequently, it becomes possible to facilitate dissipation of the heat generated in the partial windings 451 via the brackets 465 and 475. In addition, all of the brackets 465 and 475 and the joining members 481 and 482 are made of metal, thus securing high thermal conductivity thereof.

Furthermore, in the present embodiment, the filler RE is filled in the insulating covers 460 and 470 (see FIGS. 48(a) and 49(a)). Consequently, all the gaps between the bridging portions 453 and 454 of the partial windings 451 and the insulating covers 460 and 470 are filled with the filler RE, facilitating heat transfer from the bridging portions 453 and 454 to the insulating covers 460 and 470. In addition, with the filler RE filled in the insulating covers 460 and 470, the joining strength between the components of the coil modules 450 is improved.

According to the present embodiment described in detail above, it is possible to achieve the following advantageous effects.

In the rotating electric machine MG with the above-described configuration, each of the partial windings 451 of the stator coil 411 has a pair of intermediate conductor portions 452 and a pair of bridging portions 453 and 454. The partial windings 451 of the stator coil 411 are arranged in the circumferential direction so that the intermediate conductor portions 452 of the partial windings 451 are aligned with each other in the circumferential direction. Moreover, each of the partial windings 451 (thus each of the coil modules 450) is assembled to the core assembly CB, thereby enabling the assembly of the stator coil 411 regardless of whether the stator 410 has teeth formed therein. Furthermore, with the insulating covers 460 and 470 mounted respectively on the bridging portions 453 and 454 of the partial windings 451, it becomes possible to suitably insulate the partial windings 451, which are arranged side by side in the circumferential direction, from each other.

Moreover, in the present embodiment, the brackets 465 and 475 are provided in the respective insulating covers 460 and 470 so as to partially protrude from the respective insulating covers 460 and 470; and the protruding portions of the brackets 465 and 475 from the respective insulating covers 460 and 470 are mechanically joined to the core assembly CB (more specifically, to the stator holder 420). Consequently, it becomes possible to easily and reliably mount the partial windings 451 (thus the coil modules 450) to the core assembly CB. In addition, in the case of manufacturing the stator using a manufacturing device such as a winding machine, it is possible to reduce the size of the manufacturing device. As a result, the assembly of the stator coil 411 can be easily realized.

In the present embodiment, each of the brackets 465 and 475 has the bent portion 465c or 475c formed at an end thereof on the radially opposite side to the protruding side thereof; and the bent portion 465c or 475c is radially opposed to the bridging portion 453 or 454 of the partial winding 451. Consequently, in each of the brackets 465 and 475, the bent portion 465c or 475c on the non-protruding side can radially engage with the bridging portion 453 or 454 of the partial winding 451. On the other hand, the protruding portions of the brackets 465 and 475 are mechanically joined to the core assembly CB. As a result, it becomes possible to suppress radial displacement of the partial windings 451; thus it becomes possible to suitably maintain the assembled state of the partial windings 451 to the core assembly CB.

In the present embodiment, each of the bridging portions 453 and 454 of the partial windings 451 is radially bent to axially overlap the core assembly CB. Moreover, each of the insulating covers 460 and 470 is arranged, at a corresponding one of axial ends of the core assembly CB, to axially overlap the core assembly CB. Furthermore, each of the bent portions 465c and 475c of the brackets 465 and 475 is radially opposed to the inner side of the radially-convex curved part of the bridging portion 453 or 454 of the partial winding 451. Consequently, it becomes possible to suitably mechanically join the insulating covers 460 and 470 to the corresponding axial ends of the core assembly CB.

In the present embodiment, each of the bridging portions 453 and 454 of the partial windings 451 has two electrical conductor portions spaced apart in the circumferential direction (i.e., two electrical conductor portions extending respectively from the pair of intermediate conductor portions 452 of the partial winding 451 to the coil end CE side). Moreover, each of the brackets 465 and 475 is sandwiched between the two electrical conductor portions of a corresponding one of the bridging portions 453 and 454 of the partial windings 451. Consequently, circumferential displacement of the bridging portions 453 and 454 of the partial windings 451 can be suppressed by the corresponding brackets 465 and 475. Hence, with the above configuration, it becomes possible to suppress circumferential displacement of the partial windings 451 as well as radial displacement of the partial windings 451. Furthermore, in the present embodiment, each of the brackets 465 and 475 is configured to axially face a corresponding one of the bridging portions 453 and 454 of the partial windings 451 from the axially outer side of the corresponding bridging portion. As a result, it becomes possible to suppress displacement of the partial windings 451 in any of the axial, radial and circumferential directions.

In order to achieve both electrical insulation between the partial windings 451 and electrical insulation between the partial windings 451 and the core assembly CB (more particularly, the stator core 412) at the bridging portions 453 and 454 of the partial windings 451, it is desirable to provide the insulating covers 460 and 470 in such a manner as to surround the corresponding bridging portions 453 and 454 from both the axial direction and the radial direction. In view of the above, in the present embodiment, each of the insulating covers 460 and 470 is configured to include a plurality of divided cover members that are mounted to the corresponding bridging portion 453 or 454 in the axial direction. Consequently, it becomes possible to easily mount the insulating covers 460 and 470 to the corresponding bridging portions 453 and 454. Moreover, in the present embodiment, for each of the insulating covers 460 and 470, the corresponding bracket 465 or 475 is provided integrally with one of the divided cover members of the insulating cover into one piece. Consequently, it becomes possible to perform the mounting of the brackets 465 and 475 at the same time as the mounting of the divided cover members of the insulating covers 460 and 470. As a result, it becomes possible to suitably provide the insulating covers 460 and 470 that surround the entire peripheries of the corresponding bridging portions 453 and 454 from both the axial direction and the radial direction.

In the present embodiment, the partial windings 451 of the stator coil 411 are arranged in the circumferential direction so as to partially overlap one another in the circumferential direction; and the bridging portions 453 and 454 of the partial windings 451 of different phases axially overlap one another at the coil ends CE. Moreover, in the insulating covers 460 and 470 mounted respectively on the corresponding bridging portions 453 and 454 of the partial windings 451, the protruding portions of the brackets 465 and 475, which axially overlap one another, are together joined by the corresponding joining members 481 and 482 to the core assembly CB. Consequently, it becomes possible to easily mount the partial windings 451 of the stator coil 411 to the core assembly CB. Moreover, by the joining members 481 and 482, heat conduction paths are formed between the brackets 465 and 475 and the core assembly CB. Consequently, it becomes possible to realize a desirable configuration in terms of heat dissipation of the stator coil 411.

In the present embodiment, the combination of every two of the partial windings 451 together joined to the core assembly CB by a corresponding one of the joining members 481 at one axial end of the stator coil 411 is different from the combination of every two of the partial windings 451 together joined to the core assembly CB by a corresponding one of the joining members 482 at the other axial end of the stator coil 411. Consequently, it becomes possible to minimize the number of locations where the partial windings 451 are joined to the core assembly CB while connecting every circumferentially-adjacent pair of the partial windings 451 to each other. As a result, it becomes possible to reduce the manufacturing load of the rotating electric machine MG.

In the present embodiment, the brackets 465 and 475 of the insulating covers 460 and 470 are joined to the core assembly CB that has the cooling portion (i.e., the coolant passage 425). Consequently, heat generated in the partial windings 451 can be transmitted to the vicinity of the cooling portion via the brackets 465 and 475. As a result, it becomes possible to improve the performance of cooling the stator coil 411.

In the present embodiment, the core assembly CB includes the stator core 412 and the stator holder 420 located radially outside the stator core 412; and the brackets 465 and 475 of the insulating covers 460 and 470 are joined by the joining members 481 and 482 to the stator holder 420 beyond the stator core 412. Consequently, it becomes unnecessary to fix the joining members 481 and 482 to the stator core 412; thus it becomes unnecessary to form recesses or the like in the stator core 412 for fixing the joining members 481 and 482 thereto. As a result, it becomes possible to prevent occurrence of problems such as generation of cogging torque.

In the present embodiment, the coolant passage 425 is formed in the region including the cylindrical portion 421 and the bottom portion 422 of the stator holder 420. Moreover, the brackets 475 of the insulating covers 470 are mechanically jointed to the bottom portion 422 of the stator holder 420. Consequently, heat can be suitably transferred from the brackets 475 of the insulating covers 470 to the coolant passage 425 of the stator holder 420.

In the present embodiment, the brackets 465 and 475 of the insulating covers 460 and 470 are mechanically joined to the bottom portion 422 and the flange 423 both of which radially extend in the core assembly CB. Consequently, it becomes possible to easily secure the joining locations and suitable perform the joining of the brackets 465 and 475 to the core assembly CB.

In the present embodiment, the insulating covers 460 and 470 are mechanically joined to the core assembly CB at the axial ends of the partial windings 451. Consequently, it becomes possible to suitably fix the partial windings 451 and to prevent occurrence of a problem that the intermediate conductor portions 452 of the partial windings 451 become nonparallel to the axial direction and thus the size of the air gap between the stator 410 and the rotor 430 varies in the axial direction. Moreover, in the present embodiment, for each of the partial windings 451, the manner in which the joining by the joining member 481 is performed at one axial end of the partial winding 451 is different from the manner in which the joining by the joining member 482 is performed at the other axial end of the partial winding 451. Specifically, the joining by the joining member 481 is performed by engagement joining while the joining by the joining member 482 is performed by screw joining. Consequently, it becomes possible to make the margin (or play amount) of the joining at one axial end of the partial winding 451 and the margin (or play amount) of the joining at the other axial end of the partial winding 451 different from each other, thereby facilitating the dimension adjustment in the assembled state of the partial winding 451.

In the present embodiment, the intermediate conductor portions 452 (i.e., the coil side conductor portions) of the partial windings 451 are covered with the respective insulating coats 455 that are formed of the film members. That is, the intermediate conductor portions 452 of the partial windings 451 are electrically insulated from each other by the insulating coats 455, while the bridging portions 453 and 454 (i.e., the coil end conductor portions) of the partial windings 451 are electrically insulated from each other by the insulating covers 460 and 470. Consequently, it becomes possible to simplify the insulation structure of the partial windings 451 as compared with the case of covering all the portions of each of the partial windings 451 with a single insulating member.

Modifications of Second Embodiment

In the above-described embodiment, the brackets 465 and 475 are respectively embedded in the end plate portions 463 and 473 of the insulating covers 460 and 470. Alternatively, the brackets 465 and 475 may be respectively provided integrally with the end plate portions 463 and 473 of the insulating covers 460 and 470 in other manners, for example by being respectively bonded to the plate surfaces of the end plate portions 463 and 473.

In the above-described embodiment, the brackets 465 and 475 are made of a metal plate. Alternatively, the brackets 465 and 475 may be made of other materials, such as a high-strength and non-stretchable resin material. It is preferable for the brackets 465 and 475 to be made of a material having a higher strength than the insulating covers 460 and 470. It is also preferable for the brackets 465 and 475 to be made of a material having high thermal conductivity.

In the above-described embodiment, for each of the partial windings 451, the mechanical joining mechanism is provided in both the insulating covers 460 and 470 respectively covering the bridging portions 453 and 454 of the partial winding 451. Alternatively, for each of the partial windings 451, the mechanical joining mechanism may be provided in only one of the insulating covers 460 and 470 respectively covering the bridging portions 453 and 454 of the partial winding 451. For example, for each of the partial windings 451, the mechanical joining mechanism may be provided only in the insulating cover 470 to join the insulating cover 470 to the bottom portion 422 of the stator holder 420. In this case, the insulating cover 460 may be fixed by being pressed by a bus bar, a terminal block or a housing, all of which are not shown in the drawings.

In the above-described embodiment, for each of the partial windings 451, the manner in which the joining by the joining member 481 is performed at one axial end of the partial winding 451 is different from the manner in which the joining by the joining member 482 is performed at the other axial end of the partial winding 451. Alternatively, for each of the partial windings 451, both the joining by the joining member 481 at one axial end of the partial winding 451 and the joining by the joining member 482 at the other axial end of the partial winding 451 may be performed in the same manner, for example by screw joining or engagement joining.

In the above-described embodiment, the core assembly CB, which includes the stator core 412 and the stator holder 420, is used as the winding support member. Alternatively, only the stator holder 420 may be used as the winding support member; that is, the winding support member may not include the stator core 412. Moreover, in the above-described embodiment, the cooling portion of the core assembly CB (i.e., the winding support member) is constituted of the coolant passage 425. Alternatively, the cooling portion of the core assembly CB may be constituted of other members or portions, such as heat dissipation fins formed on the radially outer periphery of the cylindrical portion 421 of the stator holder 420.

Third Embodiment

Next, the configuration of a stator unit 500 according to the third embodiment will be described. The stator unit 500 according to the third embodiment is obtained by changing part of the stator unit 400 according to the second embodiment. Therefore, the differences of the stator unit 500 according to the third embodiment from the stator unit 400 according to the second embodiment will be mainly described hereinafter.

Figure 55:
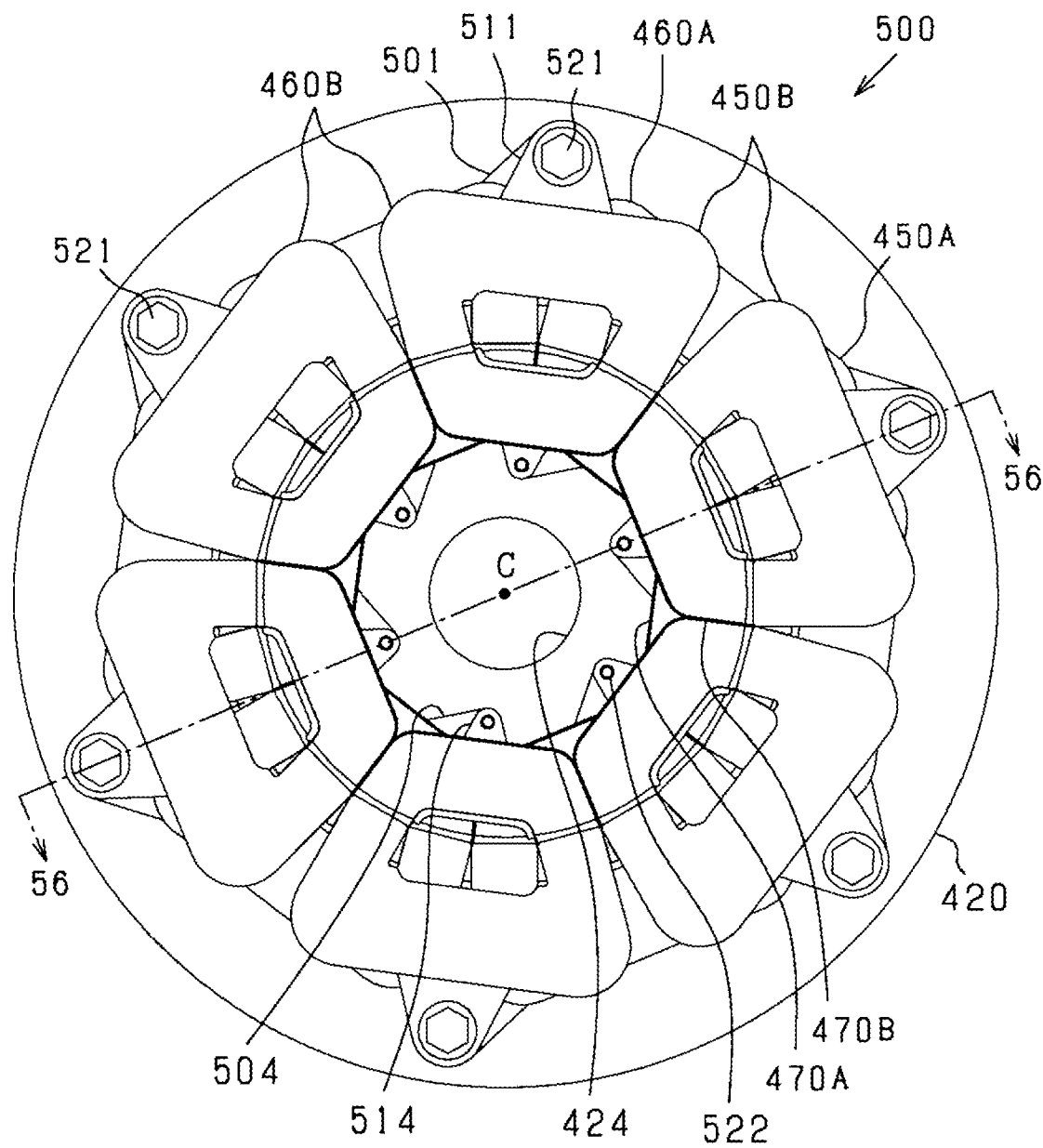
FIG. 55 is a plan view of a stator unit according to a third embodiment.
Figure 56:
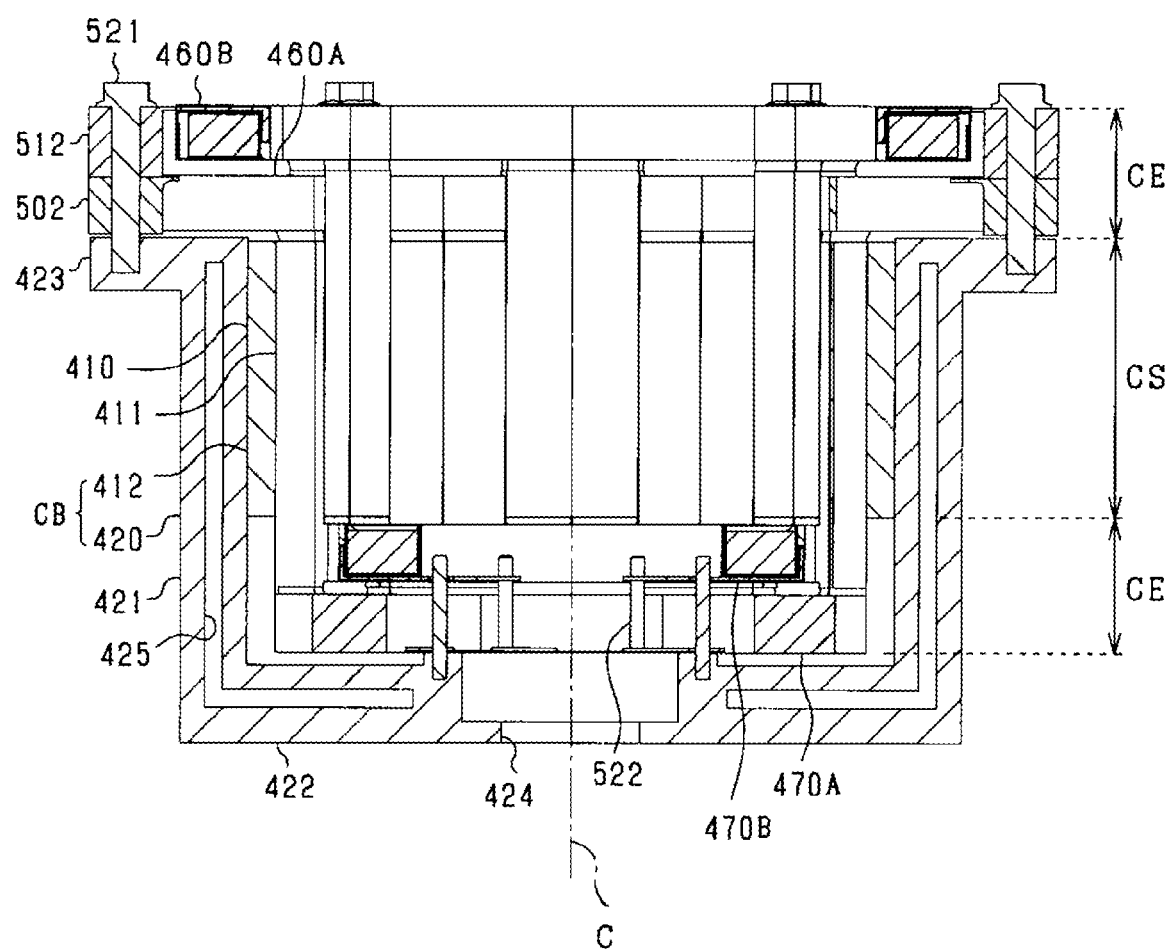
FIG. 56 is a longitudinal cross-sectional view of the stator unit according to the third embodiment.
Figure 57:
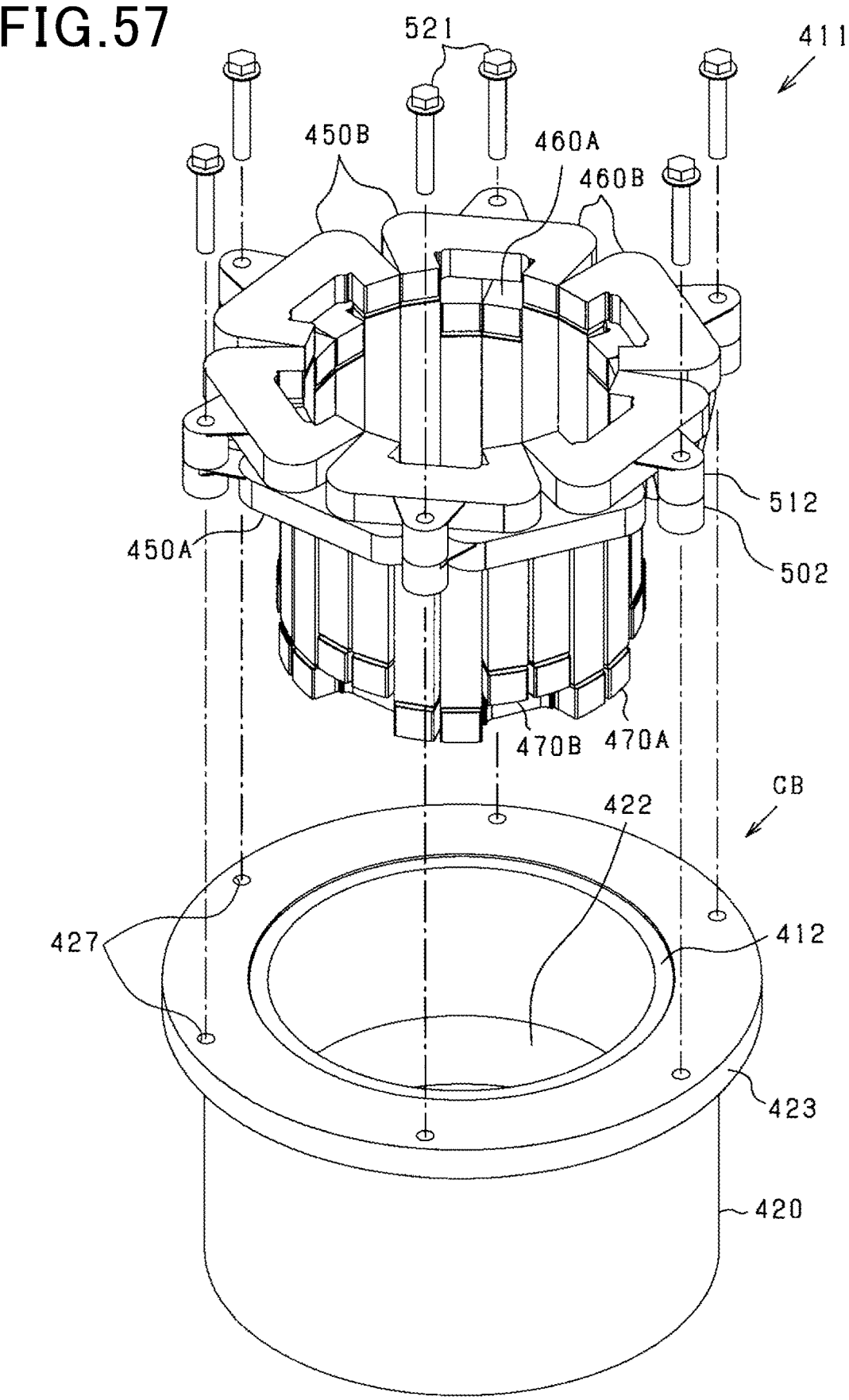
FIG. 57 is an exploded perspective view showing a core assembly and a stator coil of the stator unit according to the third embodiment in an exploded manner.

FIG. 55 is a plan view of the stator unit 500 according to the present embodiment. FIG. 56 is a longitudinal cross-sectional view of the stator unit 500 according to the present embodiment. FIG. 57 is an exploded perspective view showing a core assembly CB and a stator coil 411 of the stator unit 500 according to the present embodiment in an exploded manner. FIG. 56 is a cross-sectional view taken along the line 56-56 passing through the stator center point C in FIG. 55.

The stator unit 500 according to the present embodiment differs from the stator unit 400 according to the second embodiment in the configuration for fixing the coil modules 450 to the core assembly CB. Specifically, in the present embodiment, the coil modules 450 are fixed to the bottom portion 422 of the stator holder 420 by fixing pins and to the flange 423 of the stator holder 420 by bolts. Therefore, in the stator holder 420, the recesses 427 formed in the flange 423 and the recesses 428 formed in the bottom portion 422 are changed compared to those described in the second embodiment.

In the present embodiment, the stator coil 411 includes a plurality of coil modules 450 as described in the second embodiment. That is, each of the coil modules 450 includes a substantially Z-shaped partial winding 451. However, the insulating covers 460 and 470 of the coil modules 450 are different from those described in the second embodiment. Moreover, in the present embodiment, all the coil modules 450 are arranged in two stages in the axial direction as described in the second embodiment. However, the configuration of the insulating covers 460 and 470 of the upper-stage coil modules 450 is different from the configuration of the insulating covers 460 and 470 of the lower-stage coil modules 450 unlike in the second embodiment. Therefore, for the sake of convenience of explanation, the coil modules 450 arranged in the lower stage will also be referred to as the "lower-stage coil modules 450A" hereinafter; and the coil modules 450 arranged in the upper stage will also be referred to as the "upper-stage coil modules 450B" hereinafter. Moreover, in order to clarify the difference in configuration between the lower-stage coil modules 450A and the upper-stage coil modules 450B, the insulating covers 460 and 470 of the lower-stage coil modules 450A will also be referred to as the "insulating covers 460A and 470A" hereinafter; and the insulating covers 460 and 470 of the upper-stage coil modules 450B will also be referred to as the "insulating covers 460B and 470B" hereinafter. In addition, as in the second embodiment, each of the insulating covers 460 has an outer cover member 461 and an inner cover member 462; and each of the insulating covers 470 has an outer cover member 471 and an inner cover member 472.

Figure 58B:
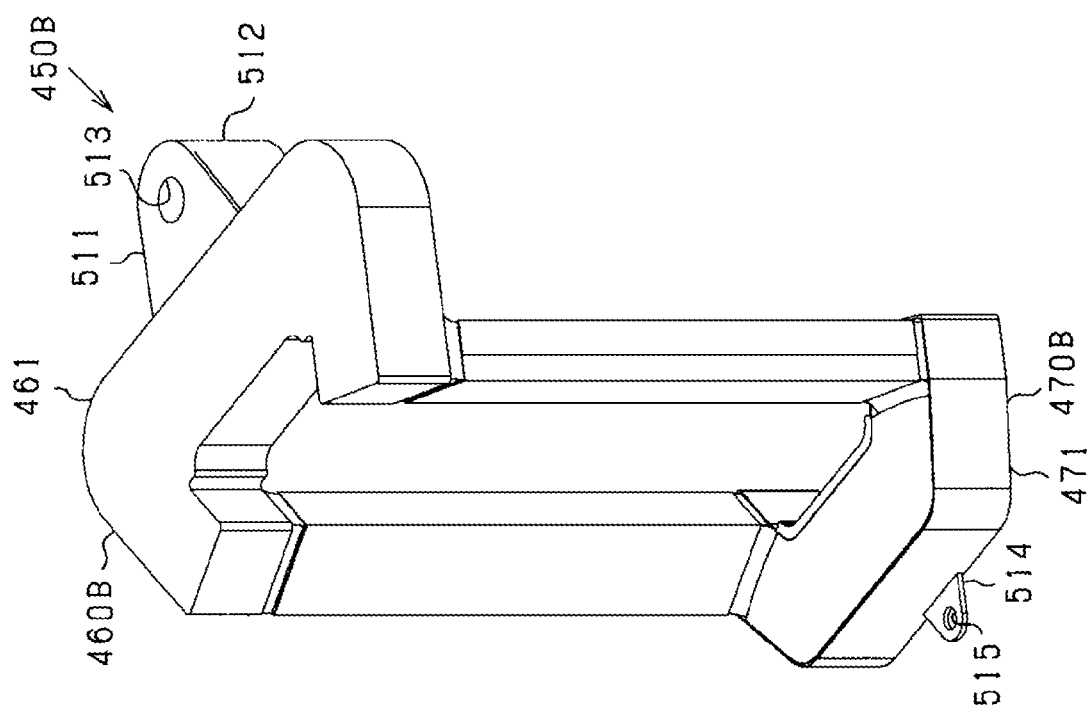
FIG. 58(b) is a perspective view of an upper-stage coil module according to the third embodiment.
Figure 58A:
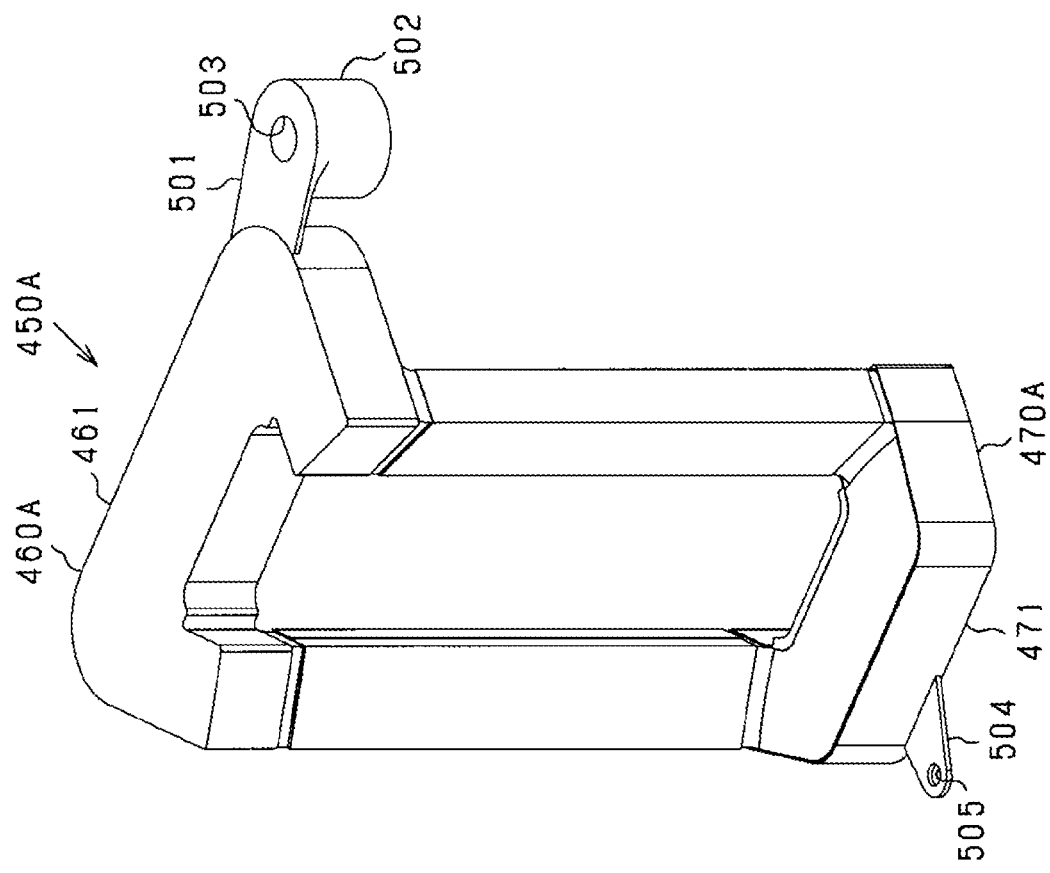
FIG. 58(a) is a perspective view of a lower-stage coil module according to the third embodiment.

FIG. 58(a) is a perspective view illustrating the configuration of each of the lower-stage coil modules 450A. FIG. 58(b) is a perspective view illustrating the configuration of each of the upper-stage coil modules 450B.

As shown in FIG. 58(a), in each of the lower-stage coil modules 450A, a bracket 501 is provided in the insulating cover 460A in such a manner as to have a protruding portion that circumferentially protrudes from the insulating cover 460A. Moreover, the protruding portion of the bracket 501 includes a boss portion 502 that extends in the axial direction; and a through-hole 503 is formed in the boss portion 502. On the other hand, a bracket 504 is provided in the insulating cover 470A in such a manner as to have a protruding portion that protrudes radially inward from the insulating cover 470A. Moreover, a through-hole 505 is formed in the protruding portion of the bracket 504.

As shown in FIG. 58(b), in each of the upper-stage coil modules 450B, a bracket 511 is provided in the insulating cover 460B in such a manner as to have a protruding portion that protrudes radially outward from the insulating cover 460B. Moreover, the protruding portion of the bracket 511 includes a boss portion 512 that extends in the axial direction; and a through-hole 513 is formed in the boss portion 512. On the other hand, a bracket 514 is provided in the insulating cover 470B in such a manner as to have a protruding portion that protrudes radially inward from the insulating cover 470B. Moreover, a through-hole 515 is formed in the protruding portion of the bracket 514.

In addition, main bodies of the brackets 501, 504, 511 and 514 are embedded respectively in the insulating covers 460A, 470A, 460B and 470B and therefore cannot be visually recognized in FIGS. 58(a) and 58(b). However, as in the second embodiment, each of the brackets 501, 504, 511 and 514 also has a bent portion that is bent at an end of the corresponding insulating cover on the radially opposite side to the location where the bracket protrudes from the corresponding insulating cover.

Figure 59A:
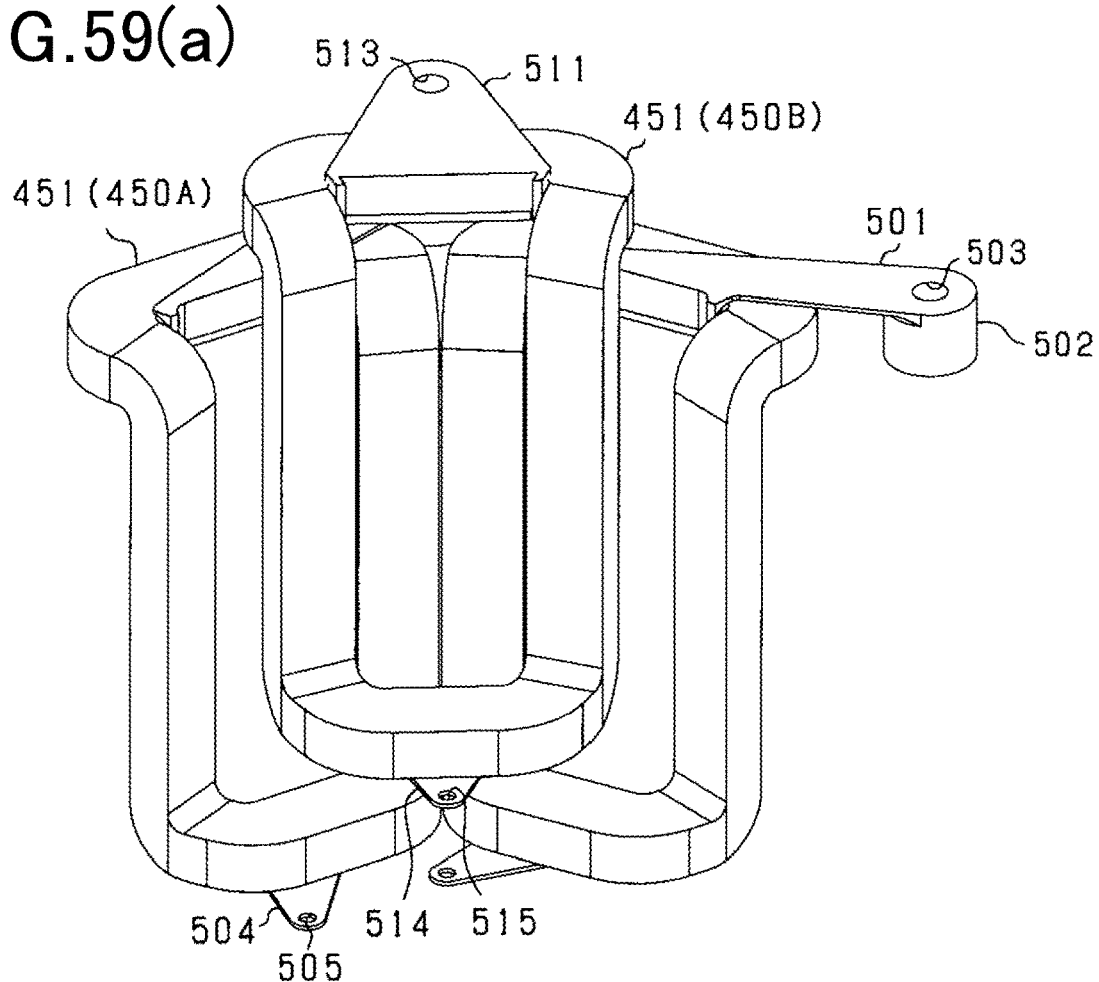
FIGS. 59(a) and 59(b) are perspective views illustrating the positional relationship between partial windings and brackets of coil modules according to the third embodiment.
Figure 59B:
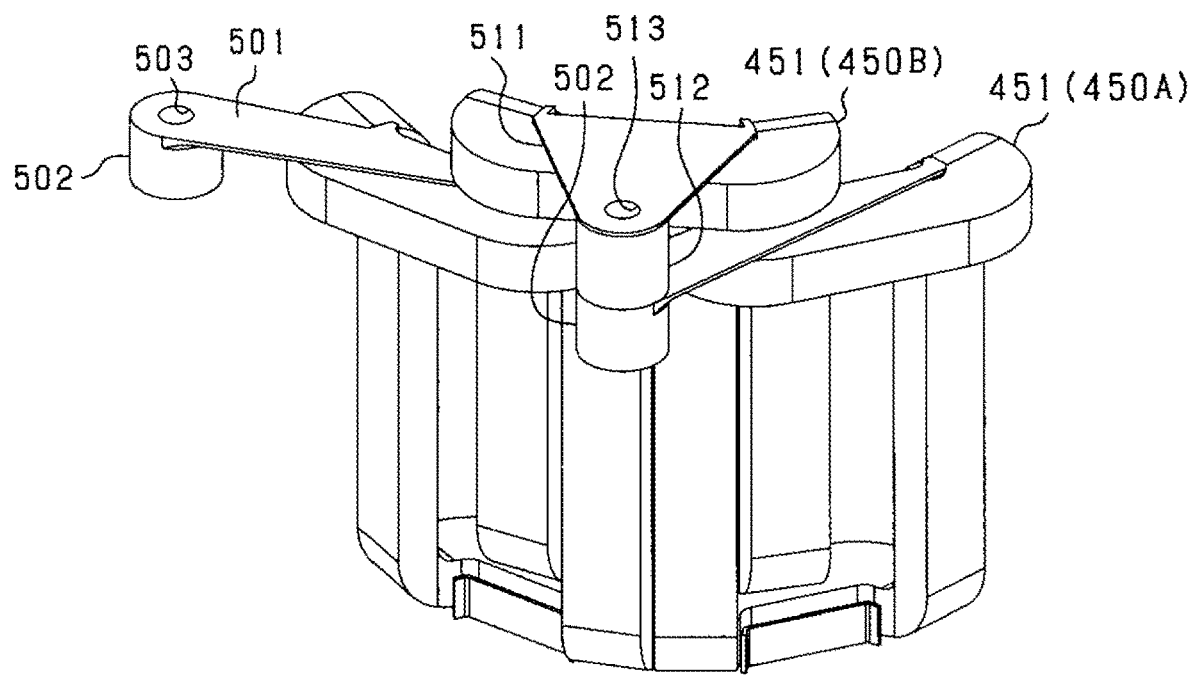

FIGS. 59(a) and 59(b) are perspective views illustrating the positional relationship between the partial windings 451 and the brackets 501, 504, 511 and 514 of the coil modules 450A and 450B in the stator coil 411. Specifically, FIG. 59(*a*) is a perspective view showing the assembled state of three partial windings 451 from the radially inner side thereof, whereas FIG. 59(*b*) is a perspective view showing the assembled state of the three partial windings 451 from the radially outer side thereof.

As shown in FIGS. 59(*a*) and 59(*b*), at one axial end (i.e., the upper end in the figures) of the stator coil 411, the boss portions 502 and 512 of each axially-overlapping pair of the brackets 501 and 511 are arranged to abut each other in the axial direction so that the through-holes 503 and 513 of the boss portions 502 and 512 communicate with each other in the axial direction. Moreover, at the other axial end (i.e., the lower end in the figures) of the stator coil 411, the through-holes 505 and 515 of each axially-overlapping pair of the brackets 504 and 514 are axially aligned with each other.

Then, as shown in FIG. 55, at one axial end of the stator coil 411, each axially-overlapping pair of the brackets 501 and 511 are together joined to the stator holder 420 by a corresponding one of joining members 521. More specifically, each axially-overlapping pair of the brackets 501 and 511 are joined with the corresponding joining member 521 inserted through the through-holes 503 and 513 formed in the boss portions 502 and 512 of the pair of the brackets 501 and 511. The corresponding joining member 521 may be implemented by, for example, a metal bolt. In this case, the metal bolt may be inserted through the through-hole 503 of the boss portion 502 of the bracket 501 and then screwed into a female thread formed in the through-hole 513 of the boss portion 512 of the bracket 511.

In addition, for each axially-overlapping pair of the brackets 501 and 511, mating surfaces of the boss portions 502 and 512 of the pair of the brackets 501 and 511 may be concave-convex-shaped; and the boss portions 502 and 512 may be positioned relative to each other through engagement between the concave-convex-shaped mating surfaces. Consequently, it would become possible to facilitate the positioning of the brackets 501 and 511 during the assembly of the coil modules 450 to the core assembly CB.

Moreover, as shown in FIG. 55, at the other axial end of the stator coil 411, each axially-overlapping pair of the brackets 504 and 514 are together joined to the stator holder 420 by a corresponding one of joining members 522. More specifically, each axially-overlapping pair of the brackets 504 and 514 are joined with the corresponding joining member 522 inserted through the through-holes 505 and 515 formed in the pair of the brackets 504 and 514. The corresponding joining member 522 may be implemented by, for example, a metal fixing pin.

Figure 60:
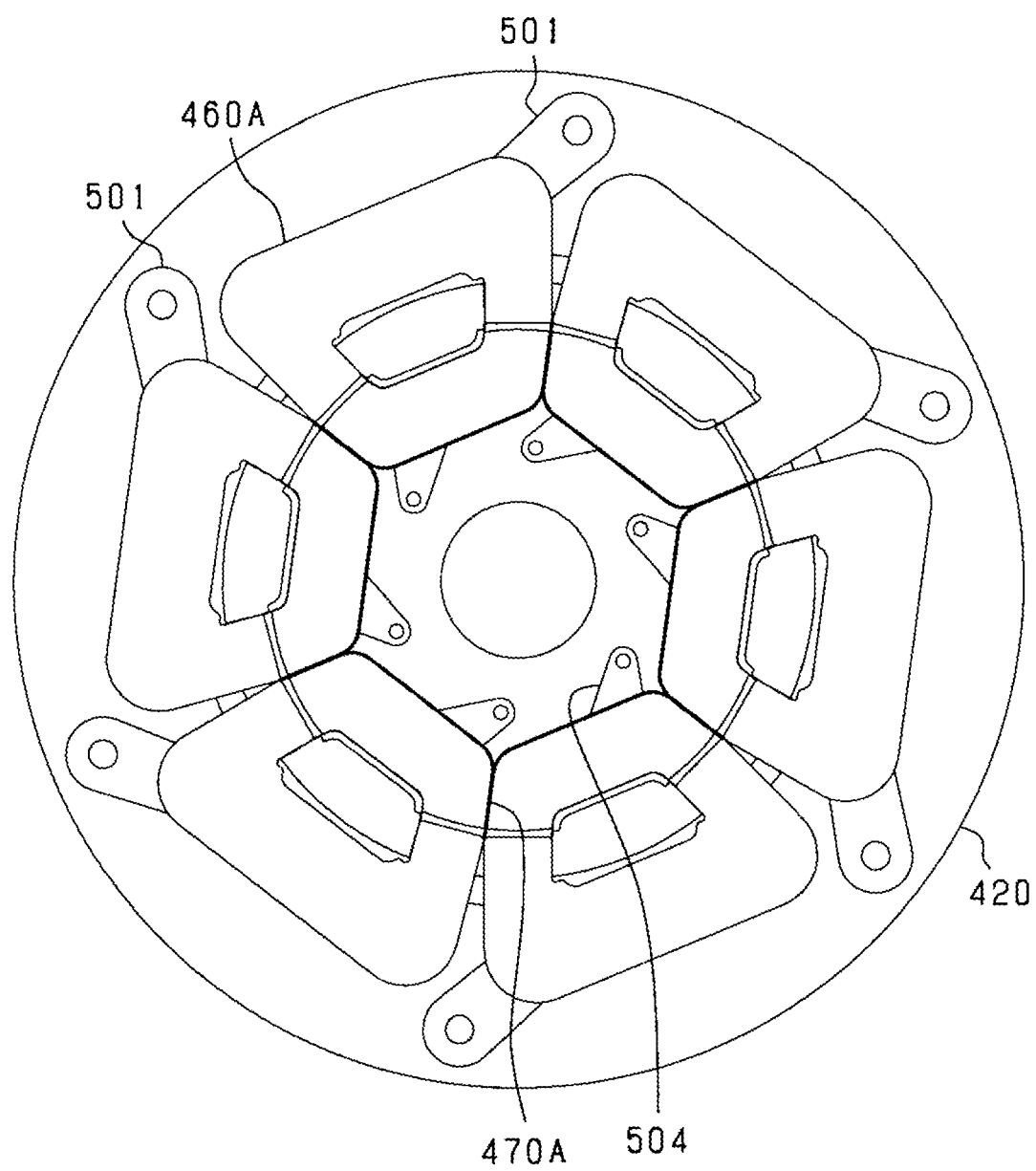
FIG. 60 is a plan view showing lower-stage coil modules arranged in alignment with each other in a circumferential direction in the stator unit according to the third embodiment.

In assembling the coil modules 450 to the core assembly CB, first, the six lower-stage coil modules 450A are arranged side by side in the circumferential direction on the core assembly CB, as shown in FIG. 60. Then, the six upper-stage coil modules 450B are arranged side by side in the circumferential direction on the six lower-stage coil modules 450A, as shown in FIG. 55. Thereafter, as shown in FIG. 56, at one axial end of the stator coil 411, each axially-overlapping pair of the brackets 501 and 511 provided in the insulating covers 460A and 460B are together mechanically joined to the flange 423 of the stator holder 420 by the corresponding joining member 521; at the other axial end of the stator coil 411, each axially-overlapping pair of the brackets 504 and 514 provided in the insulating covers 470A and 470B are together mechanically joined to the bottom portion 422 of the stator holder 420 by the corresponding joining member 522. Consequently, all the coil modules 450 are fixed to the core assembly CB.

As described above, in the present embodiment, each axially-overlapping pair of the brackets 501 and 511 of the insulating covers 460A and 460B are together joined, with the boss portions 502 and 512 of the pair of the brackets 501 and 511 abutting each other in the axial direction, to the flange 423 of the stator holder 420 by the corresponding joining member 521 inserted through the hollow portions (i.e., the through-holes 503 and 513) of the boss portions 502 and 512. Consequently, with the boss portions 502 and 512 abutting each other in the axial direction, it becomes possible to suitably join the insulating covers 460A and 460B to the core assembly CB while keeping the relative axial distance between the insulating covers 460A and 460B constant.

Hereinafter, modifications of the above-described second and third embodiments will be described.

Figure 61:
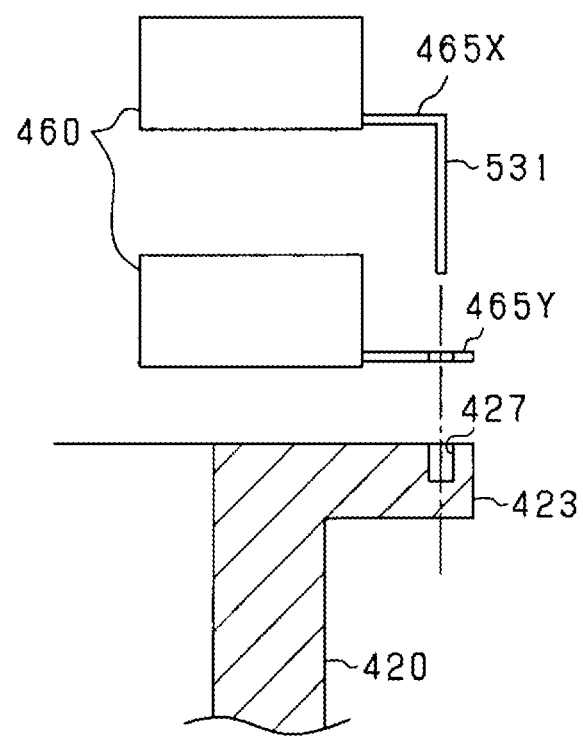
FIG. 61 is a cross-sectional view of part of a stator according to a modification.

In the above-described second embodiment, the brackets 465 and 475 of the insulating covers 460 and 470 may be mechanically joined to the core assembly CB without using the joining members 481 and 482 formed separately from the brackets 465 and 475. For example, as shown in FIG. 61, each of the insulating covers 460 arranged in the upper stage may have a bracket 465X provided integrally therewith; and each of the insulating covers 460 arranged in the lower stage may have a bracket 465Y provided integrally therewith. Moreover, the bracket 465X may have a bent portion 531 formed at a distal end thereof; the bent portion 531 is bent to extend in the axial direction. Furthermore, each axially-overlapping pair of the upper-stage and lower-stage insulating covers 460 may be together joined to the stator holder 420 by the bent portion 531 of the bracket 465X of the upper-stage insulating cover 460 inserted through a through-hole of the bracket 465Y of the lower-stage insulating cover 460 and fixed to a corresponding one of the recesses 427 formed in the flange 423 of the stator holder 420.

Figure 62:
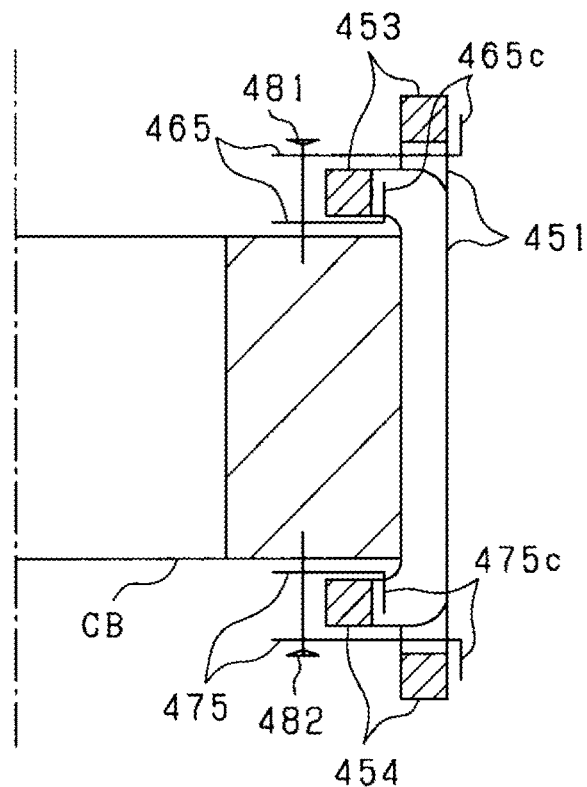
FIG. 62 is a cross-sectional view of part of a stator according to another modification.

In the above-described second and third embodiments, each of the partial windings 451 constituting the stator coil 411 has a substantially Z-shape in a side view; and all the partial windings 451 are arranged in two stages in the axial direction. However, the partial windings 451 may alternatively have other shapes. For example, as shown in FIG. 62, the partial windings 451 constituting the stator coil 411 may include two types of partial windings 451, i.e., first partial windings 451 each having a substantially I-shape in a side view and second partial windings 451 each having a substantially C-shape in a side view. Moreover, all the partial windings 451 may be assembled to the core assembly CB by the corresponding joining members 481 and 482. It should be noted that for the sake of simplicity, the brackets 465 and 475 included in the insulating covers 460 and 470 and the joining members 481 and 482 are only schematically shown in FIG. 62.

More specifically, in the example shown in FIG. 62, each of the first partial windings 451 has a planar shape such that both the bridging portions 453 and 454 of the first partial winding 451 extend straight in the axial direction without being radially bent. Moreover, for the bridging portions 453 and 454 of the first partial windings 451, there also arranged the corresponding the bent portions 465*c* and 475*c* of the brackets 465 and 475 to radially face the bridging portions 453 and 454.

Figure 63:
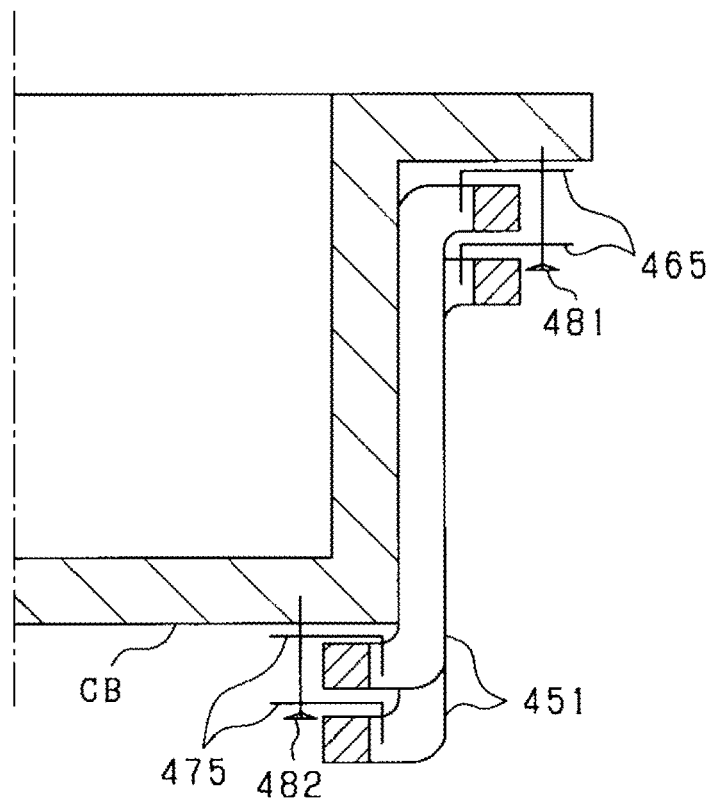
FIG. 63 is a cross-sectional view of part of a stator according to yet another modification.

In the above-described second and third embodiments, the rotating electric machine is configured as an inner rotor type rotating electric machine. However, the rotating electric machine may alternatively be configured as an outer rotor type rotating electric machine which includes a stator as shown in FIG. 63. In the stator shown in FIG. 63, the brackets 465 and 475, which are respectively provided in the insulating covers 460 and 470 so as to partially protrude from the respective insulating covers 460 and 470, are mechanically joined in pairs to the core assembly CB by the corresponding joining members 481 and 482.

In the above-described second and third embodiments, the rotating electric machine is configured as a rotating-field type rotating electric machine where the rotor constitutes the field system and the stator constitutes the armature. Alternatively, the rotating electric machine may be configured as a rotating-armature type rotating electric machine where a rotor constitutes an armature and a stator constitutes a field system.

The disclosure in this specification is not limited to the embodiments illustrated above. The disclosure encompasses not only the embodiments illustrated above, but also modifications of the embodiments which can be derived by one of ordinary skill in the art from the embodiments. For example, the disclosure is not limited to the combinations of components and/or elements illustrated in the embodiments. Instead, the disclosure may be implemented by various combinations. The disclosure may include additional parts which can be added to the embodiments. The disclosure encompasses components and/or elements omitted from the embodiments. The disclosure also encompasses any replacement or combination of components and/or elements between one and another of the embodiments. The disclosed technical ranges are not limited to the description of the embodiments. Instead, the disclosed technical ranges should be understood as being shown by the recitation of the claims and as encompassing all modifications within equivalent meanings and ranges to the recitation of the claims.

What is claimed is:

1. A rotating electric machine comprising:
   a field system having a plurality of magnetic poles;
   a multi-phase armature coil radially opposed to the field system, the armature coil having phase windings each constituted of a plurality of partial windings; and
   a winding support member provided on a radially opposite side of the armature coil to the field system and supporting the partial windings,
   wherein
   each of the partial windings has a pair of intermediate conductor portions and a pair of bridging portions, the pair of intermediate conductor portions each extending in an axial direction and being spaced at a predetermined interval in a circumferential direction, the pair of bridging portions being located respectively on opposite axial sides of the pair of intermediate conductor portions and connecting the pair of intermediate conductor portions in a ring shape,
   all the partial windings constituting the phase windings of the armature coil are arranged in the circumferential direction so that the intermediate conductor portions of the partial windings are aligned with each other in the circumferential direction,
   in each of the partial windings, insulating members are mounted respectively on corresponding ones of the bridging portions of the partial winding so as to electrically insulate the partial winding from the other partial windings,
   brackets, which are separate members from the partial windings, are provided respectively in corresponding ones of the insulating members of the partial windings in such a manner as to partially protrude from the corresponding insulating members, and
   protruding portions of the brackets, which protrude from the corresponding insulating members, are mechanically joined to the winding support member.

2. The rotating electric machine as set forth in claim 1, wherein
   each of the brackets has a bent portion that is axially bent at an end of the bracket on a radially opposite side to a location where the bracket partially protrudes from the corresponding insulating member, and
   the bent portion is radially opposed to the corresponding bridging portion covered by the corresponding insulating member.

3. The rotating electric machine as set forth in claim 2, wherein
   each of the bridging portions of the partial windings is radially bent to axially overlap the winding support member,
   each of the insulating members is arranged, at a corresponding one of axial ends of the winding support member, to axially overlap the winding support member, and
   each of the brackets has the bent portion thereof radially opposed to an inner side of a radially-convex curved part of the corresponding bridging portion.

4. The rotating electric machine as set forth in claim 2, wherein
   each of the brackets is sandwiched between two electrical conductor portions of the corresponding bridging portion which are spaced apart in the circumferential direction.

5. The rotating electric machine as set forth in claim 2, wherein
   each of the insulating members is an insulating cover that surrounds the corresponding bridging portion from both the axial direction and a radial direction,
   the insulating cover includes a plurality of divided cover members that are mounted to the corresponding bridging portion in the axial direction or in the radial direction, and
   each of the brackets is provided integrally with one of the divided cover members of the corresponding insulating cover into one piece.

6. The rotating electric machine as set forth in claim 1, wherein
   in each of the partial windings, there is interposed, between the pair of intermediate conductor portions of the partial winding, one of the pair of intermediate conductor portions of another of the partial windings which is of a different phase from the partial winding,
   all the intermediate conductor portions of the partial windings constituting the phase windings of the armature coil are arranged in a predetermined sequence and in alignment with each other in the circumferential direction,
   the bridging portions of the partial windings of different phases axially overlap one another at coil ends of the armature coil, and
   for each pair of the insulating members mounted respectively on an axially-overlapping pair of the bridging portions, the protruding portions of the corresponding brackets provided respectively in the pair of the insulating members are arranged to axially overlap each other and together joined to the winding support member by a corresponding one of joining members.

7. The rotating electric machine as set forth in claim 6, wherein for each of the partial windings, the bridging portions of the partial winding are arranged to axially overlap the bridging portions of two different ones of the partial windings respectively on one circumferential side and the other circumferential side of the partial winding, and the combination of every two of the partial windings together joined to the winding support member by the corresponding joining member at one axial end of the armature coil is different from the combination of every two of the partial windings together joined to the winding support member by the corresponding joining member at the other axial end of the armature coil.

8. The rotating electric machine as set forth in claim 6, wherein each of the brackets located on a same axial side of the winding support member has a boss portion formed in the protruding portion thereof and extending in the axial direction, and each axially-overlapping pair of the brackets located on the same axial side of the winding support member are together joined, with the boss portions of the pair of the brackets abutting each other in the axial direction, to the winding support member by the corresponding joining member inserted through hollow portions of the boss portions.

9. The rotating electric machine as set forth in claim 6, wherein the winding support member has a cooling portion configured to cool the armature coil, and each of the brackets is joined by the corresponding joining member to a corresponding one of axial end faces of the winding support member.

10. The rotating electric machine as set forth in claim 9, wherein the winding support member includes:

an armature core assembled to a radially inner periphery or a radially outer periphery of the armature coil; and an armature holding member provided on a radially opposite side of the armature core to the armature coil and has the cooling portion formed therein, and each of the brackets is joined by the corresponding joining member to a corresponding one of axial end faces of the armature holding member.

11. The rotating electric machine as set forth in claim 9, wherein the winding support member has a cylindrical portion and a pair of pedestal portions formed respectively at opposite axial ends of the cylindrical portion and each radially extending from the cylindrical portion, each of the brackets is mechanically joined to a corresponding one of the pedestal portions of the winding support member, the winding support member has, as the cooling portion, a coolant passage formed in an annular shape in the cylindrical portion of the winding support member, and the coolant passage is formed in at least one of the pedestal portions as well as in the cylindrical portion of the winding support member.

12. The rotating electric machine as set forth in claim 1, wherein the winding support member has a cylindrical portion and a pair of pedestal portions formed respectively at opposite axial ends of the cylindrical portion and each radially extending from the cylindrical portion, and each of the brackets is mechanically joined to a corresponding one of the pedestal portions of the winding support member.

\* \* \* \* \*